US007860964B2

(12) United States Patent
Brady et al.

(10) Patent No.: US 7,860,964 B2
(45) Date of Patent: *Dec. 28, 2010

(54) POLICY-BASED CONTENT DELIVERY NETWORK SELECTION

(75) Inventors: Mark Brady, Thousand Oaks, CA (US); Maksim Yevmenkin, Thousand Oaks, CA (US); Paul E. Stolorz, Thousand Oaks, CA (US); John K. Salmon, Altadena, CA (US); Michael S. Warren, Santa Fe, NM (US); Jeffrey Koller, Torrance, CA (US); Aric Hagberg, Santa Fe, NM (US); David Pfitzner, Thousand Oaks, CA (US); Ted Middleton, Moorpark, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 66 days.

This patent is subject to a terminal disclaimer.

(21) Appl. No.: 11/976,648

(22) Filed: Oct. 26, 2007

(65) Prior Publication Data

US 2008/0215718 A1   Sep. 4, 2008

Related U.S. Application Data

(63) Continuation-in-part of application No. 10/259,497, filed on Sep. 30, 2002.

(60) Provisional application No. 60/325,177, filed on Sep. 28, 2001.

(51) Int. Cl.
*G06F 15/173* (2006.01)
*G06F 15/16* (2006.01)

(52) U.S. Cl. .................... 709/223; 709/219
(58) Field of Classification Search .................. None
See application file for complete search history.

(56) References Cited

U.S. PATENT DOCUMENTS

| 4,495,570 A | 1/1985 | Kitajima et al. |
| 4,591,983 A | 5/1986 | Bennett et al. |

(Continued)

FOREIGN PATENT DOCUMENTS

| AU | 763380 | 11/2003 |

(Continued)

OTHER PUBLICATIONS

"Local Area Network Server Replacement Procedure", IBM Technical Disclosure Bulletin, vol. 38, No. 1, (Jan. 1995), 235-236.

(Continued)

*Primary Examiner*—John B. Walsh
(74) *Attorney, Agent, or Firm*—Davidson Berquist Jackson & Gowdy, LLP; Brian Siritzky

(57) ABSTRACT

In a framework wherein resources of a content provider may be delivered to clients from different domains, a method distributes the requests based on content-provider policies. In some cases, the domains include at least two distinct content delivery network (CDN) domains. The domains may include a content provider domain. Responsive to a request, either the content provider domain or one of the two CDN domains is selected, the selection being based at least in part on one or more policies set by the content provider.

25 Claims, 31 Drawing Sheets

U.S. PATENT DOCUMENTS

| | | |
|---|---|---|
| 4,594,704 A | 6/1986 | Ollivier |
| 4,726,017 A | 2/1988 | Krum et al. |
| 4,803,641 A | 2/1989 | Hardy et al. |
| 4,839,798 A | 6/1989 | Eguchi et al. |
| 4,847,784 A | 7/1989 | Clancey |
| 4,920,432 A | 4/1990 | Eggers |
| 4,922,417 A | 5/1990 | Churm et al. |
| 4,943,932 A | 7/1990 | Lark et al. |
| 4,949,187 A | 8/1990 | Cohen |
| 4,949,248 A | 8/1990 | Caro |
| 5,029,232 A | 7/1991 | Nall |
| 5,130,792 A | 7/1992 | Tindell et al. |
| 5,132,992 A | 7/1992 | Yurt et al. |
| 5,136,716 A | 8/1992 | Harvey |
| 5,172,413 A | 12/1992 | Bradley |
| 5,191,573 A | 3/1993 | Hair |
| 5,253,275 A | 10/1993 | Yurt et al. |
| 5,253,341 A | 10/1993 | Rozmanith |
| 5,287,499 A | 2/1994 | Nemes |
| 5,287,537 A | 2/1994 | Newmark et al. |
| 5,291,554 A | 3/1994 | Morales |
| 5,341,477 A | 8/1994 | Pitkin et al. |
| 5,371,532 A | 12/1994 | Gelman |
| 5,410,343 A | 4/1995 | Coddington |
| 5,414,455 A | 5/1995 | Hooper |
| 5,442,389 A | 8/1995 | Blahut |
| 5,442,390 A | 8/1995 | Hooper |
| 5,442,749 A | 8/1995 | Northcutt |
| 5,471,622 A | 11/1995 | Eadline |
| 5,475,615 A | 12/1995 | Lin |
| 5,508,732 A | 4/1996 | Bottomley |
| 5,515,511 A | 5/1996 | Nguyen |
| 5,519,435 A | 5/1996 | Anderson |
| 5,522,070 A | 5/1996 | Sumimoto |
| 5,528,281 A | 6/1996 | Grady |
| 5,539,621 A | 7/1996 | Kikinis |
| 5,542,087 A | 7/1996 | Neimat et al. |
| 5,544,313 A | 8/1996 | Shachnai |
| 5,544,327 A | 8/1996 | Dan |
| 5,550,577 A | 8/1996 | Verbiest |
| 5,550,863 A | 8/1996 | Yurt |
| 5,550,982 A | 8/1996 | Long |
| 5,557,317 A | 9/1996 | Nishio |
| 5,572,643 A | 11/1996 | Judson |
| 5,590,288 A | 12/1996 | Castor |
| 5,592,611 A | 1/1997 | Midgely |
| 5,594,910 A | 1/1997 | Filepp et al. |
| 5,603,026 A | 2/1997 | Demers et al. |
| 5,619,648 A | 4/1997 | Canale |
| 5,623,656 A | 4/1997 | Lyons |
| 5,625,781 A | 4/1997 | Cline |
| 5,627,829 A | 5/1997 | Gleeson et al. |
| 5,630,067 A | 5/1997 | Kindell |
| 5,633,999 A | 5/1997 | Clowes |
| 5,634,006 A | 5/1997 | Baugher et al. |
| 5,638,443 A | 6/1997 | Stefik et al. |
| 5,644,714 A | 7/1997 | Kikinis |
| 5,646,676 A | 7/1997 | Dewkett et al. |
| 5,649,186 A | 7/1997 | Ferguson |
| 5,659,729 A | 8/1997 | Nielsen |
| 5,666,362 A | 9/1997 | Chen |
| 5,671,279 A | 9/1997 | Elgamai |
| 5,675,734 A | 10/1997 | Hair |
| 5,682,512 A | 10/1997 | Tetrick |
| 5,699,513 A | 12/1997 | Feigen et al. |
| 5,708,780 A | 1/1998 | Levergood et al. |
| 5,712,979 A | 1/1998 | Graber et al. |
| 5,715,453 A | 2/1998 | Stewart |
| 5,721,914 A | 2/1998 | DeVries |
| 5,734,831 A | 3/1998 | Sanders |
| 5,740,423 A | 4/1998 | Logan et al. |
| 5,742,762 A | 4/1998 | Scholl |
| 5,751,961 A | 5/1998 | Smyk |
| 5,761,507 A | 6/1998 | Govett |
| 5,761,663 A | 6/1998 | Largarde et al. |
| 5,764,906 A | 6/1998 | Edelstein et al. |
| 5,774,660 A | 6/1998 | Brendel et al. |
| 5,774,668 A | 6/1998 | Choquier et al. |
| 5,777,988 A | 7/1998 | Cisneros |
| 5,777,989 A | 7/1998 | McGarvey |
| 5,784,058 A | 7/1998 | LaStrange et al. |
| 5,796,952 A | 8/1998 | Davis |
| 5,799,141 A | 8/1998 | Galipeau et al. |
| 5,802,106 A | 9/1998 | Packer |
| 5,802,291 A | 9/1998 | Balick et al. |
| 5,812,769 A | 9/1998 | Graber et al. |
| 5,815,664 A | 9/1998 | Asano |
| 5,826,031 A | 10/1998 | Nielsen |
| 5,828,847 A | 10/1998 | Gehr |
| 5,832,506 A | 11/1998 | Kuzma |
| 5,832,514 A | 11/1998 | Norin et al. |
| 5,835,718 A | 11/1998 | Blewett |
| 5,838,906 A | 11/1998 | Doyle et al. |
| 5,845,303 A | 12/1998 | Templeman |
| 5,856,974 A | 1/1999 | Gervais et al. |
| 5,862,339 A | 1/1999 | Bonnaure |
| 5,867,706 A | 2/1999 | Martin et al. |
| 5,867,799 A | 2/1999 | Lang et al. |
| 5,870,546 A | 2/1999 | Kirsch |
| 5,870,559 A | 2/1999 | Leshem et al. |
| 5,878,212 A | 3/1999 | Civanlar et al. |
| 5,884,038 A | 3/1999 | Kapoor |
| 5,890,171 A | 3/1999 | Blumer et al. |
| 5,893,116 A | 4/1999 | Simmonds et al. |
| 5,894,554 A | 4/1999 | Lowery et al. |
| 5,896,533 A | 4/1999 | Ramos et al. |
| 5,903,723 A | 5/1999 | Beck et al. |
| 5,907,704 A | 5/1999 | Gudmundson et al. |
| 5,913,028 A | 6/1999 | Wang et al. |
| 5,913,033 A | 6/1999 | Grout |
| 5,918,010 A | 6/1999 | Appleman et al. |
| 5,919,247 A | 7/1999 | Van Hoff et al. |
| 5,920,701 A | 7/1999 | Miller et al. |
| 5,931,904 A | 8/1999 | Banga |
| 5,933,832 A | 8/1999 | Suzuoka et al. |
| 5,935,207 A | 8/1999 | Logue et al. |
| 5,944,780 A | 8/1999 | Chase |
| 5,945,989 A | 8/1999 | Freishtat et al. |
| 5,956,489 A | 9/1999 | San Andres et al. |
| 5,956,716 A | 9/1999 | Kenner |
| 5,958,008 A | 9/1999 | Pogrebisky et al. |
| 5,961,596 A | 10/1999 | Takubo et al. |
| 5,966,440 A | 10/1999 | Hair |
| 5,968,121 A | 10/1999 | Logan et al. |
| 5,973,696 A | 10/1999 | Agranat et al. |
| 5,978,791 A | 11/1999 | Farber et al. |
| 5,983,214 A | 11/1999 | Lang et al. |
| 5,983,227 A | 11/1999 | Nazem et al. |
| 5,987,606 A | 11/1999 | Cirasole et al. |
| 5,991,809 A | 11/1999 | Kriegsman |
| 5,996,025 A | 11/1999 | Day |
| 6,002,720 A | 12/1999 | Yurt et al. |
| 6,003,030 A | 12/1999 | Kenner et al. |
| 6,006,264 A | 12/1999 | Colby et al. |
| 6,012,090 A | 1/2000 | Chung et al. |
| 6,014,686 A | 1/2000 | Elnozahy et al. |
| 6,014,698 A | 1/2000 | Griffiths |
| 6,018,516 A | 1/2000 | Packer |
| 6,021,426 A | 2/2000 | Douglis |
| 6,026,440 A | 2/2000 | Sharder et al. |
| 6,029,175 A | 2/2000 | Chow et al. |
| 6,029,176 A | 2/2000 | Cannon |
| 6,035,332 A | 3/2000 | Ingrassia, Jr. et al. |
| 6,038,216 A | 3/2000 | Packer |

| | | | | | | |
|---|---|---|---|---|---|---|
| 6,038,310 | A | 3/2000 | Hollywood et al. | 6,360,256 | B1 | 3/2002 | Lim |
| 6,038,610 | A | 3/2000 | Belfiore et al. | 6,370,571 | B1 | 4/2002 | Medin, Jr. |
| 6,041,307 | A | 3/2000 | Ahuja et al. | 6,370,580 | B2 | 4/2002 | Kriegsman |
| 6,041,324 | A | 3/2000 | Earl et al. | 6,398,245 | B1 | 6/2002 | Gruse |
| 6,044,405 | A | 3/2000 | Driscoll, III et al. | 6,405,252 | B1 | 6/2002 | Gupta et al. |
| 6,046,980 | A | 4/2000 | Packer | 6,405,257 | B1 | 6/2002 | Gersht et al. |
| 6,049,831 | A | 4/2000 | Gardell et al. | 6,412,000 | B1 | 6/2002 | Riddle et al. |
| 6,052,718 | A | 4/2000 | Gifford | 6,415,280 | B1 | 7/2002 | Farber et al. |
| 6,052,730 | A | 4/2000 | Feliciano et al. | 6,418,421 | B1 | 7/2002 | Hurtado |
| 6,065,051 | A | 5/2000 | Steele et al. | 6,421,726 | B1 | 7/2002 | Kenner et al. |
| 6,065,062 | A | 5/2000 | Periasamy et al. | 6,430,618 | B1 | 8/2002 | Karger et al. |
| 6,070,191 | A | 5/2000 | Narendran et al. | 6,442,549 | B1 | 8/2002 | Schneider |
| 6,081,829 | A | 6/2000 | Sidana | 6,456,630 | B1 | 9/2002 | Packer et al. |
| 6,092,112 | A | 7/2000 | Fukushige | 6,460,082 | B1 | 10/2002 | Lumelsky |
| 6,092,204 | A | 7/2000 | Baker | 6,460,085 | B1 | 10/2002 | Toporek et al. |
| 6,098,078 | A | 8/2000 | Gehani | 6,463,454 | B1 | 10/2002 | Lumelsky |
| 6,105,028 | A | 8/2000 | Sullivan et al. | 6,463,508 | B1 | 10/2002 | Wolf |
| 6,108,673 | A | 8/2000 | Brandt et al. | 6,470,389 | B1 | 10/2002 | Chung et al. |
| 6,108,703 | A | 8/2000 | Leighton et al. | 6,473,405 | B2 | 10/2002 | Ricciulli |
| 6,112,231 | A | 8/2000 | DeSimone et al. | 6,480,893 | B2 | 11/2002 | Kriegsman |
| 6,112,239 | A | 8/2000 | Kenner et al. | 6,484,143 | B1 | 11/2002 | Swildens et al. |
| 6,112,240 | A | 8/2000 | Pogue et al. | 6,484,204 | B1 | 11/2002 | Rabinovich |
| 6,115,357 | A | 9/2000 | Packer et al. | 6,490,580 | B1 | 12/2002 | Dey et al. |
| 6,115,752 | A | 9/2000 | Chauhan | 6,493,707 | B1 | 12/2002 | Dey et al. |
| 6,119,143 | A | 9/2000 | Dias et al. | 6,496,856 | B1 | 12/2002 | Kenner et al. |
| 6,125,388 | A | 9/2000 | Reisman | 6,502,125 | B1 | 12/2002 | Kenner et al. |
| 6,125,394 | A | 9/2000 | Rabinovich | 6,502,215 | B2 | 12/2002 | Raad et al. |
| 6,128,601 | A | 10/2000 | Van Horne et al. | 6,505,248 | B1 | 1/2003 | Casper et al. |
| 6,128,660 | A | 10/2000 | Grimm et al. | 6,529,477 | B1 | 3/2003 | Toporek et al. |
| 6,130,890 | A | 10/2000 | Leinwand et al. | 6,553,413 | B1 | 4/2003 | Leighton et al. |
| 6,134,583 | A | 10/2000 | Herriot | 6,553,420 | B1 | 4/2003 | Karger et al. |
| 6,144,375 | A | 11/2000 | Jain et al. | 6,557,054 | B2 | 4/2003 | Reisman |
| 6,144,702 | A | 11/2000 | Yurt et al. | 6,564,251 | B2 | 5/2003 | Katariya et al. |
| 6,144,996 | A | 11/2000 | Starnes et al. | 6,577,595 | B1 | 6/2003 | Counterman |
| 6,151,624 | A | 11/2000 | Teare et al. | 6,581,090 | B1 | 6/2003 | Lindbo et al. |
| 6,154,738 | A | 11/2000 | Call | 6,584,083 | B1 | 6/2003 | Toporek et al. |
| 6,154,744 | A | 11/2000 | Kenner et al. | 6,587,837 | B1 | 7/2003 | Spagna |
| 6,154,753 | A | 11/2000 | McFarland | 6,591,299 | B2 | 7/2003 | Riddle et al. |
| 6,154,777 | A | 11/2000 | Ebrahim | 6,611,862 | B2 | 8/2003 | Reisman |
| 6,163,779 | A | 12/2000 | Mantha et al. | 6,625,643 | B1 | 9/2003 | Colby et al. |
| 6,167,427 | A | 12/2000 | Rabinovich et al. | 6,654,344 | B1 | 11/2003 | Toporek et al. |
| 6,173,311 | B1 | 1/2001 | Hassett et al. | 6,654,807 | B2 | 11/2003 | Farber et al. |
| 6,173,322 | B1 | 1/2001 | Hu | 6,658,464 | B2 | 12/2003 | Reisman |
| 6,178,160 | B1 | 1/2001 | Bolton et al. | 6,665,706 | B2 | 12/2003 | Kenner et al. |
| 6,181,867 | B1 | 1/2001 | Kenner et al. | 6,665,726 | B1 | 12/2003 | Leighton et al. |
| 6,185,598 | B1 | 2/2001 | Farber | 6,691,148 | B1 | 2/2004 | Zinky et al. |
| 6,185,619 | B1 | 2/2001 | Joffe et al. | 6,694,358 | B1 | 2/2004 | Swildens et al. |
| 6,189,030 | B1 | 2/2001 | Kirsch et al. | 6,699,418 | B2 | 3/2004 | Okada et al. |
| 6,189,039 | B1 | 2/2001 | Harvey | 6,708,137 | B2 | 3/2004 | Carley |
| 6,195,680 | B1 | 2/2001 | Goldszmidt | 6,718,328 | B1 | 4/2004 | Norris |
| 6,205,120 | B1 | 3/2001 | Packer et al. | 6,741,563 | B2 | 5/2004 | Packer |
| 6,226,618 | B1 | 5/2001 | Downs | 6,751,673 | B2 | 6/2004 | Shaw |
| 6,226,642 | B1 | 5/2001 | Beranek et al. | 6,754,699 | B2 | 6/2004 | Swildens et al. |
| 6,230,196 | B1 | 5/2001 | Guenthner et al. | 6,754,706 | B1 | 6/2004 | Swildens et al. |
| 6,243,760 | B1 | 6/2001 | Armbruster et al. | 6,763,377 | B1 | 7/2004 | Belknap et al. |
| 6,249,810 | B1 | 6/2001 | Toporek et al. | 6,763,388 | B1 | 7/2004 | Tsimelzon |
| 6,256,675 | B1 | 7/2001 | Rabinovich | 6,778,502 | B2 | 8/2004 | Ricciulli |
| 6,263,313 | B1 | 7/2001 | Milsted | 6,785,704 | B1 | 8/2004 | McCanne |
| 6,266,699 | B1 | 7/2001 | Sevcik | 6,799,221 | B1 | 9/2004 | Kenner et al. |
| 6,269,394 | B1 | 7/2001 | Kenner et al. | 6,801,576 | B1 | 10/2004 | Haldeman et al. |
| 6,272,566 | B1 | 8/2001 | Craft | 6,834,306 | B1 | 12/2004 | Tsimelzon |
| 6,275,470 | B1 | 8/2001 | Ricciulli | 6,842,604 | B1 | 1/2005 | Cook et al. |
| 6,282,569 | B1 | 8/2001 | Wallis et al. | 6,859,791 | B1 | 2/2005 | Spagna |
| 6,282,574 | B1 | 8/2001 | Voit | 6,870,851 | B1 | 3/2005 | Leinwand et al. |
| 6,286,045 | B1 | 9/2001 | Griffiths et al. | 6,874,032 | B2 | 3/2005 | Gersht et al. |
| 6,298,041 | B1 | 10/2001 | Packer | 6,901,604 | B1 | 5/2005 | Kiraly |
| 6,311,214 | B1 | 10/2001 | Rhoads | 6,915,329 | B2 | 7/2005 | Kriegsman |
| 6,314,565 | B1 | 11/2001 | Kenner et al. | 6,928,442 | B2 | 8/2005 | Farber et al. |
| 6,327,622 | B1 | 12/2001 | Jindal et al. | 6,934,255 | B1 | 8/2005 | Toporek et al. |
| 6,330,602 | B1 | 12/2001 | Law et al. | 6,950,623 | B2 | 9/2005 | Brown et al. |
| 6,332,195 | B1 | 12/2001 | Green et al. | 6,963,910 | B1 | 11/2005 | Belknap |
| 6,338,044 | B1 | 1/2002 | Cook et al. | 6,963,980 | B1 | 11/2005 | Mattsson |
| 6,347,085 | B2 | 2/2002 | Kelly | 6,963,981 | B1 | 11/2005 | Bailey et al. |

| | | | | | | |
|---|---|---|---|---|---|---|
| 6,965,890 | B1 | 11/2005 | Dey et al. | 2006/0143293 | A1 | 6/2006 Freedman |
| 6,970,432 | B1 | 11/2005 | Hankins et al. | | | |
| 6,973,485 | B2 | 12/2005 | Ebata et al. | | FOREIGN PATENT DOCUMENTS | |
| 6,973,490 | B1 | 12/2005 | Robertson et al. | | | |
| 6,981,050 | B1 | 12/2005 | Tobias et al. | CA | 2202572 | 10/1998 |
| 6,981,180 | B1 | 12/2005 | Bailey et al. | CA | 2335661 | 9/2001 |
| 6,996,616 | B1 | 2/2006 | Leighton et al. | CA | 2335662 | 9/2001 |
| 7,003,572 | B1 | 2/2006 | Lownsbrough et al. | CA | 2467998 | 4/2006 |
| 7,007,089 | B2 | 2/2006 | Freedman | CN | ZL99810853.7 | 8/2004 |
| 7,010,578 | B1 | 3/2006 | Lewin et al. | EP | 0 800 143 A | 10/1997 |
| 7,012,900 | B1 | 3/2006 | Riddle | EP | 0801487 A2 | 10/1997 |
| 7,039,633 | B1 | 5/2006 | Dey et al. | EP | 0 817 020 A2 | 1/1998 |
| 7,047,300 | B1 | 5/2006 | Oehrke et al. | EP | 0817444 | 1/1998 |
| 7,054,935 | B2 | 5/2006 | Farber et al. | EP | 0824236 A2 | 2/1998 |
| 7,058,706 | B1 | 6/2006 | Iyer et al. | EP | 0865180 A2 | 9/1998 |
| 7,069,177 | B2 | 6/2006 | Carley | EP | 1104555 | 6/2001 |
| 7,096,266 | B2 | 8/2006 | Lewin et al. | GB | 2 281 793 | 3/1995 |
| 7,103,564 | B1 | 9/2006 | Ehnebuske | GB | 2353877 | 3/2004 |
| 7,103,645 | B2 | 9/2006 | Leighton et al. | IL | 140935 | 3/2006 |
| 7,110,984 | B1 | 9/2006 | Spagna | JP | 5-130144 | 5/1993 |
| 7,117,259 | B1 | 10/2006 | Rohwer | JP | 05162529 | 6/1993 |
| 7,185,052 | B2 * | 2/2007 | Day .......... 709/203 | JP | 7066829 | 3/1995 |
| 7,188,085 | B2 | 3/2007 | Pelletier | JP | 08328583 | 9/1996 |
| 7,206,748 | B1 | 4/2007 | Gruse | JP | 10-027148 | 1/1998 |
| 7,254,645 | B2 | 8/2007 | Nishi | JP | 10-70571 | 3/1998 |
| 7,373,644 | B2 | 5/2008 | Aborn | JP | 10-093552 | 4/1998 |
| 7,577,754 | B2 | 8/2009 | Garcia-Luna-Aceves et al. | JP | 10-126445 | 5/1998 |
| 2001/0029525 | A1 | 10/2001 | Lahr | JP | 2000259539 | 9/2000 |
| 2001/0056500 | A1 | 12/2001 | Farber et al. | JP | 2001-053793 | 2/2001 |
| 2002/0018449 | A1 | 2/2002 | Ricciulli | JP | 2002522995 | 7/2002 |
| 2002/0023164 | A1 | 2/2002 | Lahr | JP | 3566626 | 6/2004 |
| 2002/0023165 | A1 | 2/2002 | Lahr | JP | 2005124165 | 5/2005 |
| 2002/0040404 | A1 | 4/2002 | Lahr | JP | 3762649 | 1/2006 |
| 2002/0042817 | A1 | 4/2002 | Lahr | KR | 1999-72167 | 9/1999 |
| 2002/0046273 | A1 | 4/2002 | Lahr et al. | NI | 176482 | 8/2003 |
| 2002/0046405 | A1 | 4/2002 | Lahr | WO | WO 96/42041 | 12/1996 |
| 2002/0049857 | A1 | 4/2002 | Farber et al. | WO | WO 97/11429 | 3/1997 |
| 2002/0059592 | A1 | 5/2002 | Kiraly | WO | WO 97/29423 | 8/1997 |
| 2002/0066038 | A1 | 5/2002 | Mattsson | WO | WO 98/04985 | 2/1998 |
| 2002/0073199 | A1 | 6/2002 | Levine et al. | WO | WO 98/06033 | 2/1998 |
| 2002/0078233 | A1 | 6/2002 | Biliris | WO | WO 99 09726 A | 2/1999 |
| 2002/0082999 | A1 | 6/2002 | Lee et al. | WO | WO 99 29083 A | 6/1999 |
| 2002/0083124 | A1 | 6/2002 | Knox et al. | WO | WO 00/14633 | 3/2000 |
| 2002/0099850 | A1 | 7/2002 | Farber et al. | WO | WO 00 52594 A | 9/2000 |
| 2002/0124080 | A1 | 9/2002 | Leighton et al. | WO | WO 00/62502 | 10/2000 |
| 2002/0129134 | A1 | 9/2002 | Leighton et al. | WO | WO 01/35601 | 5/2001 |
| 2002/0131645 | A1 | 9/2002 | Hamilton | WO | WO 01/52497 | 7/2001 |
| 2002/0143798 | A1 | 10/2002 | Lisiecki et al. | | | |
| 2002/0143888 | A1 | 10/2002 | Lisiecki et al. | | | |
| 2002/0147774 | A1 | 10/2002 | Lisiecki et al. | | | |
| 2002/0163882 | A1 | 11/2002 | Bornstein et al. | | | |
| 2002/0199016 | A1 | 12/2002 | Freedman | | | |
| 2003/0009444 | A1 | 1/2003 | Eidler et al. | | | |
| 2003/0018966 | A1 | 1/2003 | Cook et al. | | | |
| 2003/0028623 | A1 | 2/2003 | Hennessey et al. | | | |
| 2003/0028626 | A1 | 2/2003 | Hennessey et al. | | | |
| 2003/0028777 | A1 | 2/2003 | Hennessey et al. | | | |
| 2003/0055972 | A1 | 3/2003 | Fuller et al. | | | |
| 2003/0061263 | A1 | 3/2003 | Riddle | | | |
| 2003/0061280 | A1 | 3/2003 | Bulson et al. | | | |
| 2003/0078888 | A1 | 4/2003 | Lee et al. | | | |
| 2003/0078889 | A1 | 4/2003 | Lee et al. | | | |
| 2003/0105604 | A1 | 6/2003 | Ash et al. | | | |
| 2003/0149581 | A1 | 8/2003 | Chaudhri | | | |
| 2004/0022194 | A1 | 2/2004 | Ricciulli | | | |
| 2004/0039798 | A1 | 2/2004 | Hotz et al. | | | |
| 2004/0139097 | A1 | 7/2004 | Farber et al. | | | |
| 2004/0177148 | A1 | 9/2004 | Tsimelzon | | | |
| 2005/0033858 | A1 | 2/2005 | Swildens et al. | | | |
| 2005/0038851 | A1 | 2/2005 | Kriegsman | | | |
| 2005/0100027 | A1 | 5/2005 | Leinwand et al. | | | |
| 2005/0114296 | A1 | 5/2005 | Farber et al. | | | |
| 2005/0262104 | A1 | 11/2005 | Robertson et al. | | | |

OTHER PUBLICATIONS

"Patent Abstracts of Japan, Method and Device for Repeating and Converting Information", (Appln. No. JP1996 0328583) (Pub. No. JP10171727), Jun. 26, 1998.

Aggarwal, A. et al., "Performance of Dynamic Replication Schemes for an Internet Hosting Service". Technical Report, AT&T Labs, Oct. 1998.

Awerbuch, B. et al., Distributed Paging for General Networks. In Proc. of the 7th ACM-SIAM Symposium on Discrete Algorithms, pp. 574-583, Jan. 1996.

Awerbuch, et al., Competitive Distributed File Allocation. in Proc. of the 25th Ann. ACM Symp. on Theory of Computing, pp. 164-173, May 1993.

Baentsch, M, et al. "Enhancing the Web's Infrastructure: From Caching to Replication." IEEE Internet Computing, 1(2):18-27, Mar. 1997.

Bartal, Y., et al., "Competitive Algorithms for Distributed Data Management", 24th Annual ACM STOC, May 1992, Victoria, B. C. Canada.

Cate, V. "Alex: a global file system", in Proc. Usenix Conf. on File Systems, May 1992, pp. 1-11.

Communication (1 page) and European Search Report (with Annex) for Appln. No. EP 02799672.7, dated Apr. 17, 2008.

Gadde, S., et al., "Reduce, reuse, recycle: An approach to building large internet caches," in Workshop on Hot Topics in Operating Systems (HotOS), Apr. 1997, pp. 93-98.

Krishnamurthy, B. et al., Study of piggyback cache validation for proxy caches in the World Wide Web, in: Symp. on Internet Technology and Systems, USENIX Association, Dec. 1997.

Patent Abstracts of Japan, "Server System for Internet", Pub. No. 10-027148, pub. date Jan. 27, 1998, Applicant: Hitachi, computer translation, 12 pgs.

Patent Abstracts of Japan, "Communication Connection Method With a Plurality of Hosts having Common Identifier", Appln. No. JP 08-20114, Pub. No. 10-093552, Applicant Nippon Telegraph & Telephone, published Apr. 1998.

Patent Abstracts of Japan, "Domain Name Solving Method and Domain Name Solving System", Appln. No. JP19990223763, Pub. No. 2001-053793, Applicant Nippon Telegraph & Telephone, published Feb. 23, 2001.

Rabinovich, M. et al., "Dynamic Replication on the Internet Work Project No. 3116-17-7006", AT&T Labs Research, Mar. 5, 1998.

Rabinovich, M. et al., RaDaR: A Scalable Architecture for a Global Web Hosting Service, WWW8, May 1999.

SNMPV2 Working Group J Case SNMP Research et al: "Management Information Base for Version 2 of the Simple Network Management Protocol (SNMPv2); rfc1907.txt" IETF Standard, Internet Engineering Task Force, IETF, CH, Jan. 1996.

"Content Management Technology/Industry News," Content Technologies Trends and Advice, Gilbane Report, News for Jun. 1999 [21 pages].

"Exporting Web Server Final Report," http://www.cs.technion.ac.il/Labs/Lccn/projects/spring97/project4/final_report.html, Spring 1997 (downloaded Jul. 7, 2007).

"Patent Abstracts of Japan, Electronic Mail Multiplexing System and Communication Control Method in the System" (Appln. No. JP19930162529), (Jun. 30, 1993) (Pub. No. JP 7066829).

Adler, R. M., "Distributed Coordination Models for Client/Server Computing," Computer 28, 4 (Apr. 1995), 14-22.

Andresen et al., "SWEB: Towards a Scalable World Wide Web Server on Multicomputers", Proc. IPPS, (Apr. 15, 1996), 850-856.

Andresen, D., et al., Multiprocessor scheduling with client resources to improve the response time of WWW applications, Proc. 11th Int'l Conf. on Supercomputing (Austria, Jul. 1997). ICS '97. ACM Press, NY, NY, 92-99.

Basturk, E., et al., "Using network layer anycast for load distribution in the Internet," Tech. Rep., IBM T.J. Watson Research Center, Jul. 1997 (21 pgs.).

Berners-Lee et al., RFC 1738—Uniform Resource Locators, Dec. 1994.

Bestavros, A., "Speculative Data Dissemination and Service to Reduce Server Load, Network Traffic and Service Time in Distributed Information Systems", In Proc. ICDE '96: The 1996 Int'l Conf. on Data Engineering, (Mar. 1996), 4 pages.

Bestavros, et al., "Server-Initiated Document Dissemination for the WWW," IEEE Data Engineering Bulletin 19(3):3-11, Sep. 1996.

Bhattacharjee et al., "Application-layer anycasting," in Proc. IEEE INFOCOM '97, Apr. 1997.

Braun, H., et al., "Web traffic characterization: an assessment of the impact of caching documents from NCSA's web server," Comput. Netw. ISDN Syst. 28, 1-2 (Dec. 1995), 37-51.

Brisco, T. P. RFC 1794: DNS support for load balancing, Apr. 1995.

Carter et al., "Dynamic server selection using bandwidth probing in wide-area networks," Tech. Rep. BU-CS-96-007, Comp. Sci. Dept., Boston University, Mar. 1996.

Carter, J. Lawrence et al., "Universal Classes of Hash Functions", Journal of Computer and System Sciences, vol. 18, No. 2, (Apr. 1979), 143-154.

Chankhunthod, A. et al., "A Hierarchical Internet Object Cache", Proc. of the 1996 USENIX Technical Conf., Jan. 1996, pp. 153-163.

Cisco Systems, Inc., Cisco DistributedDirector 2500 Series Installation and Configuration Guide, pp. xix-xxii; 1-1 to 1-12; 6-1 to 6-18; 7-1 to 7-18; 8-1 to 8-24, Dec. 1997, downloaded Apr. 2007: http://www.cisco.com/univercd/cc/td/doc/product/iaabu/distrdir/dd2501/.

Cisco Systems, Inc., Cisco DistributedDirector 4700-M Installation and Configuration Guide, pp. xix-xxii; 1-1 to 1-14; 7-1 to 7-18, 8-1 to 8-20; Dec. 1997, [downloaded Apr. 2007 from http://www.cisco.com/univercd/cc/td/doc/product/iaabu/distrdir/dd4700m/].

Cohen, J., et al., "Cache Array Routing Protocol v1.1", Sep. 29, 1997; http://tools.ietf.org/id/draft-vinod-carp-v1-01.txt (Last-Modified: Wed, Oct. 1, 1997).

Colajanni, M. and Yu, P. S. 1997. Adaptive TTL schemes for load balancing of distributed Web servers. SIGMETRICS Perform. Eval. Rev. 25, 2 (Sep. 1997), 36-42.

Crovella et al., Dynamic server selection in the Internet, 3rd IEEE Workshop on the Arch. and Implementation of High Performance Computer Sys. '95, pp. 158-162, Aug. 1995.

Danzig, P. B., et al., "An analysis of wide-area name server traffic: a study of the Internet Domain Name System," Conf. Proc. Communications Architectures & Protocols (Aug. 1992). D. Oran, Ed. SIGCOMM '92. ACM Press, New York, NY, 281-292.

De Bra, P.M.E., et al., "Information Retrieval in the World Wide Web: Making Client-Based Searching Feasible", Computer Networks and ISDN Systems, NL, North Holland Publishing, Amsterdam, vol. 27, No. 2, ISSN: 0169-7552, (Nov. 1, 1994), 183-192.

Deering, S. E., et al, "Multicast routing in datagram internetworks and extended LANs," ACM Trans. Comput. Syst. 8, 2 (May 1990), 85-110.

Devine, R., "Design and Implementation of DDH: A Distributed Dynamic Hashing Algorithm", In Proc. 4th Int'l Conf. on Foundations of Data Organizations and Algorithms, (Oct. 1993), 101-114.

Doi, K. "Super Proxy Script—How to make distributed proxy servers by URL hashing," Sharp Corp., http://naragw.sharp.co.jp/sps/, dates unknown (1996-2000), download Jul. 7, 2007.

Feeley, M., et al., "Implementing Global Memory Management in a Workstation Cluster", In Proc. 15th ACM Symp. on Operating Systems Principles, (Dec. 1995), 201-212.

Floyd, S., et al., "A Reliable Multicast Framework for Light-Weight Sessions and Application Level Framing", In Proc. of ACM SIGCOMM '95, 342-356, Aug. 1995.

Fox, A., et al,, "Cluster-based scalable network services", Proc. 16th ACM Symp. on Operating Systems Principles (Saint Malo, France, Oct. 5-8, 1997). W. M. Waite, Ed. SOSP '97. ACM Press, New York, NY, 78-91.

Fredman, M., et al., "Storing a Sparse Table with 0(1) Worst Case Access Time", J. ACM, vol. 31, No. 3, (Jul. 1984), 538-544.

Goldszmidt, et al., "Load Distribution for Scalable Web Servers: Summer Olympics 1996—A Case Study," In Proc. 8th IFIP/IEEE Int'l Workshop on Distributed Systems: Operations and Management, Sydney, Australia, Oct. 1997.

Grigni, M., et al., "Tight Bounds on Minimum Broadcasts Networks", SIAM J. Disc. Math. 4 (May 1991), 207-222.

Gulbrandsen, A., et al., "A DNS RR for specifying the location of services (DNS SRV)", Network Working Group, RFC 2052, Oct. 1996.

Guyton et al., "Locating nearby copies of replicated Internet servers," Proc. ACM SIGCOMM '95, pp. 288-298, Oct. 1995.

Gwertzman, J., et al., "The Case for Geographical Push-Caching", Proc. Workshop on Hot OS '95, (May 4, 1995), 51-55.

Gwertzman, J., et al., "World-Wide Web Cache Consistency", Proc. 1996 USENIX Tech. Conf., pp. 141-151, San Diego, CA, Jan. 1996.

Jeffery, C., et al., "Proxy sharing proxy servers." In Proc. IEEE etaCOM Conf., pp. 116-119, May 1996.

Karger, D., et al., "Consistent Hashing and Random Trees: Distributed Caching Protocols for Relieving Hot Spots on the World Wide Web", in Proc. 29th Annual ACM Symp. on Theory of Computing, (May 1997), 654-663.

Kwan et al., NCSA's World Wide Web Server: Design and Performance, IEEE, pp. 68-74, Nov. 1995.

Litwin, W., et al., "LH*—A Scalable, Distributed Data Structure", ACM Trans. on Database Systems, vol. 21, No. 4, pp. 480-525, Dec. 1996.

Luotonen et al., World-Wide Web Proxies, CERN, Apr. 1994 (modified May 24, 1994).

Malpani, R., et al., "Making World Wide Web Caching Servers Cooperate", in Proc. 4th Int'l. World Wide Web Conf. (Dec. 1995), 10 pages (downloaded from http://www.w3.org/Conferences/WWW4/Papers/59/ on Jul. 7, 2007).

Mockapetris et al., "Development of the Domain Name System," Proc. SIGCOMM '88 Computer Communications Review, vol. 18, No. 4, Aug. 1988.

Mockapetris, P., RFC 1034: Domain Names—Concepts and Facilities, Nov. 1987.

Mockapetris, P., RFC 1035: Domain Names—Implementation and Specification, Nov. 1987.

Mourad et al., "Scalable Web Server Architectures," iscc, 2nd IEEE Symposium on Computers and Communications (ISCC '97), Jul. 1997, pp. 12-16.

Nisan, N. 1990. Pseudorandom generators for space-bounded computations. In Proc. 22nd Annual ACM Symp. on theory of Computing (Baltimore, MD, U.S., May 13-17, 1990). H. Ortiz, Ed. STOC '90. ACM Press, New York, NY, 204-212.

Oguchi et al., A Study of Caching Proxy Mechanisms Realized on Wide Area Distributed Networks, High Performance Distributed Computing, 5th Int'l Symp., pp. 443-449, Aug. 1996.

Palmer, M., et al., "Fido: A Cache that Learns to Fetch", In Proc. the 17th Int'l Conf. on Very Large Data Bases, (Sep. 1991), 255-264.

Panigrahy, R., "Relieving Hot Spots on the World Wide Web", Master's thesis, MIT EECS, Jun. 1997, pp. 1-66.

Peleg, D., et al., "The Availability of Quorum Systems", Information and Computation, 123, (Dec. 1995), 210-223.

Petri S., et al., "Load Balancing and Fault Tolerance in Workstation Clusters. Migrating Groups of Communicating Processes.", Operating Systems Review, vol. 29, No. 4, Oct. 1995, pp. 25-36.

Plaxton, G. C., et al., "Fast Fault-Tolerant Concurrent Access to Shared Objects", In Proc. 37th IEEE Symp. of Foundations of Computer Science, (Oct. 1996), 570-579.

Postel, RFC 1591—Domain Name System Structure and Delegation, Mar. 1994.

Rabin, M. O., 1989, "Efficient dispersal of information for security, load balancing, and fault tolerance," J. ACM 36, 2 (Apr. 1989), 335-348.

Ross, K.W., "Hash-Routing for Collections of Shared Web Caches", IEEE Network Magazine, 11, 7:37-44, Nov.-Dec. 1997.

Schemers, R., "Ibnamed—A load balancing name server written in Perl," 1995 LISA IX—Sep. 17-22, 1995—Monterey, CA.

Schuba, Christoph; "Addressing Weaknesses in the Domain Name System Protocol," COAST Laboratory, Dept. of Computer Sciences, Purdue University; West Layfayette, IN; Aug. 1993, p. 1-87.

Smith, "What can Archives offer the World Wide Web?", Technical Report 11, University of Kent, Computing Laboratory, University of Kent, Canterbury, UK, Mar. 1994.

Tarjan, Robert E., et al., "Storing a Sparse Table", Commun.ACM, 22, 11, (Nov. 1979), 606-611.

Thaler, D. G. and Ravishankar, C. V. 1998. Using name-based mappings to increase hit rates. IEEE/ACM Trans. Netw. 6, 1 (Feb. 1998), 1-14.

Vitter, J. S., et al., "Optimal Prefetching via Data Compression," Proc. 32nd Annual IEEE Symposium on Foundations of Computer Science (Oct. 1991).

Vixie, Paul; "Name Server Operations Guide for BIND," Internet Software Consortium; La Honda, CA; p. SMM:10-2—SMM:10-30 (undated, 1996).

Wessels, Intelligent Caching for World-Wide Web Objects, Masters Thesis, University of Colorado, Jan. 1995 (also presented at INET '95 in Jun. 1995).

Yao, A. C. 1981. Should Tables Be Sorted?. J. ACM 28, 3 (Jul. 1981), 615-628.

Carter et al., Server selection using dynamic path characterization in Wide-Area Networks, IEEE INFOCOM '97, Apr. 7-12, 1997 (pp. 1014-1021).

Cormen, T. H., et al., "Introduction to Algorithms", The MIT Press, Cambridge, Massachusetts, (1994), 219-243, 991-993.

Fox, A., "A Framework for Separating Server Scalability and Availability from Internet Application Functionality," PhD thesis, University of California, Berkeley, Dec. 1998.

Office Action from Chinese Patent Office for application non. 02821371.8, Jan. 29, 2010, in Chinese with translation.

Office Action from Chinese Patent Office for application non. 02821371.8, Jan. 4, 2008, in Chinese with translation.

Office Action from Chinese Patent Office for application non. 02821371.8, May 8, 2009, in Chinese with translation.

Claims (amended) filed by applicant in Japanese Patent Application No. 2003-531370, Jan. 17, 2008 (English translation provided by foreign associate) [12 pgs.].

Claims (amended) filed by applicant in KIPO for Korean Patent Application No. KR 10 2004 7004613, Jul. 24, 2009 (English translation provided by foreign associate) [10 pgs.].

European Patent Application No. 02799672.7, file history as of Apr. 23, 2010 (downloaded from EPO).

International Preliminary Examination Report (IPER), Form PCT/IPEA/409, for PCT/US02/30921, Oct., 2005 [5 pgs.].

International Search Report (ISR), Form PCT/ISA/210, for PCT/US02/30921, Jan. 28, 2004 [5 pgs.].

Japanese Patent Office (JPO) "Notice of Reasons for Rejection", for Japanese Patent Application No. 2003-531370, Jul. 17, 2007, "Organized Translation" provided by foreign associate [2 pgs.].

Japanese Patent Publication JP 10-70571,Jun., 1997, International Business Machines Corporation, English translation provided with Office Action [34 pgs.].

Japanese Patent Publication JP 5-130144, Published May 5, 1993, Fujitsu Ltd., English translation provided with Office Action [9 pgs.].

Korean Intellectual Property Office (KIPO), Notice of Preliminary Rejection (Non-Final)) for Korean Patent Application No. KR 10 2004 7004613, Apr. 24, 2009, English translation (provided by foreign associate) [5 pgs.].

Office Action from KIPO for Korean Appin. No. 10-2004-7004613,. Apr. 24, 2009 [and non-official translation].

Office Action for Chinese (PRC) patent application no. 02821371.8, from The Patent Office of the People's Republic of China, dated Aug. 3, 2010 (non-official translation, 9 pgs., including 2 pg. summary).

* cited by examiner

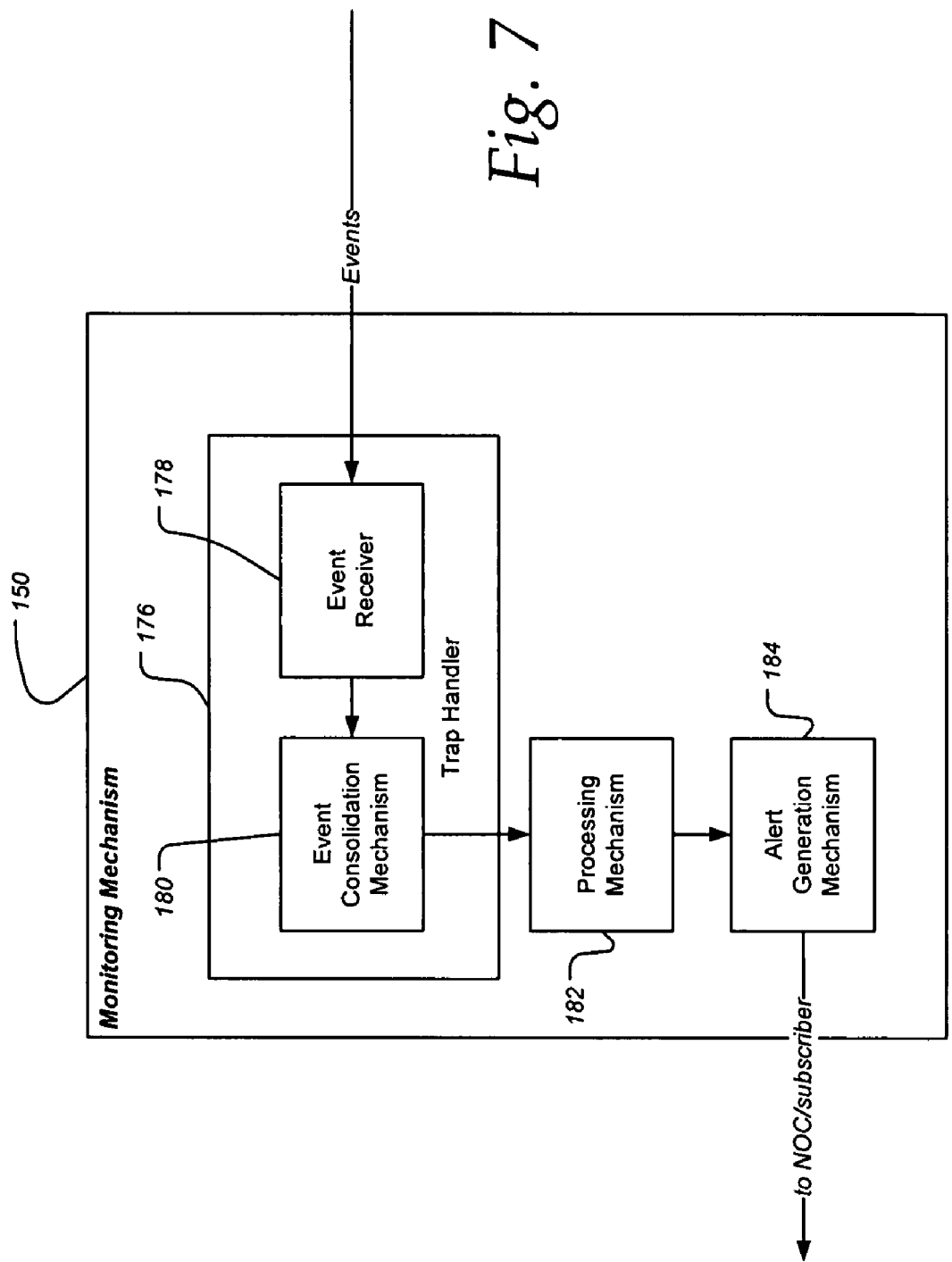

MODIFY STATIC SERVER(S)

| NICKNAME (OPTIONAL) | IP ADDRESS | | TTL | LOAD SHARE | SHED FRACTION | ON LINE |
|---|---|---|---|---|---|---|
| NEW YORK | 10.0.0.1 | | 5m | 1.0 | 0.2 | ☑ |
| LONDON | 10.0.0.2 | | 5m | 1.0 | 0.3 | ☑ |
| | | | 5m | 1.0 | 0.0 | ☑ |
| | | | 5m | 1.0 | 0.0 | ☑ |
| | | | 5m | 1.0 | 0.0 | ☑ |

[ OK ] [ CANCEL ] | [ DELETE ] CHECKED STATIC SERVER(S)

FIG. 9(a)

MODIFY DYNAMIC SERVER(S)

| NICKNAME | IP ADDRESS | TTL | SERVER STATUS URL | USER NAME | PASSWORD |
|---|---|---|---|---|---|
| LONDON | 10.0.0.3 | 5m | http://SERVER | PAUL | ******** |
| | | 5m | http://SERVER | | |
| | | 5m | http://SERVER | | |
| | | 5m | http://SERVER | | |
| | | 5m | http://SERVER | | |

[ OK ] [ CANCEL ] | [ DELETE ] CHECKED DYNAMIC SERVER(S)

FIG. 9(b)

| MODIFY CNAMES(S) | | |
| --- | --- | --- |
| NICKNAME (OPTIONAL) | CNAME | TTL |
| SYDNEY | CUSTOMER.FOOTPRINT.NET | 5m |
| | | 5m |
| | | 5m |
| | | 5m |
| | | 5m |
| OK | CANCEL | DELETE | CHECKED CNAME(S) |

FIG. 9(c)

RESOURCES FOR "US_INT_SPLIT1:1"[MODIFIED]

RESOURCES

IP ADDRESS(ES)

| NICKNAME | IP ADDRESS | TTL |
|---|---|---|
| LONDON | 10.2.2.2 | 1D |
| NEW YORK | 10.0.0.1 | 1D |

CNAME(S)

| NICKNAME | CNAME | TTL |
|---|---|---|
| SYDNEY | CUSTOMER.FOOTPRINT.NET | 5M |

STATIC SERVER(S)

DYNAMIC SERVER(S) LOAD SHARE(S)

| NICKNAME | IP ADDRESS | TTL | SERVER STATUS | | | DEFAULT | |
|---|---|---|---|---|---|---|---|
| | | | URL | URL DOWN LOAD SHARE | SHED FRACTION | LOAD SHARE | SHED FRACTION |
| LONDON | 10.0.0.3 | 5M | HTTP://*.*;***@10.0.0.1/ | 0 | 0 | 1 | 0 |

OVERFLOW SERVER(S)

| NICKNAME | IP ADDRESS/CNAME | TTL | LOAD SHARE |
|---|---|---|---|
| CDN_SERVICE | CUSTOMER.FOOTPRINT.NET | 5M | 1 |

MANAGED SERVER(S) MONITORING LOAD FEEDBACK

*FIG. 10(c)*

RESOURCE FOR "EXAMPLE1.2"

RESOURCES
- IP ADDRESS(ES)
- CNAME(S)
- MX RECORD(S)
- STATIC SERVER(S)
- DYNAMIC SERVER(S) LOAD SHARE(S)
- OVERFLOW SERVER(S)

| NICKNAME | IP ADDRESS/CNAME | TTL | LOAD SHARE |
|---|---|---|---|
| DL.SUBSCRIBER.COM.C.FOOTPRINT.NET | DL.SUBSCRIBER.COM.C.FOOTPRINT.NET | 5M | 1 |

MANAGED SERVER(S) MONITORING LOAD FEEDBACK

| NICKNAME | IP ADDRESS | TTL | MONITORED | LOAD FEEDBACK | LOAD SHARE | SHED FRACTION |
|---|---|---|---|---|---|---|
| LONDON | 10.0.0.3 | 5M | YES | NO | 1 | 0 |
| NEW YORK | 10.0.0.1 | 5M | YES | NO | 1 | 0 |
| SAN FRANCISCO | 10.0.0.2 | 5M | YES | NO | 2.5 | 0 |

- NS RECORD(S)

*FIG. 10(e)*

☐ MODIFY SERVER SET RESOURCES FOR "www"
LOAD SHARING SERVER SET PARAMETERS
NUMBER OF ANSWERS REQUIRED [1]        NUMBER OF ANSWERS DESIRED [1]

STATIC LOAD SHARING SERVER(S)
NO RESOURCES DEFINED. ADD A RESOURCE WITH "RESOURCES WINDOW".
MANAGED LOAD SHARING SERVER(S)

| TIER | NICKNAME | IP ADDRESS / CNAME | TTL | MONITORED | LOAD FEEDBACK | LOAD SHARE | SHED FRACTION |
|---|---|---|---|---|---|---|---|
| 1 ▶ | NY | 10.0.0.2 | 5M | NO | NO | 1 | 0.8 |
| 1 ▶ | SF | 10.0.0.1 | 5M | NO | NO | 2 | 0.8 |

OVERFLOW SERVER(S)

| | NICKNAME | IP ADDRESS / CNAME | TTL | LOAD SHARE |
|---|---|---|---|---|
| INCLUDE ▶ | LEVEL 3 CDN | DEMO.C.FOOTPRINT.NET | 5M | 1.5 |
| INCLUDE ▶ | OTHER CDN | DEMO.OTHERCDN.NET | 5M | 1 |

[CANCEL]

*FIG. 10(I)*

☐ MODIFY SERVER SET RESOURCES FOR "www"
LOAD SHARING SERVER SET PARAMETERS
NUMBER OF ANSWERS REQUIRED [1]   NUMBER OF ANSWERS DESIRED [1]

STATIC LOAD SHARING SERVER(S)
NO RESOURCES DEFINED. ADD A RESOURCE WITH "RESOURCES WINDOW".
MANAGED LOAD SHARING SERVER(S)

| TIER | NICKNAME | IP ADDRESS / CNAME | TTL | MONITORED | LOAD FEEDBACK | LOAD SHARE | SHED FRACTION |
|---|---|---|---|---|---|---|---|
| 1 ▶ | WWW.DEMO.COM.CDN1.NET | WWW.DEMO.COM.CDN1.NET | 5M | NO | NO | 1 | 0 |
| 1 ▶ | WWW.DEMO.COM.CDN2.NET | WWW.DEMO.COM.CDN2.NET | 5M | NO | NO | 1 | 0 |
| 1 ▶ | WWW.DEMO.COM.CDN3.NET | WWW.DEMO.COM.CDN3.NET | 5M | NO | NO | 1 | 0 |

OVERFLOW SERVER(S)
NO RESOURCES DEFINED. ADD A RESOURCE WITH "RESOURCES WINDOW".

[CANCEL]

*FIG. 10(n)*

VIEW ARCHIVED LOGS
PARAMETERS

| DOMAIN NAME ORIGIN(S) | OUTPUT STYLE | | TIME RESOLUTION |
|---|---|---|---|
| DOWNLOAD.SUBSCRIBER.COM | SEPARATE ▼ DISPLAY | DATA FOR SELECTED DOMAIN NAME ORIGIN(S) AND | AUTO ▼ |
| | IP/CNAME QUERY: REPLIES WITH ANSWERS ▼ | | |
| | AS SEPARATE ITEMS ▼ | | |

TIME RANGE SELECTOR (GMT)

○ ABSOLUTE TIME RANGE          ◉ RELATIVE TIME RANGE

| | MONTH | DAY | YEAR | HOUR | MINUTE | |
|---|---|---|---|---|---|---|
| START TIME | SEP ▼ | 1 ▼ | 2002 ▼ | 00 ▼ | 00 ▼ | LAST DAY ▼ |
| END TIME | SEP ▼ | 24 ▼ | 2002 ▼ | 03 ▼ | 20 ▼ | |

| GRAPH | TABLE | | EXPORT | DATA TO MS EXCEL SPREADSHEET | RETURN | TO POLICY WINDOW |

*FIG. 11(a)*

| ARCHIVED LOGS | | | |
|---|---|---|---|
| DOMAIN NAME ORIGIN(S) "DOWNLOAD.SUBSCRIBER.COM" | | | |
| TIME (GMT) | IP/CNAME QUERY: REPLIES WITH ANSWERS | NUMBER OF REPLIES | REPLIES PER MINUTE |
| 09/24/02 02:30:00 - 9/24/02 02:45:00 | NO DATA FOUND | | |
| 09/24/02 02:45:00 - 9/24/02 03:00:00 | NO DATA FOUND | | |
| 09/24/02 03:00:00 - 9/24/02 03:15:00 | NO DATA FOUND | | |
| 09/24/02 03:15:00 - 9/24/02 03:30:00 | 10.0.0.1 | 13 | 0.87 |
| 09/24/02 03:30:00 - 9/24/02 03:45:00 | NO DATA FOUND | | |

*FIG. 11(c)*

POLICY-BASED CONTENT DELIVERY NETWORK SELECTION

RELATED APPLICATIONS

This application is a continuation-in-part (CIP) of U.S. application Ser. No. 10/259,497, titled "Configurable adaptive global traffic control and management," filed Sep. 30, 2002, the entire contents of which are hereby incorporated herein by reference. Application Ser. No. 10/259,497 is related to and claims priority from provisional U.S. Patent Application No. 60/325,177, titled "Configurable Adaptive Global Traffic Control and Management," filed Sep. 28, 2001, the entire contents of which are incorporated herein by reference.

1. Reservation of Copyright

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

2. Field of the Invention

Aspects of the present invention relate to network traffic management. Other aspects of the present invention relate to configurable, adaptive, global traffic control and management in networks such as the Internet.

BACKGROUND & SUMMARY

As the volume of Internet traffic grows, providers of web content and applications increasingly need to deliver content from multiple servers at widely-separated locations in order to sustain a good end-user experience under high traffic loads. This need generates several difficult challenges, including, among others:

- how to guarantee the fault-tolerance of such a multiple-server system in the face of failure of one or more individual servers;
- how to control the way in which requests from end-users are distributed to each server according to important content provider policy constraints imposed for economic, contractual or other reasons; and
- how to guarantee high performance as experienced by end-users as network conditions change.

This invention solves these and other problems by providing a means to distribute network (e.g., Internet) traffic according to a configurable set of rules. The rules can be configured to take into account key factors such as:

- server availability.
- specific requirements of content providers who deploy the invention, e.g., distribution based upon geography, position in IP address space, load share, etc.
- state of the network (Internet) at any given moment, including measures of network latency.

These rules together provide an extremely fine-grained level of network Internet traffic control to providers of Internet content and applications, enabling them to dramatically improve the end-user experience (measured by speed of request resolution, associated download time, and the availability of servers) over that provided by conventional web servers and mirrored server farms.

There are many potential uses for the invention. One use is to provide a stand-alone service directing traffic exclusively to a set of designated servers managed by a single organization. The invention may also be used in more general ways—for example, one or more of the designated destinations can refer to servers (or server collections) outside the organization's control. The latter case includes, for example, Content Delivery Networks (CDNs), as well as local load-balancing servers, as potential destinations. The invention can also be used, e.g., to provide the DNS (Domain Name Service) component of a Content Delivery Network itself. It can be deployed as a service on behalf of subscribers, or it can be deployed as software to be used directly by subscribers themselves.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein:

FIG. 7 depicts the internal functional block diagram of a monitoring mechanism;

FIG. 9(a) shows an exemplary secure web based graphical interface, through which a subscriber may define load share and shed fraction policies among static resources;

FIG. 9(b) shows an exemplary interface for defining policies for dynamic servers;

FIG. 9(c) shows an exemplary graphical user interface through which an overflow server may be defined using a canonical name;

FIGS. 11(a)-11(c) show exemplary archived log information that can be displayed and viewed through a graphical user interface.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Although there are a number of different scenarios in which the invention might be deployed, this description will focus, for clarity and example only, on a scenario in which DNS service is provided by a third party on behalf of a content or applications provider.

Figure 1:
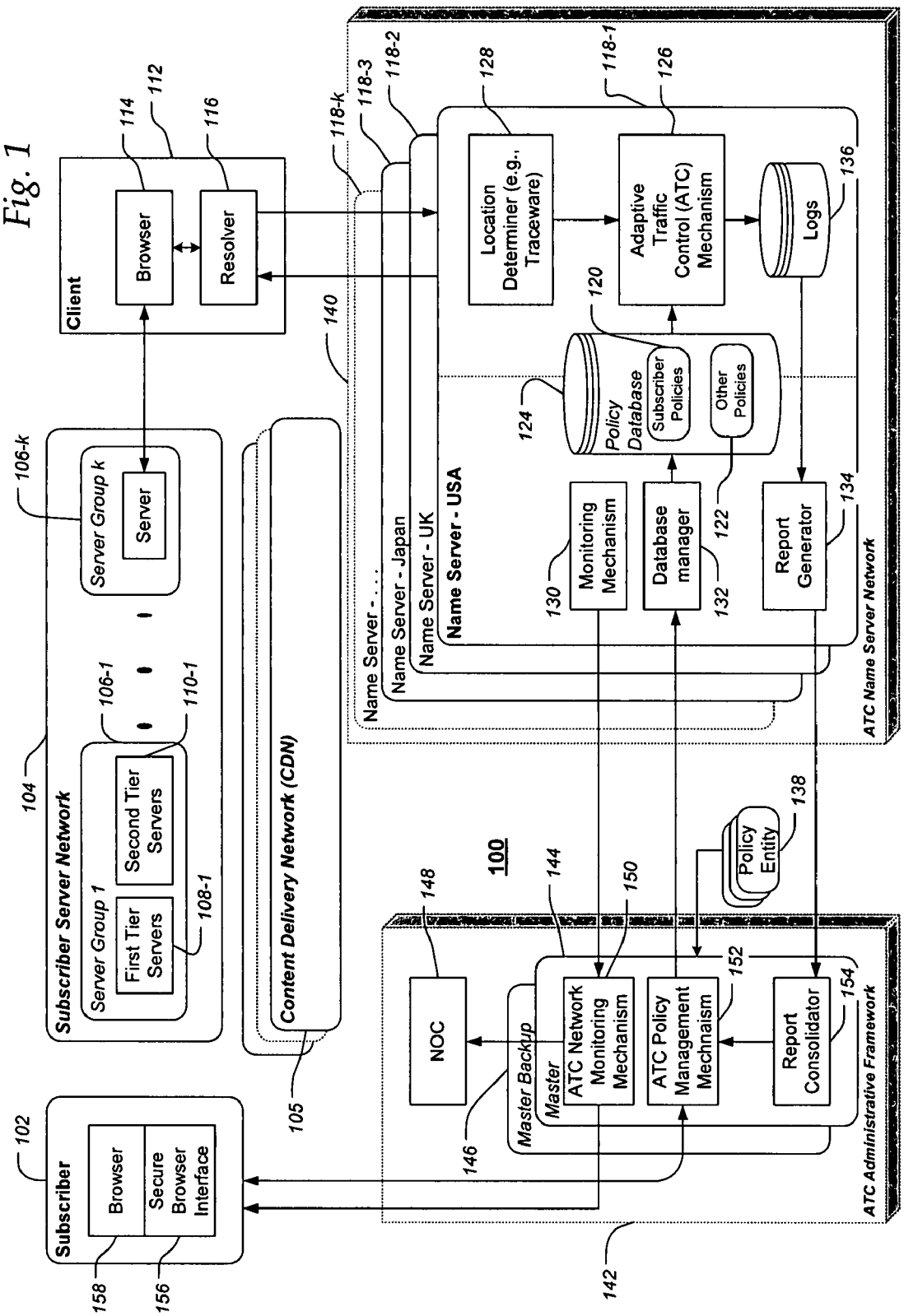
FIG. 1 depicts a configurable adaptive global traffic control and management framework.

FIG. 1 depicts a high-level of a framework or system 100 according to embodiments of the present invention. A subscriber 102 provides content via a subscriber server network 104 which is made up of one or more server groups 106-1, . . . , 106-k (collectively 106).

As used in this description, the framework according to embodiments of this invention contemplates three groups of users:

An end-user who wishes to access content and/or applications over the Internet.

An operator who offers and supports the service on a managed network of computers.

A subscriber (typically a content or applications provider) who subscribes to the operator's service to help to support the needs of the end user.

The terminology end-user, operator and subscriber is used throughout this description to distinguish these three roles, although there are many scenarios in which more than one role can be taken by a single entity. Such scenarios are contemplated by this invention.

Each server group 106 may correspond to a server hierarchy which includes one or more tiers of servers. For example, the first tier of a server hierarchy may comprise one or more primary servers and the second tier of the server hierarchy may comprise possibly one or more overflow servers that are used when the primary servers in the first tier fail to function properly. In general, for the j-th server group, the primary servers at the first tier of server group 106-j are denoted 108-j, and the overflow servers at the second tier of server group 106-j are denoted 110-j.

Each server in a server group is any process or collection of processes that provide resources in response to requests, e.g., from a client. A server can be any off-the-shelf Web server. In some embodiments, servers are typically a Web server such as the Apache server or Netscape Communications Corporation's Enterprise™ server.

Client 112 accesses the subscriber server network 104 in order to obtain content from the subscriber. Content includes any kind of data, including, without limitation, video and audio data and the like. To achieve this access, a user at client 112 enters a resource locator, e.g., a Universal Resource Locator ("URL"), into a browser 114 on client 112. URLs specify the location of resources (information, data files, etc.) on the network. URLs are defined in detail in T. Berners-Lee et al, Uniform Resource Locators (URL), Network Working Group, Request for Comments: 1738, Category: Standards Track, December 1994, located at "http://ds.internic.net/rfc/rfc1738.txt", which is hereby incorporated herein by reference. URLs generally have the following form:

scheme://host[:port]/url-path where "scheme" can be a symbol such as "file" (for a file on the local system), "ftp" (for a file on an anonymous FTP file server), "http" (for a file on a file on a Web server), and "telnet" (for a connection to a Telnet-based service). Other schemes can also be used and new schemes are added every now and then. The port number is optional, the system substituting a default port number (depending on the scheme) if none is provided. The "host" field (the hostname) maps to one or more particular network addresses for particular computer(s). The "url-path" is relative to the computer specified in the "host" field. A url-path is typically, but not necessarily, the pathname of a file in a web server directory. Those skilled in the art will realize and understand, upon reading this description, that the client may not actually enter a URL, but needs only ran an application that needs to look up a domain name (i.e., perform a DNS query). A browser does this when a client enters a URL, but other applications may perform DNS queries in other manners.

The framework or system 100 includes at least one Domain Name Service (DNS) name server 118-1. In preferred embodiments, the system 100 also includes DNS name servers 118-1, 118-2, . . . , 118-n, (collectively referred to as name servers 118) all operated by a single particular entity. In the embodiment shown in FIG. 1, one of the name servers 118-1 serves the U.S.A., another name server 118-2 serves the U.K., another name server 118-3 serves Japan, and so on. The various name servers 118-1, 118-2, . . . , 118-n can be configured (collectively or individually) to serve geographical regions, geopolitical regions, corporate structures or any other logical organizational structure. The structure and operation of each name server 118 is described below.

When the client's browser 114 obtains a request (e.g., in the form of a URL), the browser queries its resolver 116 for an address for the hostname specified in the requested URL. The resolver 116 eventually queries a particular name server (e.g., name server 118-1). The name server 118-1 returns (provides or attempts to provide) the IP (Internet Protocol) address (or addresses) of a server (or servers) in the subscriber server network or a CNAME (a domain name). Other DNS answer types (e.g., MX record, NS record, etc.) are also possible, as described below. The determination of the particular IP address returned to the resolver 116 may be based on a number of factors, including the resolver's location (e.g., as determined from the resolver's IP address) and various policies (e.g., subscriber policies 120, other policies 122) in a policy database 124. The client's browser 114 is then able to communicate with the selected server in the subscriber server network in order to obtain the desired resource.

Name servers 118-1, 118-2, . . . , 118-n, according to embodiments of the present invention, include an adaptive traffic control (ATC) mechanism 126 which provides domain name service to a client based on policies in the policy database 124. Each name server 118 includes or has access to a location determination mechanism 128 for associating the client's request with the client's location. Any program that can determine a requestor's location may be used.

The subscriber server network 104 represents a network of servers that provides, on behalf of an underlying subscriber, Internet content or services. For example, a subscriber may be a content provider, which has its own network of servers that deliver content to end users' browsers via the Internet. The subscriber server network 104 may be configured in such a way that the processing of the service requests may be reasonably distributed among all the servers in the server network 104, according to some criteria. To achieve that distribution, the subscriber server network 104 may be organized, for example, to have one or more server groups (e.g., server group 1 106-1, . . . , server group k 106-k), each of which may be responsible for processing a portion of the service requests. For example, service requests coming from Finland may be routed to a server group that is physically located in Europe.

Each server group 106 in the subscriber server network 104 may comprise a plurality of servers to further share the load. For example, a service request from Finland may be subsequently routed to a server located in Scandinavia. Routing service requests to different server groups and subsequently to different servers may be based on various criteria. For example, such routing may be based on the distance between the origin of the request and the location of the server. For example, for a service request originated from Finland, it may be more effective and efficient to direct the request to a server located in Norway instead of directing it to a server located in the U.S. Server load may also be used to determine where to route a service request. For example, a service request originated from the U.S. may be routed to a server group in Mexico if the server group in the U.S. is overloaded while the server group in Mexico is relatively idle.

Servers in a server group may be organized into a hierarchy with one or more tiers of servers. Servers at different tiers may have different designated purposes. For instance, servers at the first tier of a server hierarchy may include servers that are primary functioning servers, servers at the second tier may include servers that are used as overflow servers which become active only when the primary servers at the first tier become unavailable or overloaded, and servers at the third tier that are used as second layer overflow servers that become active only when the primary servers and the overflow (or first layer overflow) servers at the second tier become unavailable or overloaded, etc.

The first tier of a server group hierarchy may include one or more primary servers. When multiple primary servers are present, they may be configured in such a way that they share the load. For example, if there are five primary servers at the first tier, they may be configured so that each takes 20% of the total service requests routed to the server group. For each of such primary servers, it may be further configured so that when a particular server is overloaded or fails, the load share originally designated to this server may be shed or directed to other server(s). The load shed may also be configured when the server is not overloaded. The portion to be shed to other server(s) may be governed by certain pre-defined policies.

As discussed above, servers in a server group 106 may be classified into different categories based on specific functionality of the underlying servers. For example, a server in a server group 106 may be a primary server, a first layer overflow server, or a second layer overflow server, etc. A server may also be classified in terms of whether and how a server is to be dynamically monitored. For instance, in some embodiments, a server can be classified as either a monitored server or a managed server.

A classification of a monitored server indicates that the underlying server is to be monitored dynamically for its availability. In this case, the server may be probed for its availability according to some pre-determined schedule. Such a probe may be sent to the underlying server from different locations of the network so that the availability can be detected accurately. That is, if the underlying server failed to respond to one probe sent from one location, it does not necessarily indicate that the server is no longer available (could be due to that only part of the network is congested).

A probe can be realized in different fashion. It can be simply a signal sent to the server to request an acknowledgement. It can also be a poll operation in which a file stored at a designated location on the underlying server is polled. If the file can be successfully polled, the underlying server is considered to be available. The detected availability may be used to adjust or update policies associated with the server so that the network traffic management will respond to the dynamics related to the server.

A server that is classified as a managed server may be actively participating the adaptive policy-based management scheme. Similar to a monitored server, a managed server may be regularly probed for its availability. In addition, a managed server may dynamically provide information related to its load share or load shed. A managed server may update its load share or load shed fraction according to its changed capacity or its current load. For example, when a managed server is upgraded, its capacity may be increased so that it may increase its load share or decrease its load shed fraction. On the other hand, when a managed server is overloaded, it may revise its load share to a lower level or increase its load shed fraction to prevent failure. A managed server may revise its load share or load shed by updating the corresponding load share or load shed information in a designated file stored on the server and this file may be polled by a name server so that the dynamically changed load share and load shed information can be used to direct traffic accordingly.

The distribution of service requests (from a client 112) within the subscriber server network 104 may be controlled through a set of ATC policies (120, 122) stored in the policy database 124. Various authorities may influence the ATC policies and may create policies in the policy database 124. For example, the subscriber may set up policies to direct traffic with respect to considerations such as the geographical locations and the capacities of the underlying servers in the subscriber's network 104. Other policy entities 138, including, for example, the operator of the name servers 118 or various geo-political entities may also have policies regarding how the network traffic should be managed and directed. For example, governmental or some organizational agencies may regulate some aspects of network traffic policies. Such regulation policies may be required to be incorporated so that a service request from the client 112 can be routed in a manner that satisfies regulatory policies.

Thus, the ATC policies in the policy database 124 may be a combination of subscriber policies 120 and other policies 122 from different sources such as subscriber 102 and policy entity 138. Policies from different sources may be accessed by the ATC mechanism 126 from the policy database 124. From the point of view of the ATC mechanism 126, the source of a policy may not be relevant or even determinable. For example, policies may be defined in a textual file stored at a designated location, which may be downloaded to an ATC policy management mechanism 152 in an ATC administrative framework 142 and then broadcast to the database manager 132 located in each of the name servers in the ATC name server network 140. The download may be via either a graphical user interface (GUI), a file transfer protocol (FTP), or some other mechanism. Policy makers may also enter policies directly via a web-based GUI. For example, the subscriber 102 may enter subscriber policies 120 via a browser interface 156 connected with the ATC administrative framework via, preferably a secure interface (e.g., implemented using the "https" protocol).

Figure 2:
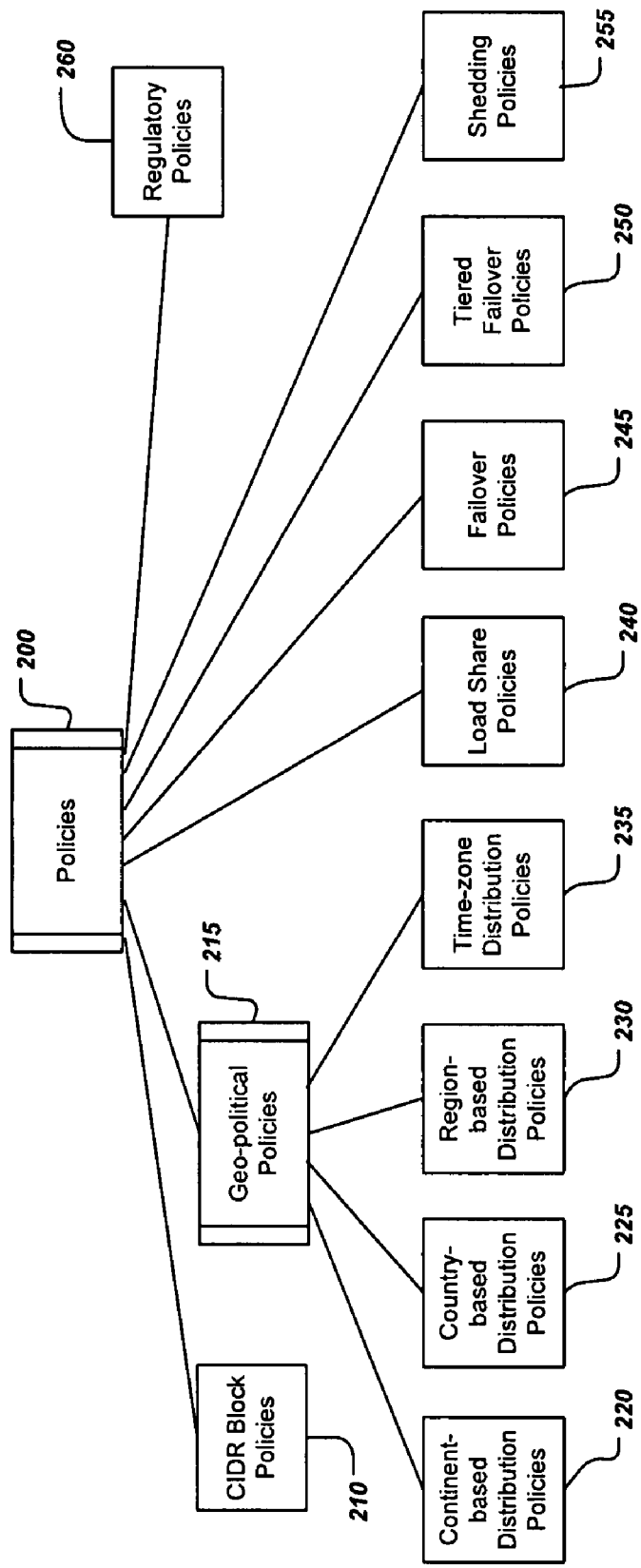
FIG. 2 describes exemplary types of policies.

The policies from the policy database 124 used by the ATC mechanism 126 are collectively referred to as ATC policies, which may include, not is not limited to, the subscriber policies 120 as well as other policies 122. The ATC policies may be organized in a manner that is appropriate to govern and/or control the traffic at different levels of the subscriber server network 104. FIG. 2 shows exemplary types of ATC policies 200 according to embodiments of the present invention.

The ATC policies (200) may be classified into different types such as geo-political policies 215, load share policies 240, failover policies 245, tiered failover policies 250, shedding policies 255, regulatory policies 260, and Classless Inter-Domain Routing (CIDR) block policies 210.

These exemplary policies in the policy database 124 are described in greater detail below:

Geographic Policy (215): Decisions are based on location of the end-user or an approximate thereof, e.g., using the IP address of an end-user's resolver. For example, if the IP address is within the U.S., the request may be directed to a "domestic" group of servers in the subscriber server network 104, otherwise it may be directed to "international" servers in the network. The request may be directed to a proprietary Content Delivery Network (CDN) or to another service specified by the subscriber.

Load Share Policy (240): The subscriber can explicitly specify the amount of traffic (load share) to be directed to each of their servers within a defined server set in the subscriber server network 104. Typically the load may be specified according to the capacity of each server. Based on such specification, the load share of each server may be derived as a percentage of the total load.

Failover policy (245): The subscriber may specify policies regarding a failover situation where some of the primary servers fail to function. To take care of such a scenario, a failover policy may instruct the ATC mechanism in terms of, for example, how often to monitor the availability of the servers and what strategy to adopt when a partial set of the primary servers are detected to be unavailable. For instance, a failover policy may specify to distribute the load of a failing server to other primary servers. It may also alternatively instruct the ATC framework to direct traffic to servers other than the primary servers.

Tiered Failover Policy (250): The subscriber may specify a strategy through tiered failover policies by which the load should be re-directed to servers at a next tier when one or more subscriber servers in a previous tier fail to function. For example, in defining the subscriber server network, each server group may be configured as a hierarchy, having the first tier of primary servers, the second tier of first layer overflow servers, and the third tier of second layer overflow servers, etc. In this case, a tiered failover policy may be defined to indicate when the load should be re-directed from the primary servers to the overflow servers. For instance, a tiered failover policy may indicate that when all the primary servers fail, the load should be directed to the second tier, and when servers at both the first tier and the second tier fail, the load should be directed to the overflow servers at the third tier. The traffic may also be re-directed to some other servers. For example, when a content delivery network (CDN) is available, the traffic may be re-directed to the entire CDN.

Shedding Policy (255): In some circumstances, a fraction of the "load" originally designated to a server may be shed or re-directed to one or more different servers. This may occur when the amount of traffic directed to the subscriber server exceeds a prescribed level. In these cases, a subscriber-specified fraction of traffic (shed fraction) that would otherwise be directed to the server may be shed to one or more other different servers. Such strategy may be adopted to prevent catastrophic failure due to overload. The servers that take the shed load may be an overflow server or some other servers such as a content delivery network. An overload situation may be detected according to the response time of the server. For example, if the response time from a server becomes long, it may indicate that the server is overloaded. In this case, shedding policies 255 may be invoked to re-direct the traffic elsewhere. For instance, if there are a total of 3 primary servers in a server group with load share of (0.3, 0.3, 0.4) and the primary server that is designated to take 40% of the total load is completely overloaded, a shedding policy may specify to shed the load of this server by re-directing 50% of its original load to, for example, the servers located in the CDN 105. A shedding policy may also specify a condition upon which the traffic will be directed again to the shedding server. Such a condition may relate to a desirable level of performance of the shedding server.

CIDR Policy (210): Policy decisions are supported based upon CIDR blocks of IP address space. CIDR denotes Classless Inter-Domain Routing, an IP addressing scheme that replaces the system based on classes A, B, and C. With CIDR, a single IP address can be used to designate many unique IP addresses.

Regulatory policy (260): Certain policies may be specified by some policy entities to control network traffic. Such policies may be enforced in system 100.

A policy may be static or dynamic. Selection of a server from the subscriber server network 104 may be based on an adaptive, regularly updated map of the state of the Internet as well as adaptively updated policies. The map may cluster IP addresses together according to their network latency to a selected set of network agents. This enables the subscriber servers to be selected according to their "network proximity" to an end user's browser, optimizing resulted download time. The policies may be defined in such an adaptive manner that they reflect the dynamic status of the servers such as the availability and load.

Geo-political policies 215 may govern the selection of a server according to where the client is located. As shown in FIG. 2, the geo-political policies 215 may be further classified into continental based distribution policies 220, country based distribution policies 225, region based distribution policies 230 and time zone based distribution policies 235. These policies may be set up to govern the process of selecting a particular server group according to different geographical or political criteria.

Geo-political policies differ from load based policies (described above). The former is designed to guide selections based on geographical criteria or time criteria. The latter concerns the selection process with respect to the dynamic capacity and load of the underlying servers. The load share policies 240 govern the selection according to the capacities of the servers. Partial failover or tiered failover policies (245 and 250) govern the traffic re-direction process when functioning servers in a server group are overloaded or failed.

Figure 3:
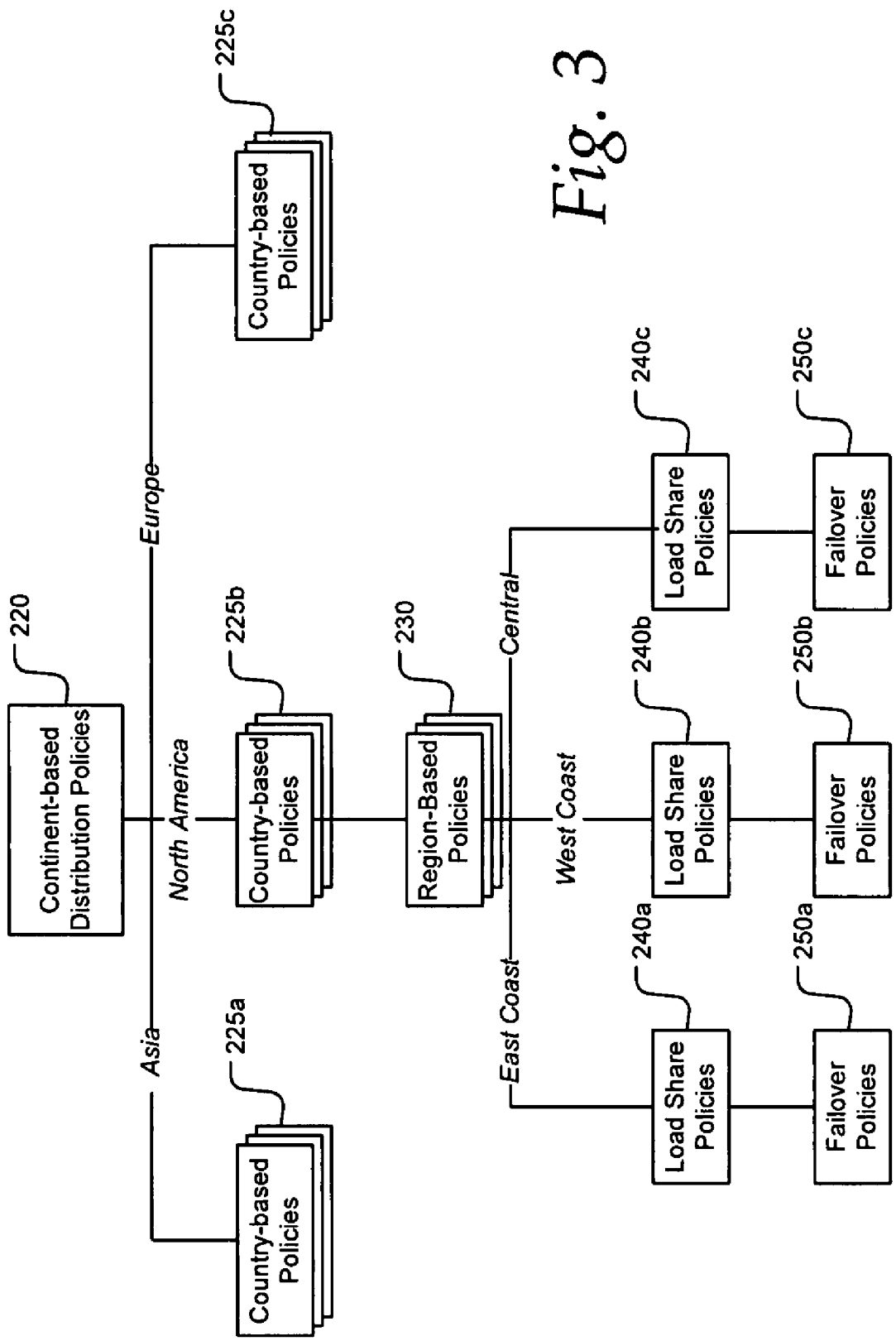
FIG. 3 shows an exemplary hierarchy or a decision tree built based on subscriber policies.

The ATC policies 200 may be hierarchically constructed to form a decision tree. FIG. 3 depicts an exemplary subscriber policy hierarchy or a decision tree built based on various types of subscriber policies, according to an embodiment of the present invention. In FIG. 3, the continental based distribution policies 220 are used to first direct a selection process limited to a particular continent. For example, if the requesting client 112 is located in Asia, the continental based distribution policies 220 may direct the further selection within servers that are located in Asia. Similarly, if the client 112 is located in either North America or Europe, the further selection process may be directed to the appropriate servers located in the corresponding continent.

As noted, a policy may be created by generating a decision tree representing the ATC rules that the user (content provider/subscriber) wants to apply. At the leaves of this tree (referred to as resource nodes) a user specifies the answers (IP addresses or CNAMEs) that the user wants ATC to provide in response to a DNS request. At the branches of this tree (referred to as branch nodes) the user specifies the various decision criteria that the user wants to apply. Those skilled in the art will realize and understand that, in this discussion about policy setting and control of the ATC, the term "user" (as opposed to "end user") generally refers to the content provider/subscriber whose content is being delivered.

Branches within a policy decision tree enable ATC decisions based, e.g., upon the IP address of the requesting resolver. Branches can be selected based upon different criteria. In a presently preferred exemplary embodiment, branches can be selected based on five different criteria:

Split on World zone
Split on country
Split on U.S. state
Split on U.S. time zone
Split on block of IP addresses—specified, e.g., using CIDR classless notation: e.g. 1.2.0.0/16, 1.2.3.4/32 (single IP), or 0.0.0.0/0 (any IP).

Those skilled in the art will understand, upon reading this description, that different and/or other criteria may be use to make branch selections. Examples of such criteria include, without limitation, time of day, day of week, etc.

Resources are selected to occupy the leaves of a policy decision tree. Resources are used to specify the ATC answers to DNS queries. ATC offers substantial decision making power during the resource selection process. It is here, for example, that traffic can be distributed according to load share and shed fraction criteria. In a presently preferred exemplary implementation there are five types of resource nodes that can be selected in the policy decision tree:

IP addresses (Internet Protocol addresses)
CNAME records (Canonical Name records)
Mx records (Mail Exchange records)
NS records (Name Server records)
Load sharing server sets (LSSS)—consisting of Managed, Dynamic, Static and Overflow servers.

Those skilled in the art will understand, upon reading this description, that different and/or other resource nodes may be used.

IP address(es) are used when the current decision tree leaf points to one or more fixed IP addresses. CNAME records are used when the current decision tree leaf points to a destination whose CNAME is known.

MX Records are is used when the current decision tree leaf points to one or more Mx (Mail Exchange) records. MX records may be combined with IP address or Load Sharing Server Set resources. To select this option, the user firsts enters the Exchange, Pref, and TTL (Time To Live) details for the mail exchange. The Exchange field holds the domain name of the host which will receive mail. If the Exchange name lies under the Domain Name Origin, then the policy must specify an IP address for the name by means of another node label and appropriate resource (IP address or Load Sharing Server Set). A Pref field holds the preference order of the host; lower numbers are preferred (used first) over large numbers.

NS Records are used when the current decision tree leaf points to one or more NS (Name Server) records. NS records are used to specify a delegation from the ATC name servers to another set of name servers.

Load Sharing Server Set (LSSS) option is used when the current decision tree leaf points to a number of destinations among which the user wants to share load (including failover) according to arbitrary criteria. In presently preferred exemplary implementations, this decision takes place only after any decisions that the user wants to make via branch nodes based on the IP address of the requesting resolver. There are presently four different types of load sharing server resources, namely static servers, managed servers, dynamic servers, and overflow servers.

In a present implementation, managed Servers are preferred over the other server types.

Load sharing server sets (LSSS) are necessary to utilize the load share, tiered/overflow and failover rules. When an ATC name server encounters a server set, one or more answers are chosen based on several criteria, including, e.g., the load share of each server, the tier in which each server sits, the shed fraction of each server, and the monitoring results of each server.

Static, dynamic and managed servers have load share, shed fraction and, when in a set, tier parameters. An overflow server is, by definition, at the lowest tier and cannot shed; thus it has only the load share parameter. Dynamic and managed servers each may have the load share and shed fraction values updated continuously and may be deemed on or off-line due to monitoring.

When answering a DNS query from a LSSS, ATC preferably selects answers (IP addresses or a CNAME) from servers included in the set. ATC examines servers in tier order (tier 1 first, tier 2 next, and so on, with overflow servers last), selecting servers based on load share, shed fraction and monitoring results. Online servers are selected within a tier according to their load share values relative to other servers in the same tier. If a candidate server is shedding, e.g., 10% (i.e., has a shed fraction of 0.1), ATC will keep that server in the DNS reply nine tenths of the time, and look in the next tier for a server one tenth of the time. If there is only one tier, the shed traffic returns to the same tier and another server is selected. If the LSSS specifies that multiple answers should be returned, ATC will look for each answer starting from the first tier. If any server selection falls to the overflow servers, one of these is selected as the sole answer to the DNS reply. Typically, the overflow server is a CNAME, and DNS answers of this type should not be combined with any other record type.

In a presently preferred implementation, the number of answers chosen from Load Sharing Server Sets depends on two more user-settable parameters, the "number of answers desired" (NAD) and the "number of answers required" (NAR). These parameters control how many answers are picked from non-overflow servers.

The user sets the NAD parameter to the typical number of answers to be selected by ATC and returned in DNS queries. The NAR parameter, which must be less than or equal to the NAD, comes into play when the normal ATC decision making process cannot select the desired number of servers specified in NAD. This server count shortfall situation can arise when one or more servers are shedding or offline. Setting NAD to one (1) or more guarantees that ATC will never reply to a DNS query with no servers. When NAD is greater than one, ATC may deviate from the desired load share ratios, e.g., if there are three servers and NAD is three then DNS replies will typically have all three servers, irrespective of their load share values.

If the number of servers selected is less than NAD, but greater than or equal to NAR, then server selection is finished. However, if the number of servers selected is less than NAD and less than NAR, then ATC progressively ignores shed fraction and load share values until it is able to select NAR servers. As a special case, if ATC cannot select any servers because they are all offline, all servers are returned in the DNS reply (subject to size constraints of the DNS packet).

As an example, consider a LSSS with two servers in tier 1, two servers in tier 2, and two answers desired and required (i.e., NAD=2, NAR=2). If both servers in tier 1 are online and not shedding, those servers will be returned. If one of the tier 1 servers has 10% shed, then 10% of the answers contain one server from tier 1 and one server from tier 2. If both servers from tier 1 are offline, the two servers from tier 2 are returned. If all four servers are offline, then all four are returned (the special case).

In some implementations, the LSSS may also have a Style parameter which may be used to control where traffic goes when it is directed away from a shedding server, or from an offline server, according to the following table.

| Style | Shed Traffic | Off-line Traffic |
|---|---|---|
| Constant Tier Load Ratio (default) | Next Tier | Same Tier |
| Constant Server Load Ratio | Next Tier | Next Tier |
| Maximal Tier Load | Same Tier | Next Tier |

Consider, e.g., a LSSS which contains a few servers in Tier 1 and an overflow server sending traffic to a CDN. The three styles above relate to three underlying motivations for how to split traffic between the Tier 1 servers and the CDN.

If the Tier 1 servers should always take a specified percentage of traffic, as a whole, then the Constant Tier Load Ratio style is best. For example, for the CDN to always take 50% of the traffic, each of the Tier 1 servers would have their shed fraction set to 0.5. This way, even if servers are added or removed from Tier 1, that tier and the CDN will always get 50% of the traffic. This, of course, means that the load on the Tier 1 servers will vary as servers are added or removed.

If, instead, it is not acceptable for the Tier 1 servers to increase their load upon the failure of another Tier 1 server, the Constant Server Load Ratio style is best. With this style, both shed traffic and traffic that would have gone to an off-line Tier 1 server are directed to the next tier (in the example above, the CDN). This is a preferable scenario if the Tier 1 servers are generally under high load. Lastly, if the Tier 1 servers are generally under low load and the CDN is to be considered a last resort, the Maximal Tier Load style should be used. With this style, both shed traffic and traffic that would have gone to an off-line Tier 1 server are instead directed to other servers in Tier 1. Traffic only gets to the CDN if all servers in Tier 1 are offline or shedding.

The Static Server option is used to share load at the current decision tree leaf among a set of servers that the user does not expect to change often over time. The load share for a given server represents the amount of traffic that will be sent to that server within the same tier of the server set. The fraction of traffic sent to that server is computed by summing the load share numbers for all servers in the same tier of the server set and dividing the load share by that total. The shed fraction for a given server represents the fraction (from 0 to 1) of traffic that should be redirected away from a given server, after the initial decision based upon load share. The online flag can be used to remove a server from the list of ATC answers if the user wishes to take a server off-line for maintenance. (If a server has been switched off-line, end users may continue to access it for the duration of the TTL, or perhaps longer if the end user's resolver or browser ignores the TTL.)

In addition to default values for load share and shed fraction, the managed server may optionally be monitored to determine the on/off-line status, and polled for load feedback information (updated values for the load share and shed fraction). Furthermore, a managed server may hold either an IP address or a CNAME. A managed server holding an IP address without monitoring or load feedback becomes equivalent in functionality to the static server. Managed servers with monitoring only (load feedback not configured) are used when the user expects the load share and shed fraction of the servers to change infrequently, but want an instant reaction if the user's server becomes unavailable. In a presently preferred implementation, ATC monitors the user's server by polling a user-specified resource (denoted by a user-specified URL) at regular intervals (e.g., every 30 seconds) frome ach ATC name server. The URL scheme may be, e.g., HTTP, HTTPS or TCP. With HTTP(S), ATC name servers independently send a HEAD request, optionally with HTTP's basic authentication, and examine the response code. Response codes from 200 to 399, received within 15 seconds of the probe, put the server in an online state as viewed by the probing name server; all other conditions (connection refused, server 400 or 500 error, 15 second time, etc.) lead to an offline state for th e server until the next probe.

Alternatively, ATC can monitor the user's server by checking the ability to connect to a specified port. In this case, the URL format is tcp://HOST[:port], and the ATC name servers simply attempt to establish a TCP connection to determine the online state of the user's server. The same probing rate and timeout durations apply.

Suppose, for example, that a user wishes to use ATC for name service for download.example.com. Suppose too that the user has two servers and wants ATC to monitor them both and only return the IP address of an available server. In this example, the user could define two Managed servers, each with a Monitored URL as shown in the following table:

| Server nick name | IP Address | TTL | Monitored URL |
|---|---|---|---|
| SF server | 10.0.0.1 | 2m | http://10.0.0.1 |
| NY server | 10.0.0.2 | 2m | http://10.0.0.2 |

The Monitored URL can point to any resource available to the web server, in this case the web server's root. When these servers are used in a server set, ATC continuously polls the monitoring URLs to determine the on/off-line state of the user's servers.

A user may specify the load share and/or shed fraction of the user's servers dynamically, using a Load Feedback URL to specify an XML resource file (at a location of the subscriber's choice) in the following form (preferably plain text):

<ATCServerStatus loadShare="LS"

shedFraction="SF"
onLine="OL"
expireTime="ET"/>

The file must be made accessible by the subscriber via http or https, optionally with basic authentication. In a presently preferred implementation, the online field is required, and all others are optional. LS is a number greater than (or equal to) zero, SF is a number from 0 to 1, OL is either True or False, and ET is a time (either absolute GMT or relative).

The expireTime parameter is the absolute time at which the current XML file expires, or the relative amount of time, post-probe, at which the current XML file expires. After a retrieved XML file expires, the loadShare and shedFraction return to their default values. In this manner a user (i.e., content provider) can temporarily (or permanently) override default load share and/or shed values.

The Managed Server specification with both Monitoring and Load Feedback may then look like the following table:

| Server Name | IP | TTL | Monitoring URL | Load Feedback URL |
|---|---|---|---|---|
| SF Server | 10.0.0.1 | 2m | http://10.0.0.1 | http://10.0.0.1/atc-feedback.xml |
| NY Server | 10.0.0.2 | 2m | http://10.0.0.2 | http://10.0.0.2/atc-feedback.xml |

The load feedback resource does not need to be on the server itself. The user may wish to use an independent server to control the load share and shed fraction of some or all of the user's servers. The state of the user's managed servers is maintained by each ATC name server as follows:

If the user's server uses neither a monitored URL nor a load feedback URL, it is considered to be always on-line with default load share and shed fraction.

If the user's server uses a monitored URL but not a load feedback URL, it is considered to be on-line when the monitored URL is successfully retrieved (HTTP response code from 200 to 399 within 15 seconds), otherwise it is considered to be off-line.

If the user's server uses both a monitored URL and a load feedback URL, the server status is preferably given by the following table:

| Load Feedback URL Contents | Monitoring Down | Monitoring Up |
|---|---|---|
| No XML | Off-line | On-line with defaults |
| No XML, last known still valid | Off-line | Last known |
| On-line | Off-line | On-line with defaults |
| On-line, LS and SF | Off-line | On-line with LS and SF |
| Off-line | Off-line | Off-line |
| Off-line, LS and SF | Off-line | Off-line |

In the above table, "No XML" means that either the XML file could not be retrieved within the 15 second time-out period (e.g., due to network error), the XML file was retrieved but could not be parsed, or the XML file had expired. "Last known" refers to the full contents of the last successfully retrieved XML file. Last known values expire and cease to exist at the expire time if the expire time is specified in the XML file. The term "defaults" refers to the default load share and shed fraction values specified in the Managed resource server.

If the user's server uses the Load Feedback URL but no Monitored URL, the user can achieve an N minute delayed failover by putting in the XML snippet a relative expireTime of N minutes (+Nm) and a loadshare of one, while having in the policy a default Load Share of 0.

Dynamic Server

The Dynamic Server option may be used to share load at the current decision tree leaf among a set of servers when the user expect that the load share, shed fraction, or server availability may change reasonably often. (The managed server option is preferred over the dynamic server option.) Load share and shed fraction are defined for this case as they are for Static Servers. However, the Dynamic Servers selection offers flexibility in exactly how they are specified. The Dynamic Server option supports specification of load share, shed fraction and the On line flag dynamically, allowing them to be defined by the subscriber via a short XML status file at a location of the subscriber's choice (as described above).

The subscriber specifies the location of this file to ATC, including any authentication requirements desired. ATC polls the file at predetermined fixed intervals, e.g., every 30 seconds, and updates the current ATC policy to reflect its contents. Subscribers can easily specify changes to load share, shed fraction and the On line flag by editing the file, either manually or by updating it using automated modules, without requiring updates to an entire ATC policy.

In order to maintain flexibility, values for the "URL Down load share" and the "URL Down shed fraction" parameters can be set in the ATC policy. They are used to control the behavior of ATC under the circumstance that the ATC polling mechanism is unable to retrieve the status file for a server, or is unable to parse its contents.

Case 1

Subscriber specifies all three ATCServerStatus attributes in the status file, with the "URL Down load share" parameter set to zero. In this case the subscriber's server will not be returned as an answer under any conditions until the polling mechanism retrieves a valid XML file.

Case 2

Subscriber specifies all three ATCServerStatus attributes in the status file, with the "URL Down load share" parameter set to one. In this case, ATC treats a failure to return valid XML according to the "Down load share" and "Down shed fraction" specified in the policy.

Case 3

Subscriber specifies only the on line ATCServerStatus attribute in the status file. In this case, ATC uses the "Default load share" and "Default shed fraction" specified in the policy if the "On line" flag in the ATCServerStatus file is set to true.

Below is a table detailing all of the possible cases. In the table, a dash represents ATC taking the dynamic server out of consideration. LS and SF should be replaced by actual numbers.

Dynamic Server Cases

| Form of retrieved ATCServerStatus file | LoadShare | ShedFraction |
|---|---|---|
| <ATCServerStatus onLine="True" loadShare="LS" shedFraction="SF"/> | LS | SF |
| <ATCServerStatus onLine="True"/> | Default load share | Default shed fraction |
| <ATCServerStatus onLine="False" loadShare="LS" shedFraction="SF"/> | — | — |
| <ATCServerStatus onLine="False"/> | — | — |
| Bad format or un-retrievable: | Down load share | Down shed fraction |

Overflow Server

A user uses the Overflow Server option if the user would like to specify what should happen if, for some reason (e.g., server unavailability), no answers are selected by the Static or Managed (or Dynamic) Server selection process. Typically, the overflow server will be a CName to a service, such as Level 3 Communications' Content Delivery Network (CDN), that should be available in the case that the user's individual Static or Managed (or Dynamic) servers are unavailable.

Managed and Dynamic Server Status Alerts

The global ATC network preferably maintains an overall state of a user's Managed and Dynamic servers using Monitored or Load feedback URLs. A Server Status page, available from the subscriber web interface, continuously updates with the status (up or down) of the user's URLs and, if down, the relevant error condition (time-out, connection failure, file not found, etc.). Additionally, the overall server state is displayed (either on-line or off-line) along with a relevant status message. If a server changes state, an email message is sent to the user detailing the event. Email messages are preferably not sent more frequently than once in 15 minutes per domain name origin.

Once a DNS request is directed to an appropriate continent, the country based distribution policies 225 may further constrain the selection to particular servers that are in the same or close-by countries where the client 112 is located. For example, if the client 112 is located in the U.S., the country based policies 225 may direct the selection from the servers located in the U.S. Similarly, the region based distribution policies 230 may further constrain the selection to, for example, the west coast or east coast depending on where the client 112 is located.

When a particular server group is selected (e.g., after a hierarchical decisions based on the continent-based policies 220 and the region-based policies 230), the load share policies 240 govern the process whereby servers in a given server group should be selected. Such policies may be determined based on the servers' capacities or may be adaptively revised based on the dynamic performance or load of the underlying servers. The load share policies 240 may specify the percentage (share) of the total requests that each server in a server group should handle. For example, if a server group comprises a total of three primary servers (server 1, server 2, server 3), a load share policy for this server group may specify the load share as (0.3, 0.5, 0.2), indicating that server 1 should take 30% of the total load, server 2 should take 50% of the load, and server 3 should take 20% of the total load.

The tiered failover policies 250 govern the selection of a server when a particular default set of servers is no longer functioning or available. For example, primary servers in a server group may be considered as a default set of servers that provide service when operation is normal. Unavailability of such primary servers may be detected according to the response time of the server. For example, if a server is simply not responding, the server may be considered as not available. When all the primary servers are down, the tiered failover policies 250 govern where the traffic should be directed. For instance, the tiered failover policies 250 may specify to direct all traffic to the overflow servers at the next tier.

Figure 4:
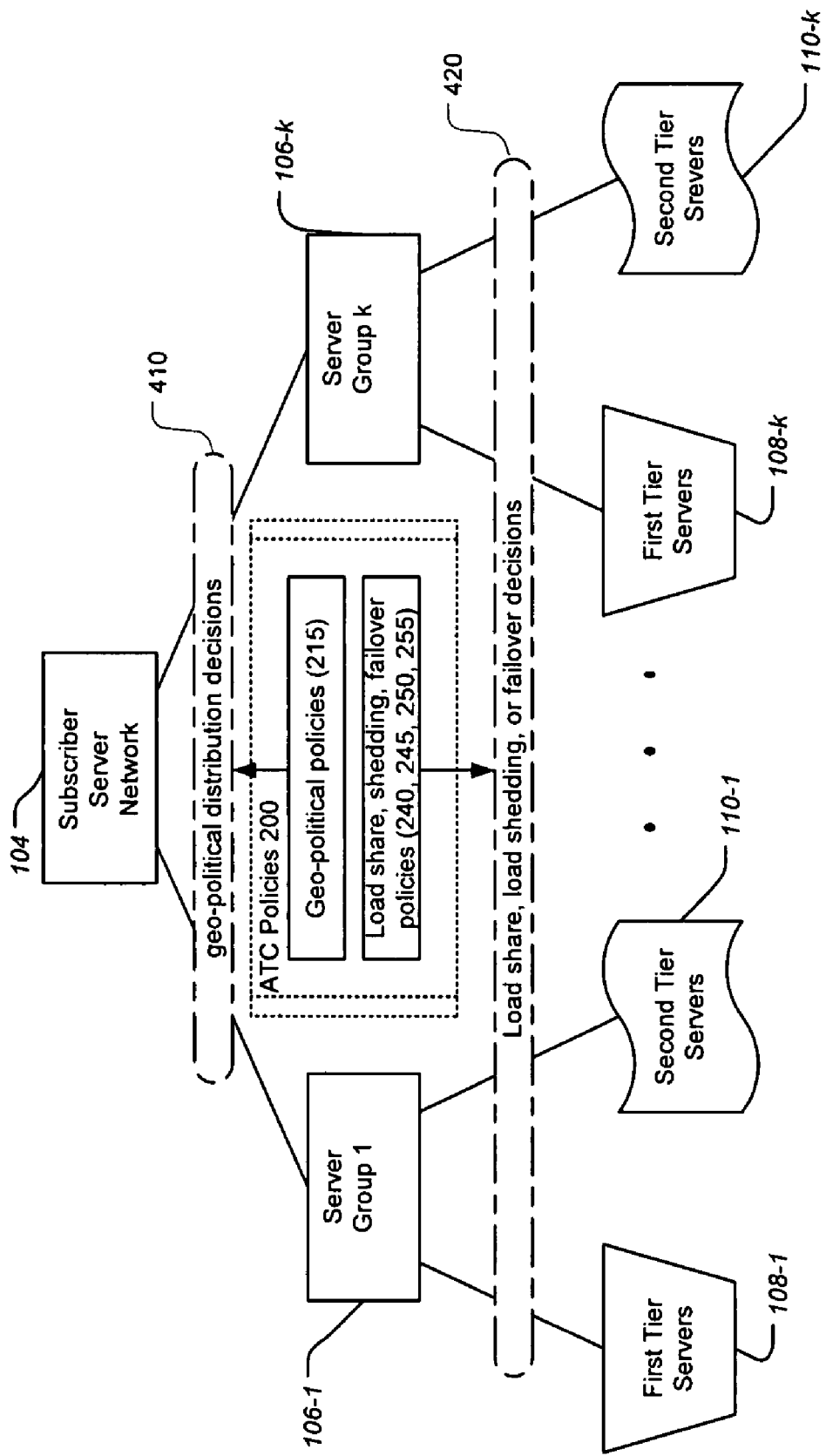
FIG. 4 shows an exemplary relationship between a subscriber's network hierarchy and subscriber policies.

FIG. 4 depicts an exemplary relationship between the subscriber server network 104 and the subscriber policies 120, according to embodiments of the present invention. The subscriber server network 104 is depicted in FIG. 4 as a network hierarchy or a tree in which the subscriber server network 104 includes server group 1 106-1 through server group k 106-k, and each server group may include its own primary server group 108 in the first tier and overflow server group 110 in the second tier (e.g., server group 1 106-1 has primary server group 108-1 and overflow server group 110-1 associated therewith, while server group k 106-k has primary server group 108-k and overflow server group 110-k associated therewith).

The subscriber policies 120 govern selection of one or more servers within the subscriber server network 104 (or in some other network of servers) so that their IP addresses may be returned in response to DNS requests from the client 112 (resolver 116). To determine or to select appropriate servers in the subscriber server network 104, the decisions may be hierarchical. For example, as shown in FIG. 4, at the level of the subscriber server network 104, the ATC mechanism 126 may make geo-political distribution decisions 410 to determine which server group should be selected. Once a particular server group is selected, the ATC mechanism 126 may further determine which particular servers in the group should be selected according to, for example, how the traffic load should be shared among the servers within the server group. Decisions at server group level may be based on the load share policies 240. This decision making process illustrates that, at each branch node in the server hierarchy, appropriate ATC policies may be applied to govern the selection of an appropriate server or servers.

As illustrated in FIG. 4, the geo-political policies 215 may be applied to control the selection of a particular server group, the load share policies 240, the tiered failover policies 245 and 250, and the shedding policies 255 may be applied to re-direct traffic. That is, the subscriber server network 104 forms a tree and the ATC policies 200 govern the flow from the top of the tree to one or more leaves of the tree. The ATC mechanism 126 controls the flow by applying the ATC policies 200.

Figure 5:
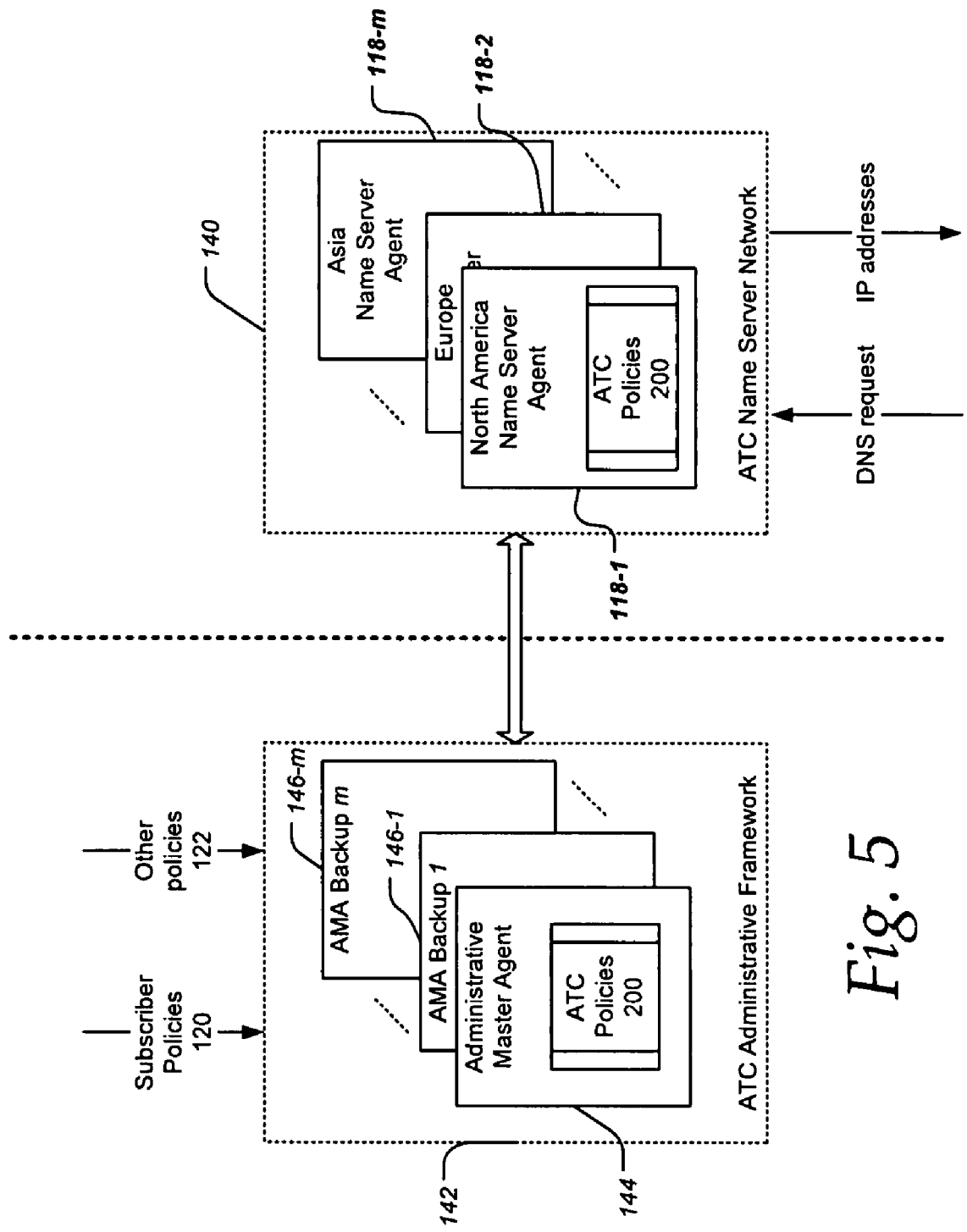
FIG. 5 depicts a high-level architecture of an adaptive traffic control framework.

FIG. 5 depicts a high level architecture of an adaptive traffic control (ATC) framework according to embodiments of the present invention. The ATC framework comprises an ATC administrative framework 142 and an ATC name server network 140. The ATC administrative framework 142 is responsible for various administrative tasks associated with subscribers or other policy making entities (138), include manipulating and storing the ATC policies 200, propagating or broadcasting the ATC policies 200 to name servers in the ATC name server network 140, monitoring name server behavior, generating status reports to display monitoring results on appropriate media, and sending alert to a network operation center (NOC) 148 (see FIG. 1) and the subscriber 102.

The ATC name server network 140 is responsible for responding to DNS requests, including processing DNS requests, applying the ATC policies 200 to select one or more servers from the subscriber server network (or a different designated network), and replying with the IP address(es) of the selected server(s). The ATC name server network 140 dynamically maintains the ATC policies 200, that are either received from the ATC administrative framework 142 or updated according to the dynamic operational status of the servers. The ATC name server network 140 provides domain name-IP address resolutions based on dynamically updated ATC policies 200. The ATC name server network 140 may also monitor the operational status of individual name servers within the network and supply logging and monitoring data to the ATC administrative framework 142.

The ATC administrative framework 142 may be designed to have fault-tolerance. For example, as depicted in FIGS. 1 and 5, the ATC administrative framework 142 may include an administrative master agent (AMA) 144, and one or more AMA backups 146-1, ..., 146-m (collectively 146). All AMA agents, including the master agent 144 and the backups 146 may be capable of performing the exact functions except that one of them (e.g., master AMA 144) may be a central or primary administrative master agent and others (e.g., AMA backups 146) may be backup or secondary or redundant master agents. The central or primary AMA 144 may be responsible for regularly backing up the AMA backup agents 146. When, for whatever reason, the primary AMA 144 is no longer functioning properly, one of the AMA backups 146 may take on the role of the central or master AMA 144.

The ATC name server network 140 may comprise a plurality of name server agents 118-1, 118-2, ..., 118-k, each of which may be designed to be responsible for the DNS requests of a particular geographical (or any other administrative or functional) region. For example, the name server agent 118-1 may be responsible for processing all the DNS requests from North America, the name server 118-2 may be responsible for Europe's DNS requests, and the name server 118-3 may be responsible for DNS requests from Japan. In addition, a name server agent may also serve as a back up name server agent for other name server agents in the network. For example, if the North America name server agent is not functioning properly, the Europe name server agent may be temporarily assigned to handle the DNS requests from North America. For that purpose, all ATC policies may be propagated to all of the name server agents in the ATC name server network 140.

Figure 6:
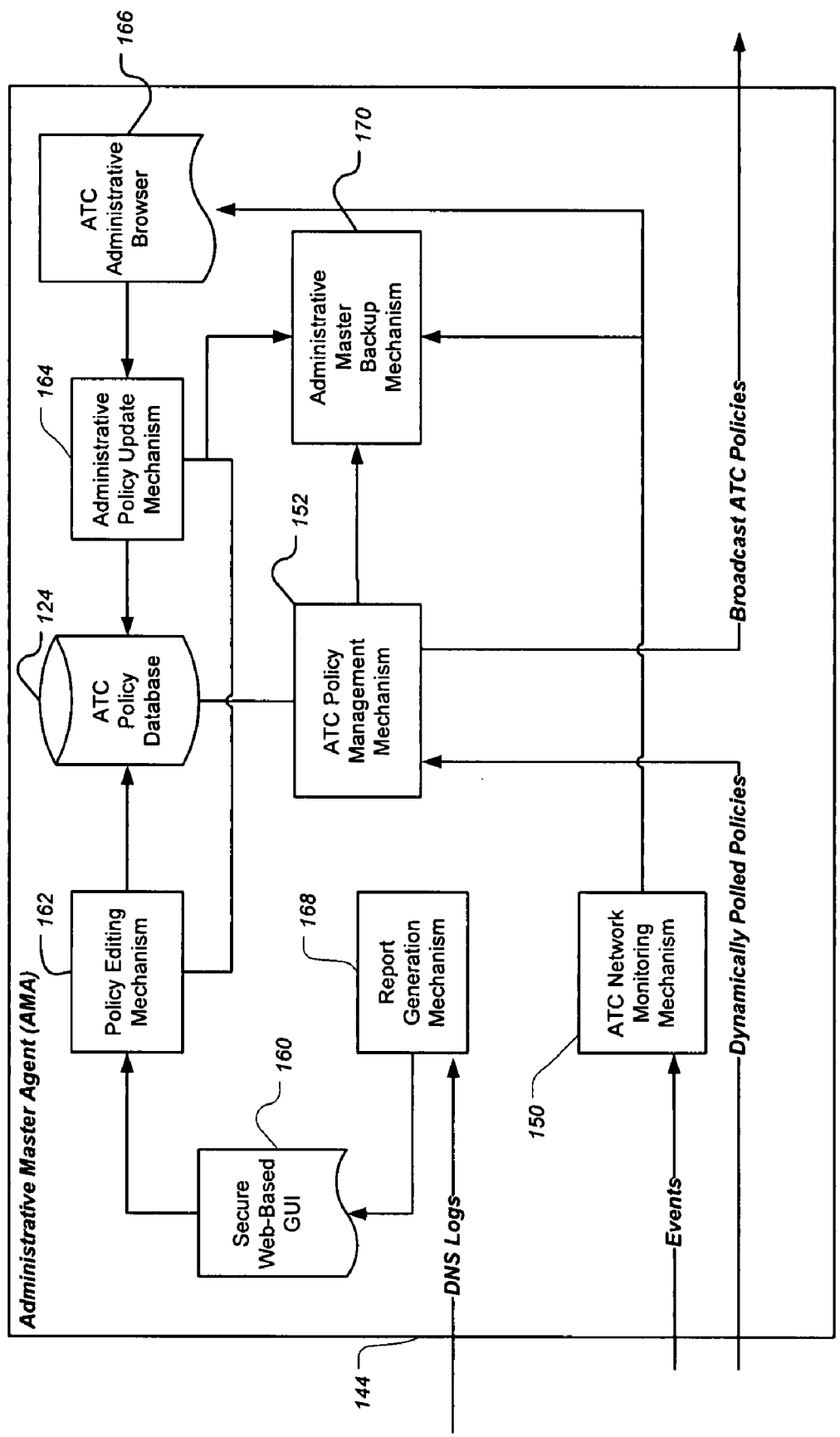
FIG. 6 depicts a high level functional block diagram of an administrative master agent (AMA)

FIG. 6 depicts a high level functional block diagram of an administrative master agent (AMA) 144 according to embodiments of the present invention. The AMA 144 comprises a secure web-based graphical user interface 160, a policy editing mechanism 162, an ATC policy database 124, an administrative policy update mechanism 164, an ATC administrative browser 166, an ATC policy management mechanism 152, a report generation mechanism 168, an ATC network monitoring mechanism 150, and an administrative master backup mechanism 170.

The ATC policy database 124 stores the ATC policies 200. As discussed above, the ATC policies 200 may include policies from different sources (e.g., from subscribers and from other entities that control network traffic). Both the subscriber policies 120 and other policies 122 may be defined and provided to the AMA 144. In the exemplary configuration shown in FIG. 6, the policies may be received at the AMA 144 through the secure web based GUI 160. There may be other means through which the policies can be delivered to the AMA 144 and will be discussed later. The policy editing mechanism 162 organizes the received policies to form the ATC policies 200 and then stores them in the ATC policy database 124.

The ATC policy management mechanism 152 may broadcast or propagate the ATC policies 200 to relevant name servers in the ATC name server network 140 so that the ATC policies 200 may be used to control the domain name translation service. The stored ATC policies may be dynamically updated via different means. For example, the policies may be updated through the ATC administrative browser 166, or the administrative policy update mechanism 164 may revise existing ATC policies.

Alternatively, the AMA 144 may also be provided with policies from different sources through the ATC policy management mechanism 152, which may regularly poll dynamically updated policies from different locations. Such locations may include designated network locations that are designated to provide dynamic policy related information or servers (either in the subscriber server network 104 or in the CDN 105) that are classified as managed servers. For instance, a server may dynamically specify its load share via a designated file stored on the server or at some other location (the file may reside on the server being monitored or at some other location, e.g., a central load controlling server). To retrieve such dynamically defined load share information from a managed server, the ATC policy management mechanism 152 may poll the designated file stored on the managed server to obtain relevant load share information. Dynamic policies may also be polled from other policy making entities.

Broadcasting ATC policies may take place periodically according to some pre-defined interval or may be triggered whenever the stored ATC policies are updated. The ATC policy management mechanism 152 may monitor changes made to the existing ATC policies. The ATC policy management mechanism 152 may poll the ATC policies stored in the ATC policy database and see whether there are changes. On the other hand, whenever the ATC policy management mechanism 152 polls dynamic policies from specified locations (such locations may be specified in existing ATC policies), it may determine whether the dynamically polled policies differ from existing ATC policies. In the event that updated policies are different from the existing ATC policies, the ATC policy management mechanism 152 may re-broadcast the updated ATC policies to the ATC name server network 140.

The ATC network monitoring mechanism 150 may collect DNS log summaries from different name servers in the ATC name server network 140. Such summary log data may be received in the form of events that provide information such as, for example, the number of requests directed to particular servers in a given time period. The ATC network monitoring mechanism 150 may collectively processes such DNS log summaries (or events) from the entire ATC system. The report generation mechanism 168 may generates monitoring status reports from these summaries and makes such reports available to the subscriber 102 via the secure web-based GUI 160.

The administrative master backup mechanism 170 may periodically update the AMA backups 146-1, ..., 146-m to ensure that all the backup agents are current. This may include replicating the ATC policies, the operational status of various control mechanisms (including the ATC policy management mechanism 152), the policy editing mechanism 162, and the administrative policy update mechanism 164, and providing the up-to-date information to the AMA backups.

A major function of an administrative master agent is to manage the ATC policies, to make sure that updated ATC policies are supplied to the name server agents in the ATC name server network 140, to monitor the various name servers' performance, to generate dynamic monitoring status report of system performance, and to maintain a connection through which policies may be updated dynamically and monitoring report can be examined.

Information flagging system errors and other anomalous conditions is collected by the ATC network monitoring mechanism or agent 150. FIG. 7 depicts an internal functional block diagram of an ATC network monitoring mechanism 150, according to embodiments of the present invention. The ATC network monitoring mechanism 150 includes a trap handler 176, a processing mechanism 182, and an alert generation mechanism 184. The trap handler 176 traps events from the name servers in the name server network 140. The processing mechanism 182 analyzes both the collected trapped events, and, based on analyzed information, the alert generation mechanism 184 generates alerts when necessary, and reports such alerts to, for example, the ATC's network operation center (NOC) 148 and the subscriber 102 (FIG. 1).

The trap handler 176 further comprises an event receiver 178 that intercepts trap events from the name servers and an event consolidation mechanism 180 which may classify the trapped events and organize them in a reasonable and appropriate fashion. The processing mechanism 182 may process the consolidated events to identify useful or informative patterns which may be further used, by the alert generation mechanism 184 to identify problematic patterns which may significantly affect the system performance.

The Adaptive Traffic Control (ATC) framework according to the present invention may be deployed as a stand-alone service directing traffic solely to the subscriber's servers, in conjunction with another content delivery network (CDN) provider, or in conjunction with any other service.

Each domain name server in the ATC name server network 140 may include (FIG. 1) a location determiner 128, an adaptive traffic control (ATC) mechanism 126, a monitoring agent or mechanism 130, a database manager 132, and a report generator 134. When a name server (e.g., 118-1) receives a request from the resolver 116 of the client 112, the location determiner 128 determines the location of the resolver and sends such location information to the ATC mechanism 126. Based on the location information, the ATC mechanism 126 retrieves relevant ATC policies from the policy database 124 (e.g., the subscriber policies 120 or the other policies 122) and selects one or more servers in the subscriber server network 104 according to the retrieved relevant policies. The corresponding IP address(es) or the CNAME of the selected servers are then returned to the resolver 116.

The database manager 132 maintains the policy database 124. It received policies broadcast from the ATC policy management mechanism 152 in the ATC administrative framework 142 and populates the policies in the policy database 124. The ATC policies received from the ATC administrative framework 142 may also include information that defines or classifies servers in the subscriber server network 104 (or in the CDN 105). For example, some servers may be defined as monitored servers and some may correspond to managed servers.

When the database manager receive such information, it may inform the monitoring mechanism 130 of the classification of the underlying servers so that the monitoring mechanism 130 can monitor each server according to its status. When the ATC policy management mechanism 152 broadcasts updated policies, the database manager 132 accordingly updates the relevant policies stored in the policy database 124.

The monitoring mechanism 130 monitors the operational status of the name server 118-1 and one or more servers in the subscriber server network. It may collect events occurred in the name server 118-1 during operations and send such events to the ATC network monitoring mechanism 150 in the ATC administrative framework 142. On the other hand, it may also monitor the operations of various servers in the subscriber server group 104 (or in the CDN 105) according to how each server is defined (monitored or managed server).

If a server is defined as a monitored server, the monitoring mechanism 130 may dynamically probe the server (as discussed earlier) to determine its availability. If a server is defined as a managed server, the monitoring mechanism 130 may monitor its availability during operation. The monitoring mechanism 130 may also poll dynamic load share information from the server. When the monitoring mechanism 130 detects that a server is no longer available, it may inform the database manager 132 to create a local policy that indicate that the server is no longer available so that the ATC mechanism 126 can take into account when resolving a hostname.

When the monitoring mechanism 130 polls the dynamic load share information from the server, it may inform the database manager 132 to update the load share policies in the policy database 124 that are affected by the dynamics of the polled load share. For example, if three primary servers in a server group originally have load share (0.3, 0.3, 0.4) and the third primary server now changes its load share to 0.2, the database manager 132 may accordingly update the load share among these three primary servers into (0.4, 0.4, 0.2).

The report generator 134 generates reports related to the operations of the underlying name server based on log information 136 recorded. Such generated reports may be sent to a report consolidator 154 in the ATC administrative framework 142 so that reports from different name servers may be consolidated.

A subscriber may activate (turn up) the ATC system (DNS servers) in one of two ways: using a DNS CNAME or using NS delegation. Instead of using ATC to direct traffic for a single DNS hostname, the subscriber may have many different subdomains that it would like to direct to ATC. For example, the subscriber might want all downloads from dl.customer.com handled by ATC, together with all of its subdomains, but have all other domains that it controls, such as www.customer.com, resolved by its own name server:

```
dl.customer.com. => ATC
any.thing.dl.customer.com. => ATC
www.customer.com. => not ATC
customer.com. => not ATC
```

In this case, instead of adding the CNAME record in the subscriber's DNS zone file, it simply delegates the dl.customer.com. name to ATC via NS records in its zone file.

The delegation (using NS-records) method is presently preferred as it is more flexible and offers all of the reliability, scalability and flexibility of ATC. After the initial contact for delegation, a properly operating resolver making occasional queries will not contact the subscriber's own name server or name servers again. The result provides much better name resolution performance since the unnecessary overhead of routing each fresh DNS request through the subscriber's name server is eliminated. The CNAME method keeps the subscriber's own name server in the loop. That is, whenever the CNAME TTL expires, client resolvers will return to the subscriber's name servers to refresh the record.

For both CNAME and NS delegation methods, the procedure to turn off the ATC switch is the same—the subscriber edits its DNS zone files to remove the delegation authority to ATC. DNS requests will continue to be served in accordance with the subscriber's defined ATC policies until the TTLs have expired on the appropriate delegations.

The System in Operation

Figure 8A:
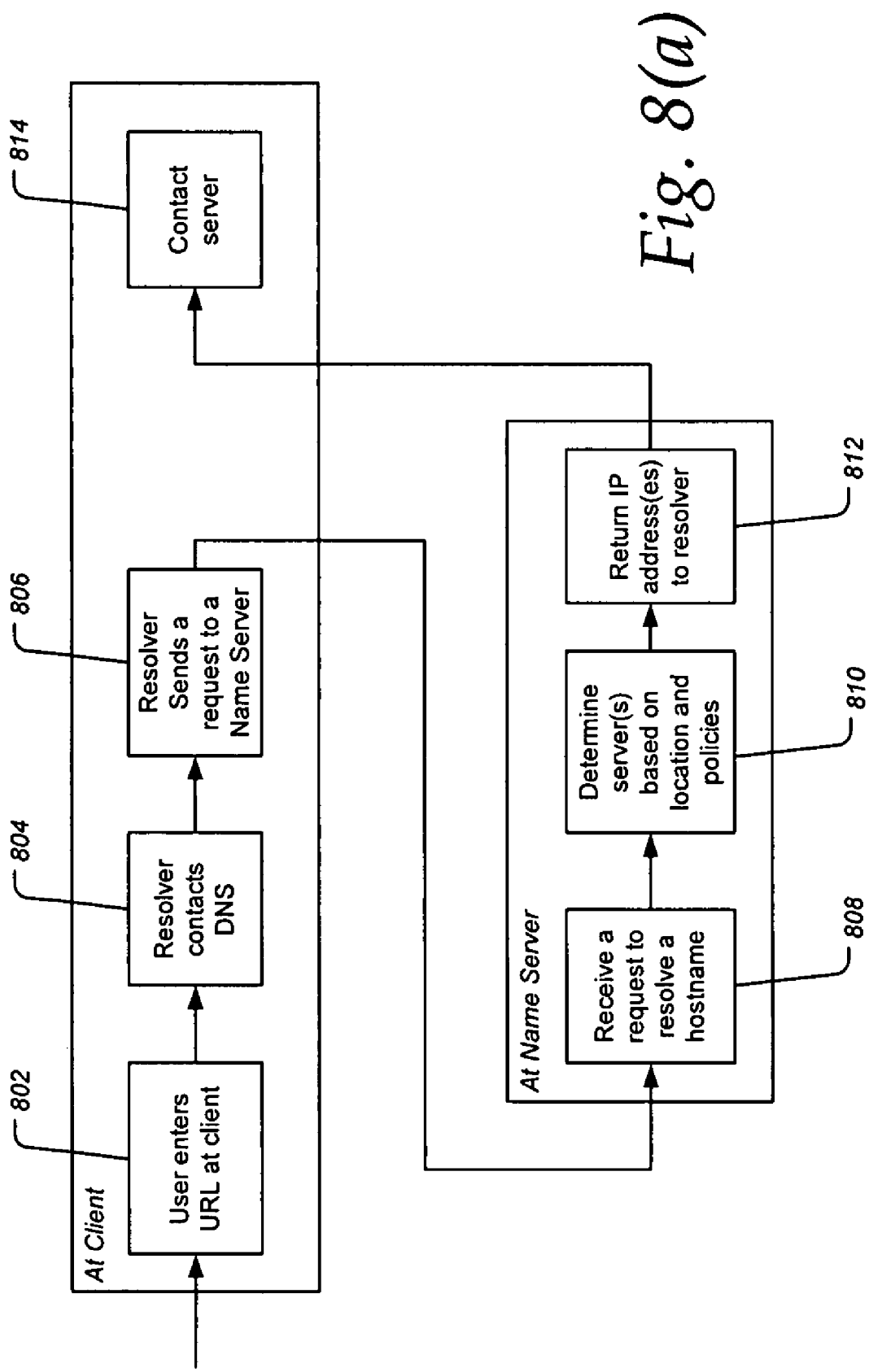
FIG. 8(a) is an exemplary flowchart of a process, in which a content delivery framework provides adaptive policy-based domain name service.

FIG. 8(a) is an exemplary flowchart of a process, in which a name server resolves a DNS request based on ATC policies, according to an embodiment of the present invention. First, a user enters a URL into the user's browser 114 (or into any application that accepts URLs as input and obtains the corresponding resource for the client) (at 802). The client's resolver 116 attempts to resolve the hostname of the URL in order to obtain an IP address of a server from which the resource identified by the URL can be obtained (at 804). The resolver 116 will be directed by the client's DNS (not shown) to a DNS Name Server 118 in the ATC name server network 134 (at 806). The resolver 116 provides the name server 118 with the hostname it is attempting to resolve.

The name server 118 receives the request to resolve the hostname (at 808) and determines one or more servers in the subscriber server network 104 or in the CDN 105 that can process the client's request according to the location of the resolver 116 as well as relevant ATC policies retrieved from the policy database 124 (at 810). Details of this operation are described with reference to FIG. 8(b). The IP address(es) of the selected server(s) are returned to the requesting resolver 116 (at 812). The browser 114 then connects to one of the servers (at 814) in order to obtain the requested resource.

Figure 8B:
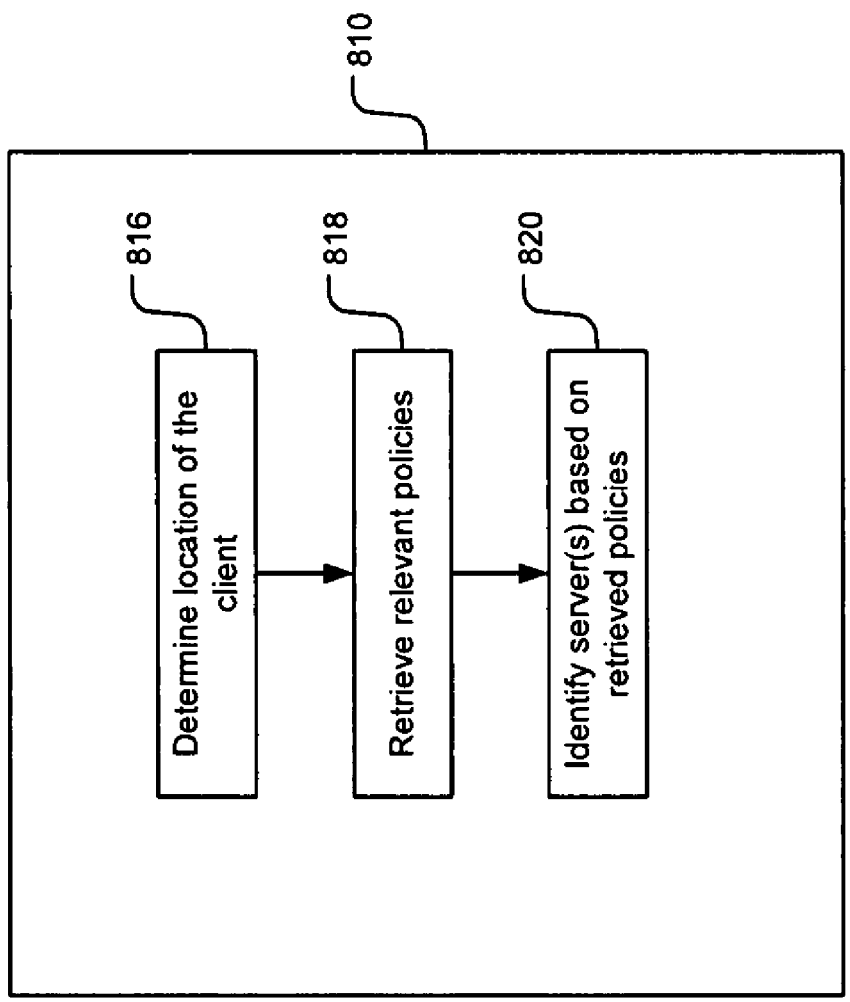
FIG. 8(b) is an exemplary flowchart of a process, in which a domain name server resolves a hostname based on policies.

FIG. 8(b) is a flowchart of an exemplary process, in which a domain name server selects one or more servers according to location of the client and relevant ATC policies. The location of the resolver 116 (or client) is first determined (at 816). Relevant ATC policies are then retrieved (at 818) from the policy database 124. One or more servers in either the subscriber server network 104 or the CDN 105 are selected according to the determined location of the client and the relevant ATC policies (at 820).

Figure 8C:
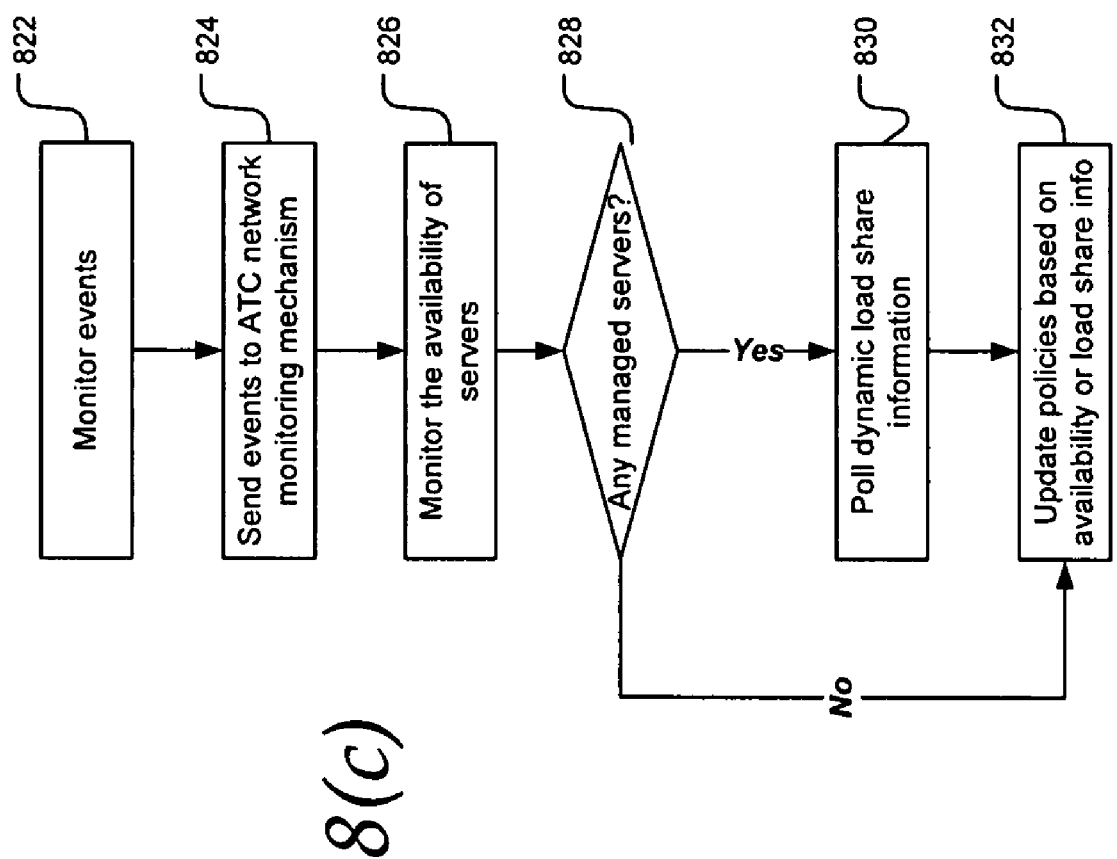
FIG. 8(c) is an exemplary flowchart of a process, in which a monitoring mechanism of a domain name server dynamically monitors the name service operations as well as the availability and the load share status of servers.

FIG. 8(c) is a flowchart of an exemplary process, in which the monitoring mechanism 130 in a domain name server monitors the operations of the name server as well as one or more servers in the subscriber server network 104 or the CDN 105. Events occurring during domain name service are monitored (at 822). Such events are sent to the ATC network monitoring mechanism 152 (at 824). In addition, the availability of the one or more servers are also monitored (at 826). Furthermore, if any of the one or more servers is defined as a managed server (determined at 828), dynamic load share information is polled (at 830). Both the availability information and the dynamic load share information (if any) are used to update some ATC policies that are local to the name server (at 832).

Figure 8D:
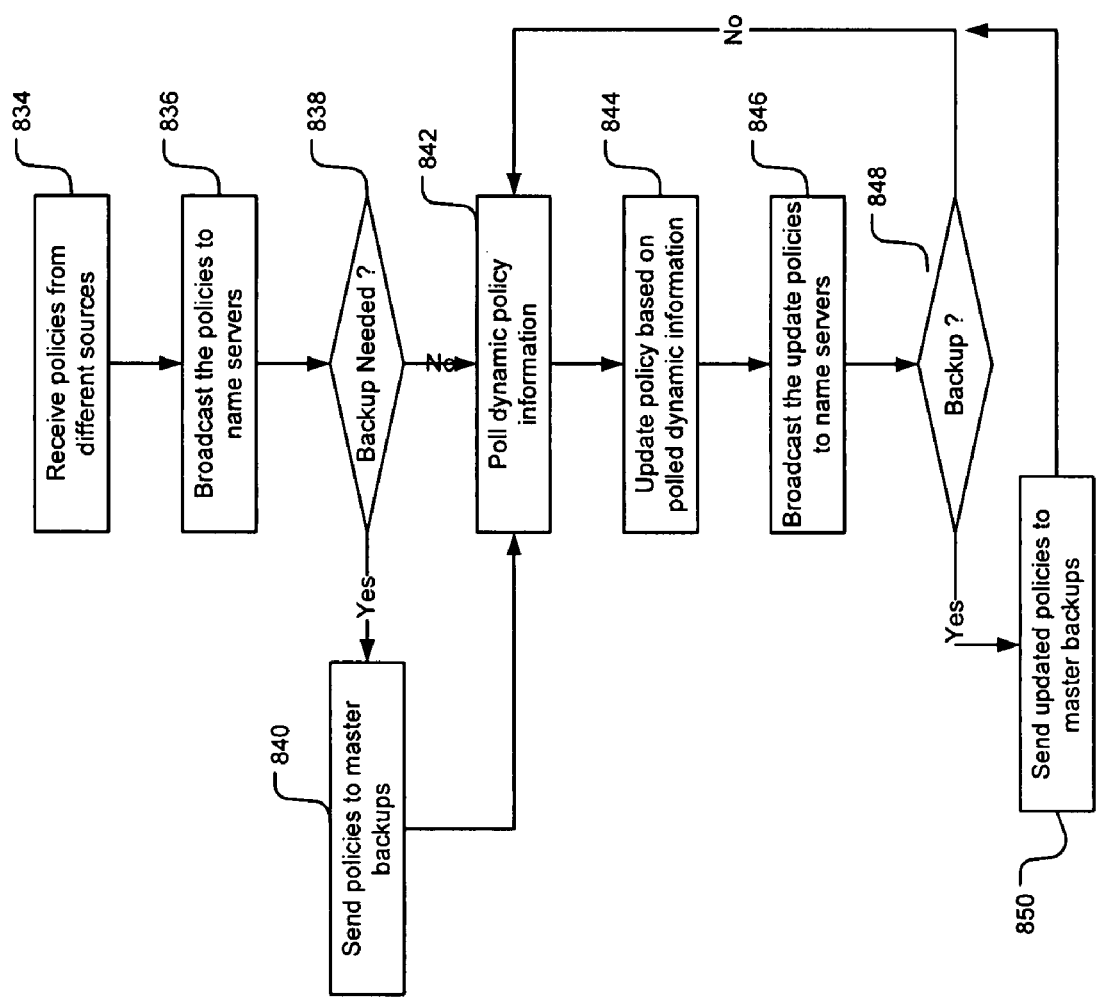
FIG. 8(d) is an exemplary flowchart of a process, in which an ATC administrative network maintains dynamic policies and monitors the operations of a content delivery framework.

FIG. 8(d) is a flowchart of an exemplary process, in which the ATC policy management mechanism 152 dynamically maintains and broadcasts the ATC policies. Initially, policies from different sources are received (at 834) and broadcast to the name servers 118 (at 836). If backup is necessary (determined at 838), the ATC policy management mechanism 152 sends current policies to the master backup agents 146 (at 840).

The ATC policy management mechanism 152 also performs dynamic policy maintenance. It polls dynamic policy information (at 842) at certain defined intervals and uses such polled dynamic policy information to update existing policy (at 844). The updated policies are then broadcast to the name servers (at 846). If the updated policies need to be propagated to the backup agents (determined at 848), they are sent to the master backup agents (at 850).

Figure 8E:
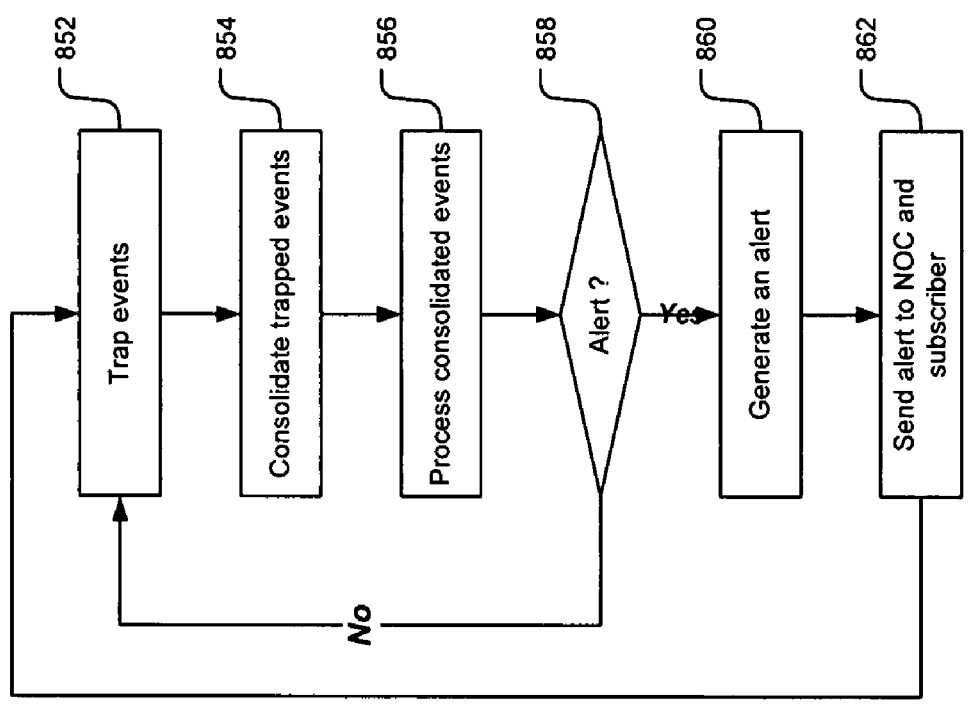
FIG. 8(e) is an exemplary flowchart of a process, in which an ATC network monitoring mechanism traps events from different domain name servers and generates alerts when necessary.

FIG. 8(e) is a flowchart of an exemplary process, in which the ATC network monitoring mechanism 150 monitors operations of the name servers and sends alert to the NOC 148 and the subscriber 102. Events sent from monitoring mechanisms of different name servers are trapped (at 852). Such trapped events from different sources are then consolidated (at 854) and processed (at 856). If there is any alarming situation (determined at 858), the ATC network monitoring mechanism 150 generates an alert (at 860). The generated alert is then sent to both the NOC 148 and the subscriber 102 (at 862).

Policy Administration

The ATC policies may be initially set up and later adaptively updated according to servers' dynamic operational status. The ATC policies may be formed via various means. The described approaches may also be applied to form other policies. A GUI approach or a file-based approach (or both) may be employed to set up subscriber policies. Through the GUI approach, different means to form subscriber policies may be adopted. For example, a browser may be used so that a subscriber can enter policies directly. An XML file containing descriptions of the subscriber policies may also be loaded using GUI approach so that the policies may be parsed and stored. As another alternative, a file containing descriptions of the subscriber policies may also be loaded in a similar fashion and parsed accordingly. When a file based method is used, a file containing descriptions of the subscriber policies, either constructed based on XML or some other structure, may be accessed via other means such as FTP.

In some preferred embodiments, a subscriber accesses a secure web-based GUI 160 (FIG. 6) using subscriber's secure browser interface 156.

FIGS. 9(a)-9(c) show exemplary secure web based graphical interfaces, through which a subscriber may define load share policies and overflow policies with respect to specified network resources, according to embodiments of the present invention. There may be different types of load sharing servers: (1) static servers, (2) dynamic servers, and (3) overflow servers. A dynamic server is one that is specified as either a monitored or a managed server whose dynamic availability may be monitored and whose load may be re-directed when it becomes unavailable. In the case of a monitored server, both of its load share and load shed fraction may also be made dynamic.

Correspondingly, the policies governing routing requests to different types of servers may also be defined accordingly. First, the policies that govern static servers are applied when servers are relatively static and do not change often over time. This may mean that the availability of the servers is fairly stable and load sharing among different servers is also relatively stable. The policies that control dynamic servers are applied when servers are expected to change frequently. Such policies include failover policies, shedding policies, and tiered failover policies (described earlier). The overflow policies control the change of flow of the requests when, for some reason, primary servers, either static or dynamic, become unavailable or overloaded. In this case, relevant overflow policies determine to which overflow server a request for name service should be directed.

The load share with respect to a given server represents the amount of traffic that will be sent to that server within a static server setting. An exemplary method to compute the load share of the traffic sent to the server is to sum the load share amount of all servers in a current static server setting and divide the load share for that server by the summed total to derive the load share.

The shed fraction for a given server represents the percentage of traffic that should be redirected away from the server. The redirection may be carried out after load share is made based upon load share policies. FIG. 9(a) gives an example interface, in which each of the servers listed is assigned various selection related parameters. For example, for each server, a TTL is specified. In addition, a load share and a shed fraction may also be specified. For example, both servers New York and London have load share of 1.0. The shed fraction assigned to server New York is 0.2, meaning that 20% of its load is re-directed to some other server, and the shed fraction assigned to server London is 0.3, meaning that 30% of its load is re-directed to some other server.

Shedding fractions may also be computed automatically on the fly. For example, when a server is detected to have slow response, indicating that it may be overloaded, a shedding fraction may be computed according to the discrepancy between its expected response time and the actual response time. Such an automatically computed shedding fraction can then be applied to re-direct the newly computed fraction of the traffic to a different server to unload some of the traffic originally intended to be directed to the overloaded server.

For each resource server, an on-line flag may also be set to indicate whether the server is currently available. This flag is shown in FIG. 9(a) in the rightmost column. With this flag, a server may be temporarily removed from the service, if, for instance, a server needs to be taken down for maintenance.

Since managed and dynamic servers are expected to change relatively frequently, policies that govern their selection may be defined in two stages. The policies for managed and dynamic servers may be initially specified in a similar fashion as for static servers. For instance, load share and shed fraction can be defined for dynamic servers New York and London, as shown in FIG. 9(a). During operation, however, the policies that govern the selection of managed and dynamic servers may be established dynamically. For example, initially defined policies (e.g., load share, shed fraction, and on-line flag) may be adaptively revised based on, for instance, an on-line status report retrieved from one or more specified locations on the network. Dynamic policies provide considerable flexibility in how the selection may be conducted in a manner that is adaptive to the network health or any other network performance related factors (e.g., maintenance).

The on-line status report may be provided at one or more network locations specified by the subscriber. The locations may be specified as a Uniform Resource Locator (URL) and may be accessed through an HTTP request. A location of the status report may be specified in the initial policy, providing a constant link to the location. FIG. 9(b) shows an exemplary GUI for specifying an URL link to a status report. An URL link for the location of the status report is specified as "http:// server" which corresponds to a server named London with an IP address of 10.0.0.3. The access may be authenticated and such authentication requirements may also be specified in the initial policies. The on-line accessed status report may be constructed based on information gathered during monitoring the servers' performance. For instance, each server in the subscriber server network may provide a status report containing information related to its performance. Name servers in the ATC name server network may poll such information from such servers and such information may be used to update policies.

The frequency with which the status report is accessed may also be specified explicitly. For example, it may require the relevant mechanisms (specifically, the ATC policy management mechanism or the monitoring mechanism of each name server) to poll the status report at a regular time, e.g., every thirty seconds.

A status report may be constructed using some standard language such as extendible Markup Language (XML). Such a status report may contain revised policies, which may be determined by the subscriber manually based on network performance, devised by an automated process based on network performance, or may be generated by an individual managed server. In such cases, the status report includes updated policies and when it is polled, the updated policies are used in future traffic control. For example, a managed server may re-define its load share of according to its dynamic capacity. When such dynamically defined load share information is accessed and used in enforcement, the traffic is controlled in a manner that is adaptive to the network dynamics.

When a status report is accessed, the relevant mechanisms (e.g., the ATC policy management mechanism in the ATC administrative framework or the ATC mechanism in corresponding name server) updates the associated policies based on the information contained in the status report. For example, a status report may indicate that the current load share for server New York should be 0.4 (down from 1.0 previously) with the same shed fraction (0.2) and the current load share for server London should be 0.5 (down from previous 1.0) with 0.4 shed fraction (40% shed fraction). An alternative scenario may be that the status report provides network performance data about each dynamic server and the ATC mechanism, after accessing the status report, determines how the current policies may be revised accordingly.

When the status report provides dynamic policies, it may, in general include, for each dynamic server, the following information:

<ServerStatus loadShare="LS" shedFraction="SF" online="Boolean"/> where LS and SF represent numerical numbers and "Boolean" represents a logical value of either "true" or "false".

With respect to dynamic servers, with the mechanism of dynamic policies described above, a subscriber or a server can easily specify changes to existing policies (e.g., changes to load share, shed fraction policies and the On-line flag) without having to update an entire ATC policy hierarchy. In addition, a parameter (called "Down on line" in some embodiments) can be set in an ATC policy to control the behavior of the ATC mechanism under the circumstance that the ATC policy management mechanism is unable to properly access the status report due to reasons such as a failed polling or retrieval or failing to parse the status report's content. According to some embodiments of the present invention, three different exemplary approaches may be applied to handle the situation.

With the first approach, a subscriber may instruct an ATC mechanism in a name server not to select a particular server if the status report for that server can not be properly obtained. The subscriber may specify this policy by setting parameter "Down on line" to false. In this case, the ATC mechanism will not consider the underlying server as a candidate for selection process until the polling mechanism retrieves a valid status report.

The second approach to deal with a polling failure is to allow the ATC mechanism to select the underlying dynamic server according to its default policies (or original policies). To specify this solution, the subscriber may set the "Down on line" parameter true.

The third approach to handle the situation where the status report can not be properly retrieved is to allow the ATC mechanism to select the underlying server if its "on line" flag is on (it is available). To achieve this, a subscriber may specify only the "on line" ServerStatus in the status report, with parameter "Down on line" set to either true or false. In this case, the ATC mechanism will use a load share and a shed fraction specified in the policy when the "On line" flag is set to true. The load share and the load shed fraction may both be dynamically determined (either broadcasted from the ATC policy management mechanism or polled by the ATC mechanism 130 from the underlying server.

Static, dynamic and managed servers are primary servers, although their selection may be controlled by operationally different policies. The third type of servers are called overflow servers. They provide alternatives when primary servers, for some reason, can not be selected. Typically, an overflow server corresponds to a Canonical name or CName, pointing to a service providing a CDN (such as, e.g., the CDN service offered by Level 3 Communications). The choice of overflow servers may be determined based on the belief that they are in general always available. An overflow server may be defined through a window illustrated in FIG. 9(c). In FIG. 9(c), overflow servers are defined by a CName, which points to the CDN server address "customer.footprint.net" (e.g., the CDN 105, shown in FIG. 1).

EXAMPLES

Example A

Figure 10A:
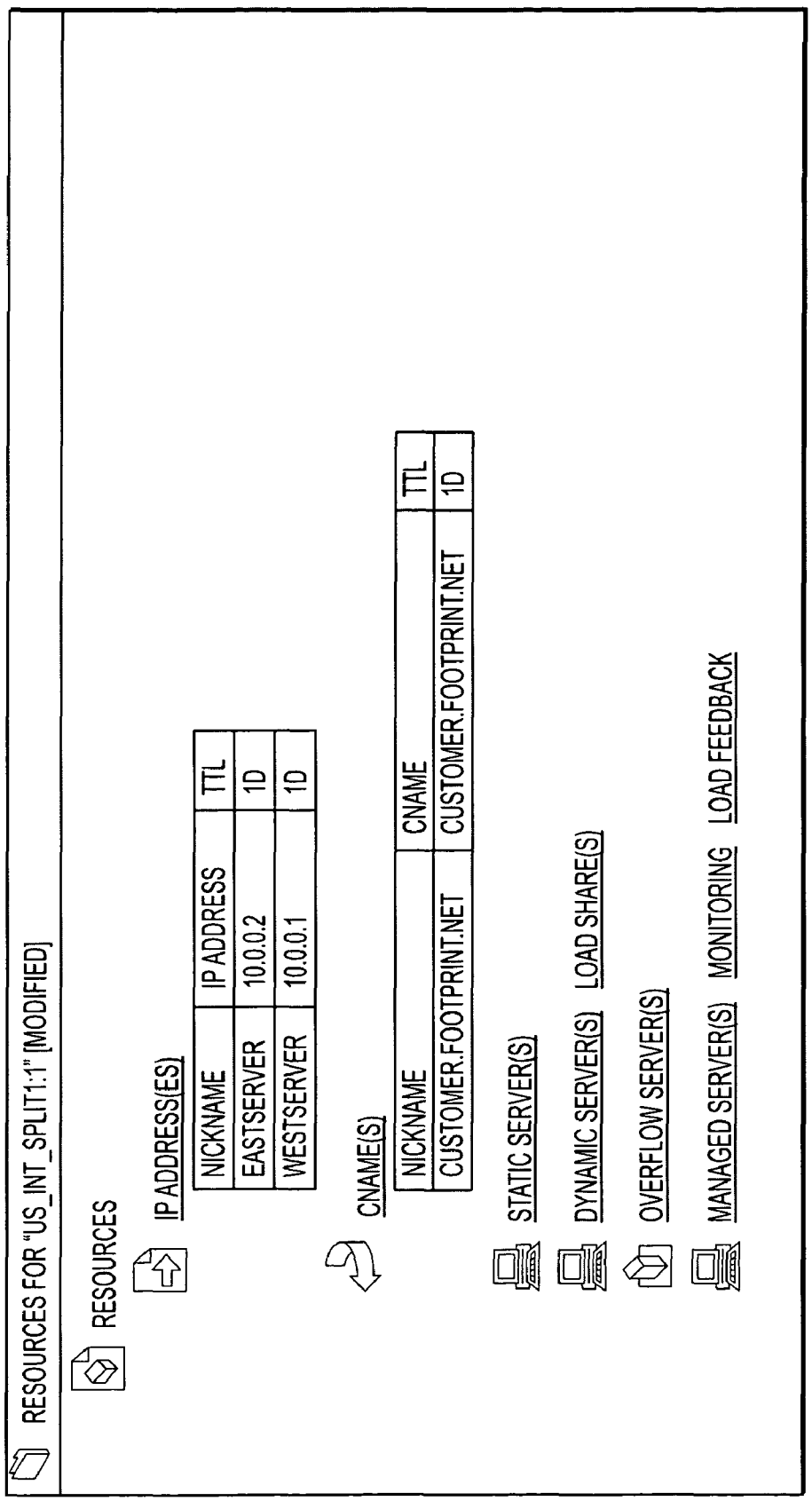
FIGS. 10(a)-10(o) show exemplary subscriber policies.
Figure 10B:
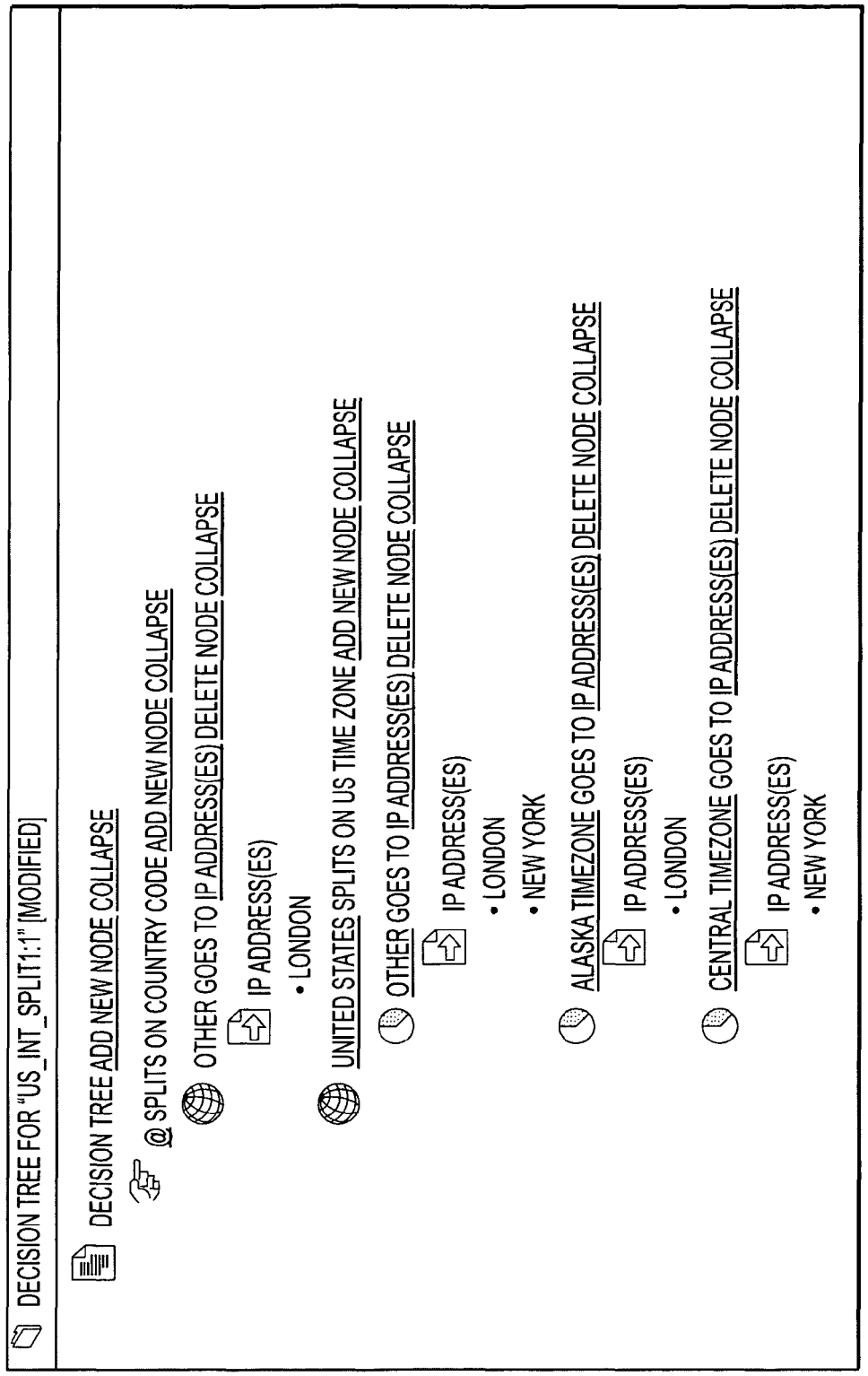

FIGS. 10(a)-10(b) show example subscriber policies, defined based on a set of resource servers, that govern the selection of the servers according to different criteria such as geographical location of an incoming request and the time zone of each of the locations. In FIG. 10(a), three different resource servers are defined, including an "eastserver" with IP address 10.0.0.2, a "westserver" with IP address 10.0.0.1, and a service network with CName "customer.footprint.net". Here, the service network may include more than one servers.

FIG. 10(b) shows an exemplary decision tree embedded in a set of geographical policies that guide how the traffic should be directed to a set of servers. In the decision tree depicted in FIG. 10(b), the selection is first directed to different resources at the top level according to a split between the United States and rest of the world. A resource may correspond to either a single server (or CDN) or a group of servers (or CDNs). A request initiated from non-U.S. geographical regions is directed to a resource named "London". Within the United States, time zone based policies are further applied. A request initiated from a region within the central time zone is directed to a resource named "New Work". A request initiated from a region within Alaska time zone is directed to the resource "London". Finally, a request initiated from a region within the United States that does not fall in any of these time zones (i.e., Alaska or Central) can be directed to either "London" or "New York".

Example B

Figure 10D:
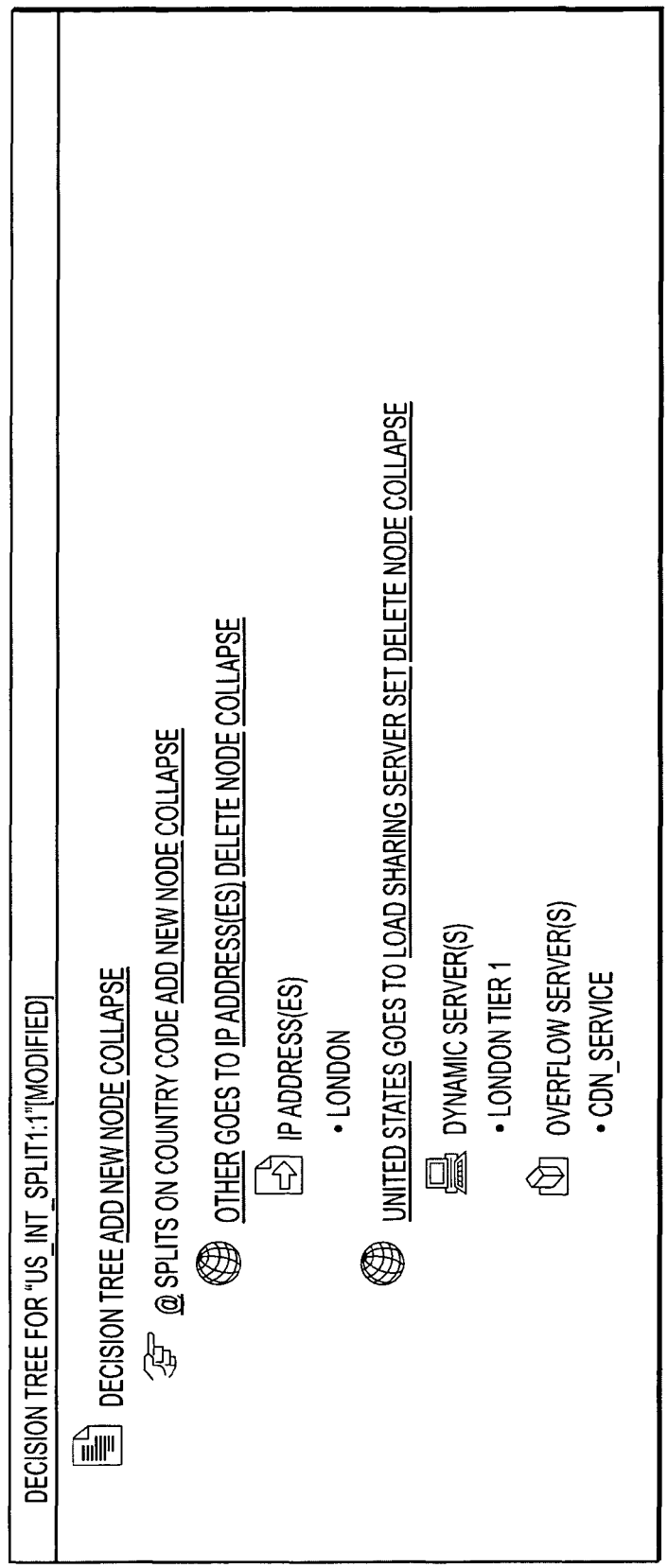

FIGS. 10(c)-10(d) show another example decision tree constructed based on a set of resources (servers or CDNs) and subscriber policies that are defined based on geographical locations of an incoming request with overflow policies that allow the ATC mechanism to direct traffic to pre-defined overflow servers when primary servers are not available. In the Resource window shown in FIG. 10(c), three resources are defined: static resources "London" and "New York", each defined based on its IP address, a service network named "Sydney" with CName "customer.sandpiper.net". Each resource may correspond to a set of servers such as a server group with certain hierarchy. Resource "London" is further defined as a dynamic resource and resource "Sydney" is further defined as an overflow server network nicknamed "cdn_service". FIG. 10(d) illustrates an example decision tree built based on these resources.

The decision tree in FIG. 10(d) first splits two ways at the top level based on whether a request is from the United States. When a request is initiated from the United States, it is directed, according to the policies illustrated in FIG. 10(d), to the dynamic servers at the first tier of resource "London". A request from the United States may also directed to one of the overflow servers in resource "cdn_service". This may happen when either all the primary servers at the first tier of resource "London" fail to function or when such primary servers are overloaded.

The next four examples (Examples 3-6) are based on an example subscriber which has ATC handling traffic for www.subscriber.com with a CNAME hand-off to www.subscriber.com.nsatc.net. The example subscriber has three datacenters, one in San Francisco, New York and London. The set of resources used by these four examples is shown in FIG. 10(e). Managed servers are used with monitoring since the example provides failover from one server to another. The default load share values vary: the San Francisco server can handle 2.5 times the traffic of the London or New York servers. The overflow server is utilized in only two of the example policies. It is a CNAME specification to a CDN—the Level 3 CDN.

Example C

Figure 10F:
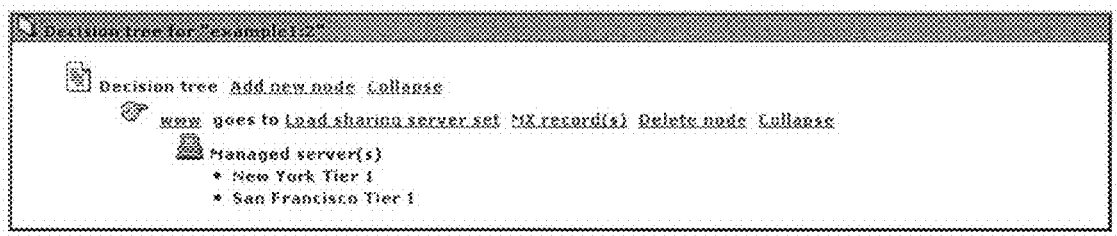

With this policy (FIG. 10(f)), the example subscriber does not utilize any geographic ATC rules, and the London server is not in use. End users are simply directed to one of the two servers, provided the ATC monitoring of that server indicates the server is up and functioning. Unlike standard DNS roundrobin techniques, ATC directs end users to the two servers in exactly the ratios specified by the load share values in the Resources Window (FIG. 10(e)). ATC will return the IP address of the San Francisco server 2.5 times as often as the New York server. If ATC monitoring detects that the New York server is offline, ATC name servers will immediately stop returning the IP address of the New York server and only return the San Francisco server IP address until the monitoring indicates the New York server has returned. If the example subscriber determines that any one of the servers has too much traffic, the load share of that server should be adjusted in one of two ways:

the subscriber can login to the ATC Admin GUI and change the load share value manually, or the subscriber can configure ATC to poll a load feedback URL for the load share value, and change that value on the fly Changing the shed fraction for any one server is not appropriate in this example because there is no defined lower tier or overflow server to receive shed traffic. Both servers are in the same tier.

A variation of this example is to put the New York server in Tier 2, i.e., have New York function as a backup. In this configuration, all traffic would be directed to the San Francisco server unless it was monitored as down or shedding in which case traffic would then go to New York. That is, if the San Francisco server had a shed fraction of, e.g., 10%, then ATC would return the New York server 10% of the time. When there is only one server in a Tier, there is no load share balancing for ATC to do, and the load share value becomes unimportant (unless zero).

This example demonstrates load share variation and server failover handling within a load sharing server set consisting only of managed servers.

Example D

Figure 10G:
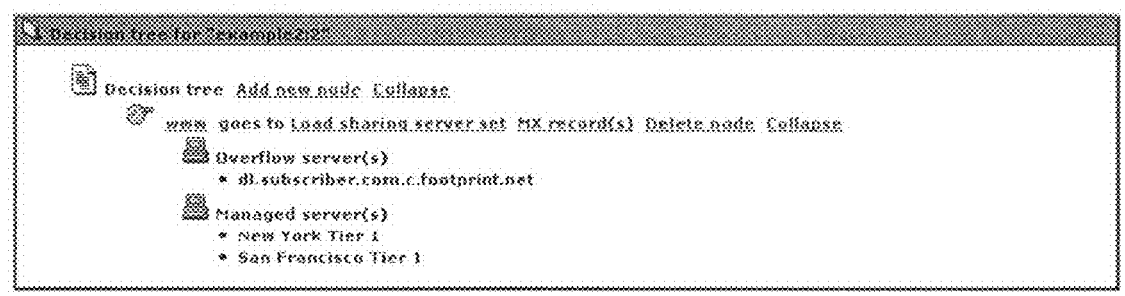

This policy (FIG. 10(g)) adds an overflow server to the server set of the previous policy example. The example subscriber has two methods to inform ATC that any one server should shed some of its traffic to the overflow server, in this case the Level 3 CDN. The overflow server is intended to be an effective large supply of bandwidth, to be used when the subscriber's servers are at capacity or when the lowest latency is required.

The shed fractions can be modified in one of two ways:

the subscriber can login to the ATC Admin GUI and change the shed fraction value manually; or the subscriber can configure ATC to poll a load feedback URL for the shed fraction value, and change that value on the fly The subscriber may maintain an even load across all subscriber servers by setting the load share. This value typically does not need continuous adjustment. Then, if traffic levels increase and all servers are nearing their capacity, all servers begin shedding traffic to the Overflow server(s) (in this example, "dl.subscriber.com.c.footprint.net", a CName for a CDN).

Example E

Figure 10H:
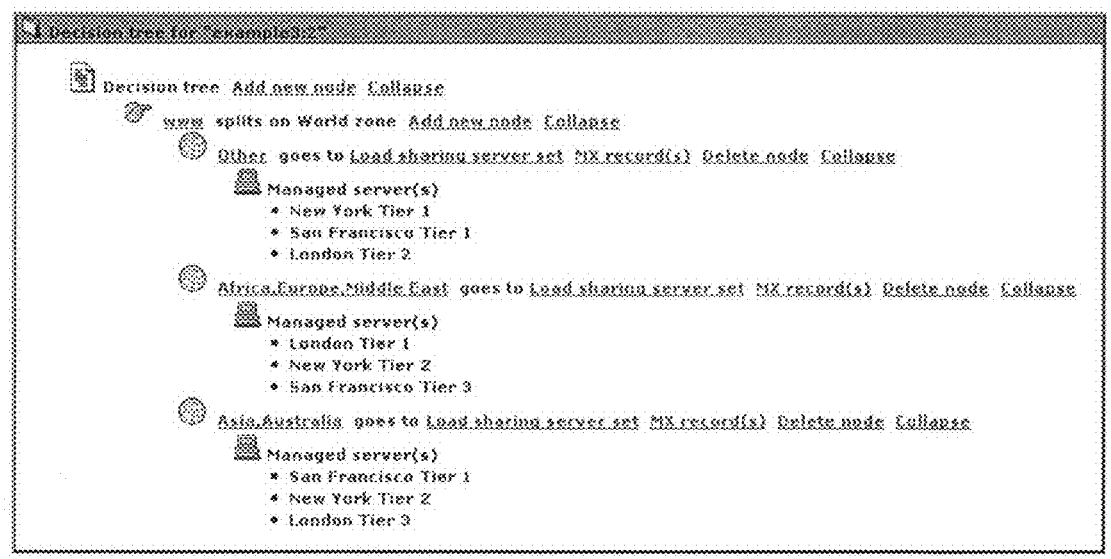

This example policy (FIG. 10(h)) utilizes geographic control to direct end users to the subscriber servers nearby, on a continental scale, improving end-user response time (latency). A variation in tiers is used to specify preferential and failover server selection. Within a load sharing server set, all servers in Tier 1 are considered first. Only if a server cannot be selected from Tier 1 (due to shedding or because it is off-line) is Tier 2 considered, and so on for Tier 3. Requests with end-user resolvers in Europe (and Africa and the Middle East) are directed to the London server, unless it is down or shedding, in which case traffic is sent to New York, and then San Francisco. Similarly, requests from Asia and Australia are directed to San Francisco, unless that server is down or shedding, in which case the lower tiers are used.

In this case, the subscriber does not have an overflow server defined. If the load on any server becomes too high, the shed fraction can be increased on that server and traffic will be sent to the lower tiers defined within each geographic region.

If both the San Francisco and New York servers are offline, all traffic is directed to the London server until the U.S. servers return. If all three servers are offline, ATC is unable to determine which servers are preferred and thus selects all three servers, with the hope that the end user may be able to connect to one of them.

Example F

Figure 10I:
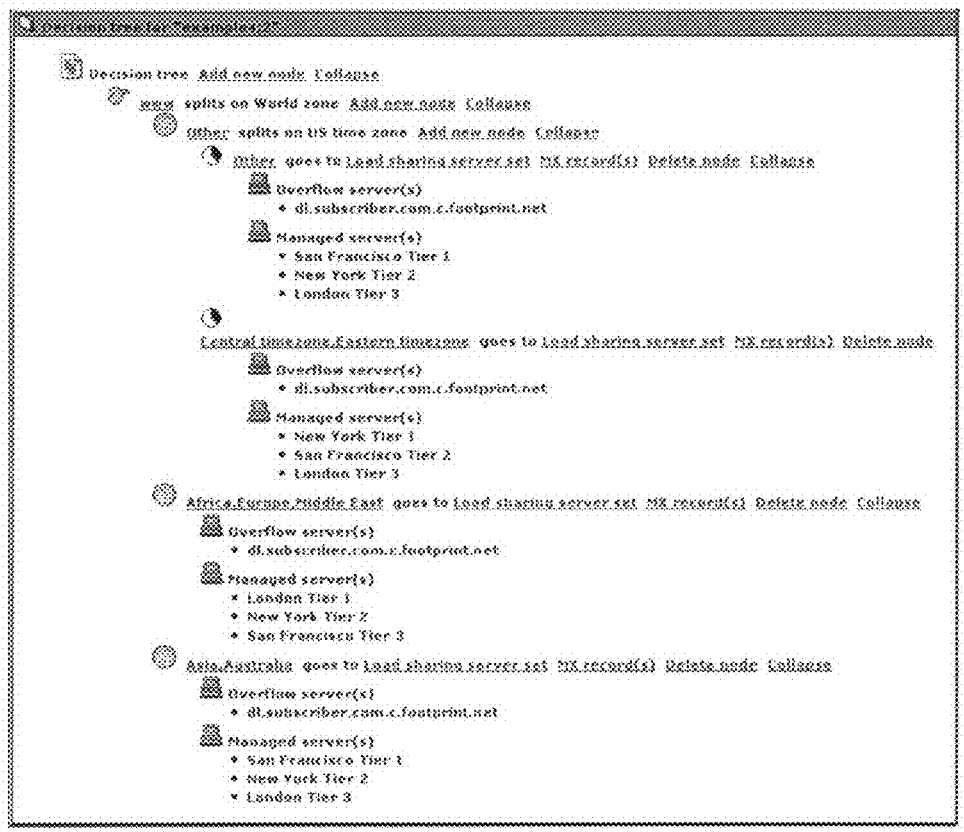

This policy (FIG. 10(i)) demonstrates finer geographic control. End users with resolvers on the West coast are directed to San Francisco rather than New York. Likewise, end users with resolvers in the Eastern U.S. are directed to New York rather than San Francisco. The overflow server, in this case "dl.subscriber.com.c.footprint.net", a CName for a CDN, is again in use. If all servers are offline or shedding (which is considered unlikely), traffic will be directed to the CDN.

Note: The Other label is used, as before, to catch all non-specified world zones, and again within the U.S. time zone split to catch all remaining regions (in this case the western time zones of the U.S. and the rest of the Americas).

The following three examples (Examples 7-9) are based on an example subscriber which has ATC handling traffic for an origin server demo.nsatc.net and for the domain nsatc.net. The subscriber has three data centers in New York, San Francisco, and London, UK, with managed servers at each center.

Figure 10J:
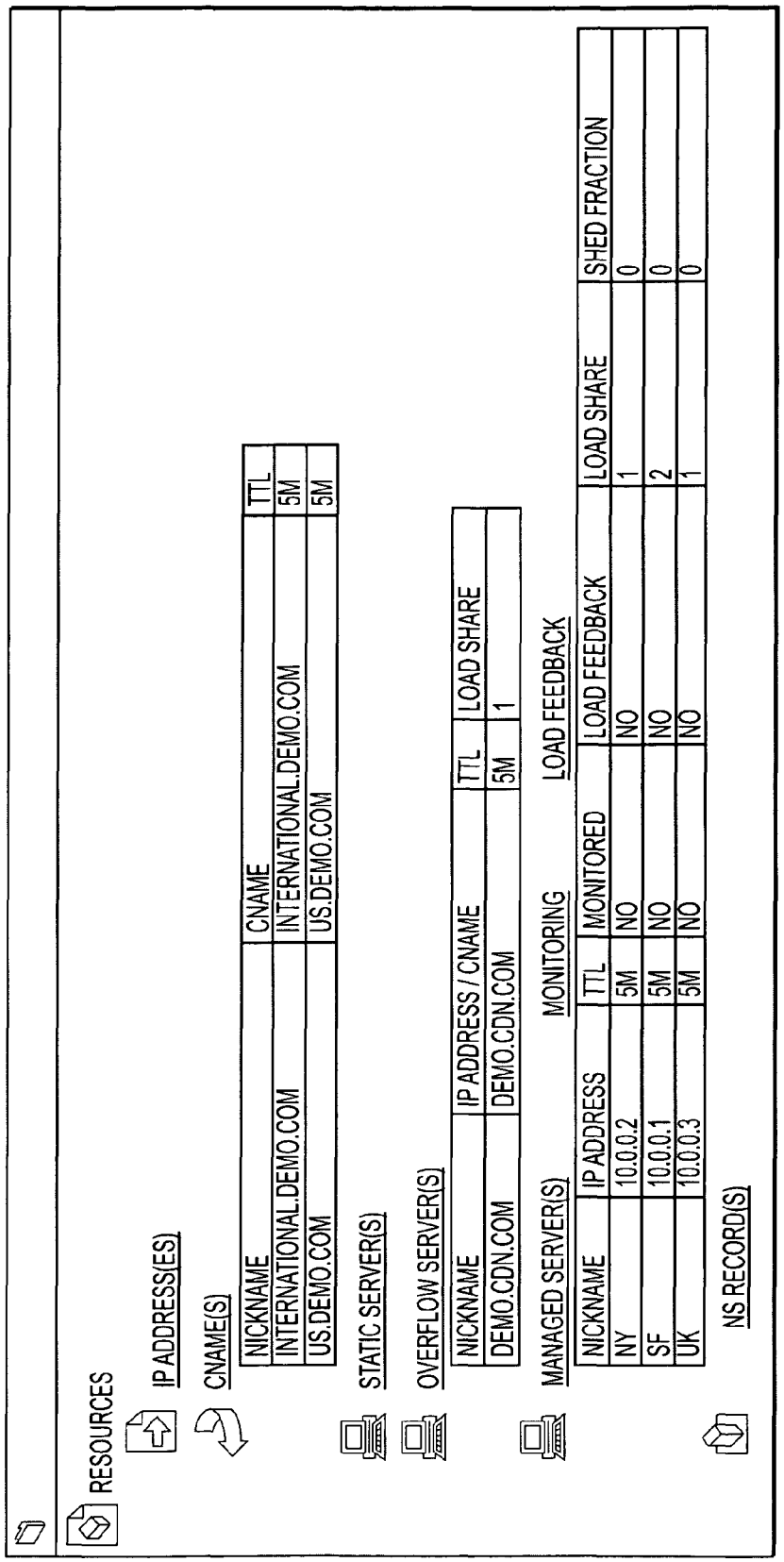

As shown in FIG. 10(j), the load shares for the managed servers are (NY: 1, SF: 2, and London: 1).

Example G

Origin Plus CDN

Figure 10K:
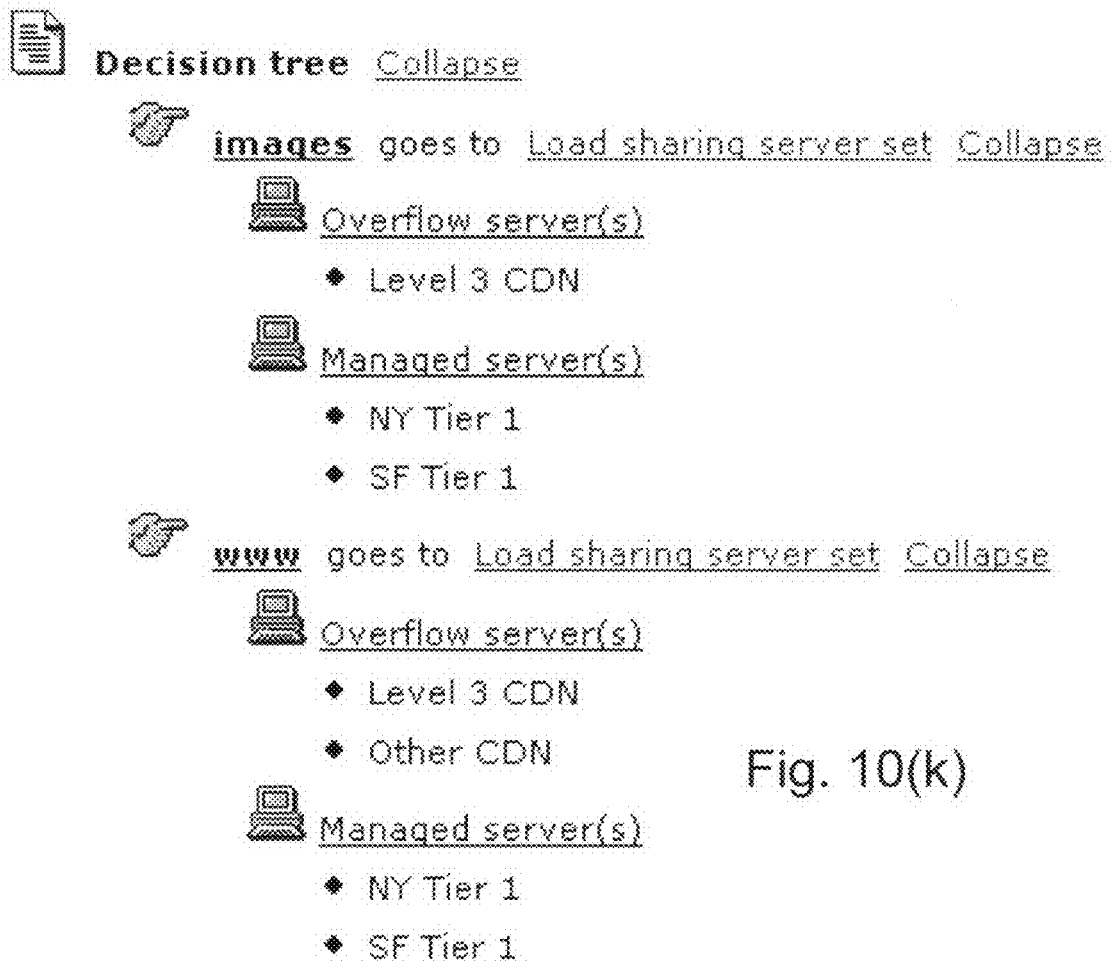

FIG. 10(k) shows a policy for the two sub-domains "images.nsatc.net" and "www.nsatc.net". For the "images" sub-domain, end users are directed to servers in New York or San Francisco, in the ratio 1:2. That is, the ATC mechanism will return the IP address of a San Francisco server twice as often as that of a NY server. If the ATC mechanism detects that, e.g., the San Francisco server is down, it will stop return the IP address for the SF server and will only return the IP address for the NY server (until monitoring indicates that the SF server has returned). The subscriber may adjust the load share of the servers as in the earlier examples (either by logging in to the ATC to change the load share values manually, or by configuring ATC to poll a particular location for a configuration file). In case of overflow, the requests go to the CDN (with the CName "demo.c.footprint.net").

The "www" sub-domain is handled somewhat differently in that the overflow for "www" will go to either of two CDNs. In this example, as shown in FIG. 10(l), "Level 3 CDN" is a CNAME for a CDN at "demo.c.footprint.net", and "Other CDN" is a CNAME for another CDN at "demo.othercdn.net". The ATC is configured to share the load between the two CDNs in the ratio 1.5 to 1. In other words, as configured in FIG. 10(l), ATC will return the CNAME of the Level 3 CDN 1.5 times as often as it returns the CNAME of the "Other CDN".

As with the load share values for the other servers, the load share for the CDNs can also be adjusted by the subscriber on the fly or by logging in to the ATC.

Those skilled in the art will realize and understand, upon reading this description, that a subscriber may wish to adjust load share values for a CDN for performance and/or business reasons. E.g., a subscriber may have to pay a higher rate for one CDN than for another.

Those skilled in the art will realize and understand, upon reading this description, that the two CDNs may be owned and operated by different entities and may be in different domains.

Using this example, a subscriber can have its traffic handled initially by its origin servers (in NY or SF), with overflow being handled by a CDN. Overflow for the "images" sub-domain is handled by a single CDN, whereas overflow for the "www" sub-domain is handled by two CDNs.

Example H

Figure 10M:

FIGS. 10(m)-10(n) show a policy in which traffic to the sub-domain "www" is split equally between three CDNs. Each CDN has a load share of 1 and so an end-user will be returned a CNAME of one of the three CDNs, with each CDN having one third of the load. Again, the subscriber can modify the load share on the fly or by logging in to the ATC.

Example I

Figure 10O:
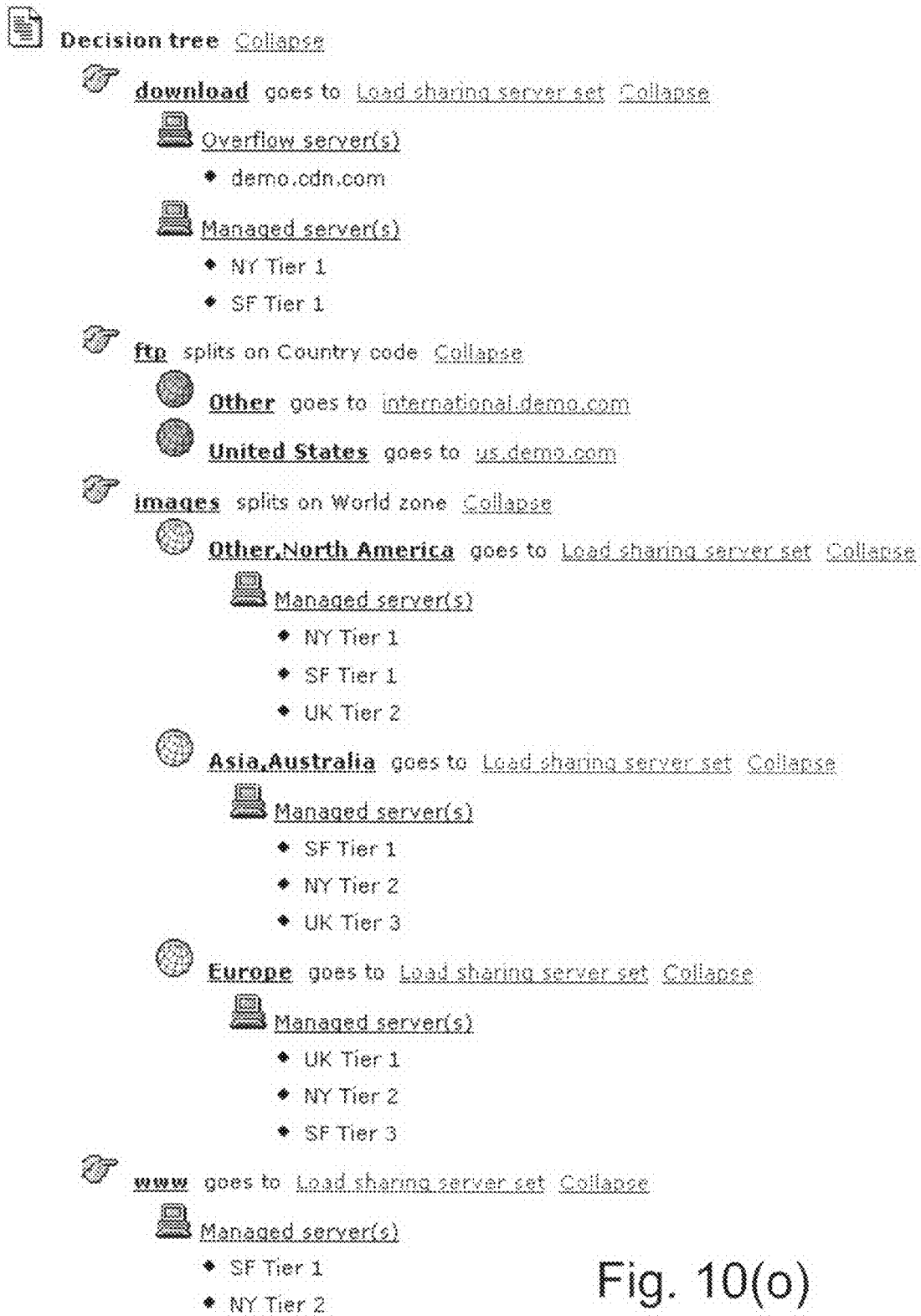

FIG. 10(o) shows an exemplary policy with different rules for the sub-domains "ftp", "download", "www" and "images."

End-user requests for the "download" sub-domain (download.nsatc.net) are handled by the subscriber's origin servers in NY and SF (in the ratio 1:2 (per FIG. 10(l)). Overflow from the "download" sub-domain is handled by the CDN "demo.cdn.com" (a CNAME for the CDN). In other words, overflow from the "download" sub-domain will be directed via a CNAME demo.cdn.com to the CDN (i.e., ATC will return the CNAME demo.cdn.com for overflow cases to the sub-domain "download").

The "ftp" sub-domain is split based on country (i.e., on the country in which the end-user's request is believed to originate). End-user requests from the US are handled by the domain "us.demo.com" (a CNAME), and all other requests are handled by "international.demo.com" (also a CNAME). In this manner, ftp requests can be directed to different networks based on their country of origin.

The "images" sub-domain is split initially on three geographic zones:
I. Europe
II. Asia and Australia
III U.S. and other Within each zone, end-user requests are further directed based on server load. E.g., in zone I (for Europe), end-user requests are handled by the tier 1 server(s) in the UK. If these fail (or are overloaded and need to shed load), requests then go to the tier 2 server(s) in NY. And if these fail (or are overloaded and must shed), requests are directed to the tier 3 server(s) in SF. Thus, in response to an end-user request for the sub-domain "images", the request originating in Europe, the ATC will return the IP address of a server in the U.K. But if that server in the UK is overloaded, the ATC will return the IP address of a server in N.Y. And if that server is also overloaded, the ATC will return the IP address of a server in S.F.

The Asia/Australia zone operates similarly, except that the servers are put into different tiers, favoring the order SF, NY, UK. All other zones favor the order NY, SF, UK.

The "www" sub-domain is not split based on geographic location of the end-user. Traffic is handled by SF first, with NY as an overflow.

In addition to the various web-based interfaces described herein, there are also other means through which subscriber policies may be defined. As discussed earlier, for example, subscriber policies may also be constructed or specified in an XML file which can be downloaded by an ATC mechanism and used to control the traffic.

Policies defined via different means (e.g., through web based GUI or XML file) may be converted into some pre-defined format within the ATC mechanism. Such pre-defined format may be designed for efficiency in manage and handling the ATC policies. For example, the internal format for ATC policies may be designed so that, internally, the AMAs can conveniently store, access, and broadcast the ATC policies to the name server agents and the name server agents can efficiently apply the policies.

Figure 11B:
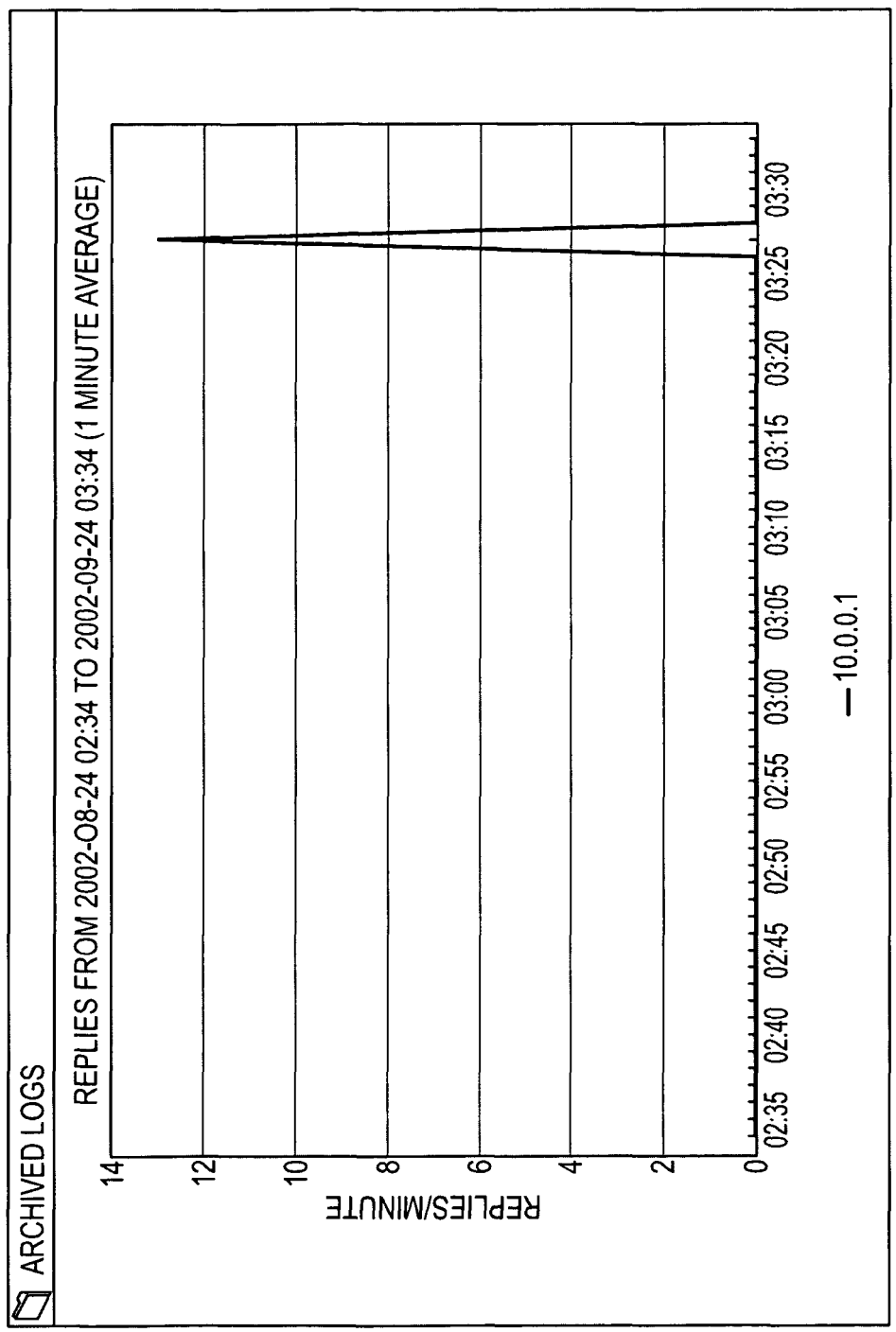

As mentioned earlier, in addition to management of the ATC policies, the AMA may also monitor the performance of name servers and generates viewable DNS log reports. The monitoring mechanism may gather performance information from either the DNS logs of the name servers or the events trapped from the name servers. Such gathered information may be used by the report generation mechanism to construct informative reports. The report generation mechanism may also make such reports available to the subscribers via the secure web-based GUI. FIGS. 11 (*a*)-11(*c*) show exemplary types of report information that is accessible via the secure web-based GUI. FIG. 11(*a*) depicts a web interface that allows a subscriber to view DNS log data of a specified resource server. A subscriber can specify the name of the server under review (e.g., "download.subscriber.com"), the form in which the log data is to be organized (e.g., specify output style of "Separate", meaning to display IP and CName queries and replies with answers as separate items in the output), the time period under review (e.g., from Sep. 1, 2002 to Sep. 24, 2002), and the time resolution used in displaying the log data (e.g., automatically select time resolution).

FIG. 11 (*b*) shows a plot of log data related to a specified server. The log data is presented in a plot, generated based on the log entries of a particular server against a specified period of time (X-axis) with certain resolution. The exemplary plot reflects the volume of the traffic directed to the underlying server during a period time between 2:30 pm and 3:30 pm on Sep. 24, 2002. The traffic volume is described in terms of number of replies generated by the underlying server per minute (Y-axis). It can be seen in this example plot that there is a surge in traffic volume between 2:36 pm and 2:38 pm. FIG. 11(*c*) shows a graphical display for the same log data in FIG. 11(*b*) in a table form, in which the log data is listed in an chronicle order from top to the bottom of the table. For instance, each row in the left column lists a period of time. In the exemplary table, the log data within the one hour period (2:30 pm to 3:30 pm) is divided into a plurality of sub-periods, each of which is 15 minutes. For each sub-period, the third column provides the number of replies from the corresponding sub-period. For instance, during the sub-period of 3:15 pm to 3:30 pm, there are 13 replies and there is no reply in other sub-periods (consistent with the plot illustrated in FIG. 11(*b*)).

In some implementations, end-user resolvers may use a preferred subset of the ATC nameservers. This may be implemented by providing an initial pool of ATC name servers which respond to new requests from new end-user resolvers. When an end-user resolver first requires name resolution from an ATC nameserver, that resolver is directed (e.g., by the DNS system) to one of the pool of ATC nameservers. When that ATC nameserver provides an answer to the end-user resolver, it also gives that resolver a list of preferred ATC nameservers for that resolver, i.e., one or more ATC nameserver that are better suited to handle name resolution for that end-user resolver. An ATC nameserver may be better suited to handle requests from an end-user resolver for a number of reasons, e.g., because it is electronically closer to the resolver, because it is geographically appropriate for that resolver, etc. Those skilled in the art will realize, upon reading this description, that different and/or other measures of suitability may be used to provide an end-user resolver with a list of preferred ATC nameservers. Once an end-user resolver has a list of preferred ATC nameservers, that resolver will make future requests of nameservers in its list (until the entries for those nameservers expire or are replaced).

The various mechanisms described herein, including, without limitation, the adaptive traffic control (ATC) mechanism, the location determination mechanism, policy editing mechanism, administrative policy update mechanism, ATC policy management mechanism, report generation mechanism, a monitoring mechanism, and an administrative master backup mechanism may be implemented in hardware, software or a combination thereof. When implemented in software, they may be implemented in any type of appropriate interpreted or compiled programming language. When implemented fully or partially in software, aspects of the invention can reside on any memory or storage medium, including but not limited to a ROM, a disk, an ASIC, a PROM and the like. While the invention has been described with reference to particular mechanisms (algorithms, processes and functions) and architectures, one skilled in the art would realize that other mechanisms and/or architectures could be used while still achieving the invention.

When the various mechanisms of the present invention are running on a particular machine (e.g., the at a client or on a server), they may reside in the memory of the machine or on a storage device or in a combination. Further, while many of the operations have been shown as being performed in a particular order, one skilled in the art would realize that other orders, including some parallelization of operations, are possible and are considered to be within the scope of the invention.

The present invention has been described above in connection with a preferred embodiment thereof; however, this has been done for purposes of illustration only, and the invention is not so limited. Indeed, variations of the invention will be readily apparent to those skilled in the art. Such variations also fall within the scope of the invention. Thus, while the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

The processing described may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

What is claimed is:

1. A method operable in a framework wherein resources of a content provider are delivered to clients from a plurality of domains, said plurality of domains comprising at least two distinct content delivery network (CDN) domains, the method comprising:
    hardware in combination with software obtaining at least one content provider policy set by the content provider; responsive to a request, selecting one of said plurality of domains, said selecting being based at least in part on the at least one content provider policy, and providing information associated with the selected domain;
    wherein said plurality of domains further comprises a content provider domain distinct from said CDN domains, and wherein:
    when the selected domain is the content provider domain, the information associated with the selected domain includes at least one IP address associated with the content provider domain, and
    when the selected domain is one of the CDN domains, the information associated with the selected domain includes a domain name associated with the selected CDN domain.

2. A method as in claim 1 further comprising, when the selected domain is one of the CDN domains:
    identifying a particular content server in said selected CDN domain; and
    providing the client with an address of the particular content server.

3. A method as in claim 1 wherein, when the selected domain is one of the CDN domains, the information associated with the selected domain comprises a CNAME associated with the selected CDN domain.

4. A method as in claim 1 wherein the at least one content provider policy comprises a load share policy that specifies a relative load share for each of said plurality of domains, and wherein the step of selecting attempts to satisfy at least said load share policy.

5. A method as in claim 1 wherein the at least one content provider policy comprises:
    a load share policy that specifies a relative load share for each of said CDN domains, and wherein the step of selecting attempts to satisfy at least said load share policy.

6. A method as in claim 1 wherein said at least one content provider policy is obtained from a location specified by said content provider.

7. A method as in claim 1 wherein said step of obtaining is repeated at regular intervals.

8. A method as in claim 1 wherein said at least one content provider policy includes a load share policy for said at least two CDN domains.

9. A computer-implemented method, operable in a framework wherein resources of a content provider are delivered to clients from a content provider domain and from one of a plurality of distinct content delivery network (CDN) domains distinct from said content provider domain, the method comprising:
    hardware in combination with software obtaining one or more content provider policies relating to delivery of said resources, at least one of said policies relating to a relative load share for said content provider domain and for each of said plurality of CDN domains;
    selecting, based at least in part on said one or more content provider policies, either (a) said content provider domain, or (b) one of said plurality of CDN domains; and
    when said step of selecting selects said content provider domain, providing the client with at least one IP address associated with a server in the content provider domain; and
    when said step of selecting selects one of said plurality of CDNs, providing the client with a domain name associated with the selected CDN.

10. The method of claim 9 wherein said step of obtaining is repeated at regular intervals.

11. A method operable in a framework wherein resources of a content provider are delivered to users from at least two distinct content delivery networks (CDNs), the method comprising:
    hardware in combination with software obtaining one or more content provider policies relating to delivery of said resources, at least one of said policies relating to a relative load share for each of said at least two CDNs;

receiving a request from a client's resolver to resolve a first domain name, said request having resulted from a client request for one of said resources of said content provider;

selecting, based at least in part on said one or more content provider policies, one of said at least two CDNs; and when said step of selecting selects one of said at least two CDNs, providing the client's resolver with a domain name associated with the selected CDN.

12. A method as in claim 11 wherein the information associated with the domain name associated with the selected CDN is a CNAME.

13. A method as in claim 11 wherein said step of obtaining is repeated at regular intervals.

14. A method as in claim 11 wherein the one or more policies include:
   a load share policy that specifies a relative load share for each of said two CDNs, and
   wherein the step of selecting attempts to satisfy at least said load share policy.

15. A method as in claim 11 wherein the resources are also delivered from one or more content sources associated with the content provider, and wherein the one or more policies include: a load share policy that specifies a relative load share for said content sources and for each of said two CDNs, and wherein the step of selecting attempts to satisfy at least said load share policy.

16. A method as in claim 11 wherein the resources are also delivered from one or more content sources associated with the content provider, and wherein there are exactly k CDNs, each having a policy-specified load share of $L_k$ associated therewith, and wherein the one or more content sources have a policy-specified load share of $L_O$ associated therewith, and wherein said content provider policies include one or more policies that specify that requests should be distributed among said content sources and said k CDNs in the ratio $L_O:L_1:L_2:\ldots:L_k$, and wherein said step of selecting attempts to satisfy the distribution ratio $L_O:L_1:L_2:\ldots:L_k$.

17. A method as in claim 11 wherein there are exactly k CDNs, each having a policy-specified load share of $L_k$ associated therewith, and wherein said content provider policies include one or more policies that specify that requests should be distributed among said k CDNs in the ratio $L_1:L_2:\ldots:L_k$, and wherein said step of selecting attempts to satisfy the distribution ratio $L_1:L_2:\ldots:L_k$.

18. A method as in claim 11 further comprising:
   when said step of selecting selects one of said CDNs:
   identifying a particular content server in said selected CDN; and
   providing the client with an IP address associated with the particular content server.

19. A method operable in a framework wherein resources of a content provider are delivered to clients from one of a plurality of distinct content delivery network (CDN) domains distinct from a content provider domain, the method comprising:
   hardware in combination with software obtaining one or more content provider policies relating to delivery of said resources, at least one of said policies relating to a relative load share for each of said plurality of CDN domains;
   selecting, based at least in part on said one or more content provider policies, one of said plurality of CDN domains; and
   when said step of selecting selects one of said plurality of CDNs, providing the client with a domain name associated with the selected CDN.

20. A method as in claim 19 further comprising:
   identifying a particular content server in said selected CDN; and
   providing the client with an address of the particular content server.

21. A method as in claim 19 further comprising:
   repeating the step of obtaining a regular intervals.

22. A method as in claim 19 wherein there are k CDN domains, and wherein said at least one of said policies relating to a relative load share for each of said plurality of CDN domains specifies that requests should be distributed among said k CDN domains in the ratio $L_1:L_2:\ldots:L_k$, where $L_j$ is the load ratio for the j-th CDN domain, for j=1 to k, and wherein said step of selecting attempts to satisfy the distribution ratio $L_1:L_2:\ldots:L_k$.

23. A method operable in a framework wherein resources of a content provider are delivered to users from one or more content sources associated with said content provider and from at least two distinct content delivery networks (CDNs), the method comprising:
   hardware in combination with software obtaining one or more content provider policies relating to delivery of said resources, at least one of said policies relating to a relative load share for said one or more content sources and for each of said at least two CDNs;
   receiving a request from a client's resolver to resolve a first domain name, said request having resulted from a client request for one of said resources of said content provider;
   selecting, based at least in part on said one or more content provider policies, either (a) one of said one or more content sources, or (b) one of said at least two CDNs; and
   when said step of selecting selects one of said content sources, providing the client with at least one IP address associated with the one of said content sources; and
   when said step of selecting selects one of said at least two CDNs, providing the client with a domain name associated with the selected CDN.

24. A method as in claim 23 wherein there are exactly k CDNs, each having a policy-specified load share of $L_k$ associated therewith, and wherein the one or more content sources have a policy-specified load share of $L_O$ associated therewith, and wherein said content provider policies include one or more policies that specify that requests should be distributed among said content sources and said k CDNs in the ratio $L_O:L_1:L_2:\ldots:L_k$, and wherein said step of selecting attempts to satisfy the distribution ratio $L_O:L_1:L_2:\ldots:L_k$.

25. The method of claim 24 wherein said step of obtaining is repeated at regular intervals.

* * * * *